United States Patent
Croxford et al.

(10) Patent No.: US 12,020,442 B2
(45) Date of Patent: *Jun. 25, 2024

(54) GRAPHICS PROCESSING SYSTEMS

(71) Applicant: Arm Limited, Cambridge (GB)

(72) Inventors: Daren Croxford, Swaffham Prior (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,430

(22) Filed: Feb. 4, 2022

(65) Prior Publication Data

US 2022/0230327 A1    Jul. 21, 2022

Related U.S. Application Data

(63) Continuation-in-part of application No. 16/452,231, filed on Jun. 25, 2019, now Pat. No. 11,270,492.

(51) Int. Cl.
  *G06T 1/20*    (2006.01)
  *G06T 3/10*    (2024.01)
  *G06T 7/20*    (2017.01)
  *G06T 7/50*    (2017.01)

(52) U.S. Cl.
  CPC .................. *G06T 7/20* (2013.01); *G06T 1/20* (2013.01); *G06T 3/10* (2024.01); *G06T 7/50* (2017.01); *G06T 2207/20084* (2013.01); *G06T 2207/20212* (2013.01)

(58) Field of Classification Search
  CPC .................................. G06T 1/20; G06T 7/50
  See application file for complete search history.

(56) References Cited

U.S. PATENT DOCUMENTS

| | | | |
|---|---|---|---|
| 10,147,226 B1* | 12/2018 | Chen | G06T 15/205 |
| 10,595,000 B1* | 3/2020 | Beeler | G06T 15/205 |
| 11,270,492 B2* | 3/2022 | Croxford | G06T 7/251 |
| 2018/0286105 A1* | 10/2018 | Surti | H04N 5/23212 |
| 2019/0033961 A1 | 1/2019 | Croxford | |
| 2019/0238854 A1* | 8/2019 | Yeung | H04N 19/139 |
| 2020/0035016 A1 | 1/2020 | Muller et al. | |
| 2020/0099954 A1 | 3/2020 | Hemmer et al. | |
| 2020/0380700 A1* | 12/2020 | Holmes | G06T 3/20 |

FOREIGN PATENT DOCUMENTS

| | | |
|---|---|---|
| CN | 1290907 | 4/2001 |
| FR | 2680931 | 3/1993 |

OTHER PUBLICATIONS

Croxford, et al., "Graphics Processing Systems", U.S. Appl. No. 16/452,231, filed Jun. 25, 2019.

(Continued)

*Primary Examiner* — Samantha (Yuehan) Wang
(74) *Attorney, Agent, or Firm* — Vierra Magen Marcus LLP

(57) ABSTRACT

A graphics processing system and method of operating a graphics processing system that generates "spacewarped" frames for display is disclosed. Motion vectors are used to determine the motion of objects appearing in rendered application frames. The so-determined motion is then used to generate "spacewarped" versions of the rendered application frames.

15 Claims, 26 Drawing Sheets

(56) References Cited

OTHER PUBLICATIONS

Non-Final Office Action dated Sep. 10, 2020, U.S. Appl. No. 16/452,231.
Response to Non-Final Office Action dated Jan. 11, 2021, U.S. Appl. No. 16/452,231.
Final Office Action dated Feb. 10, 2021, U.S. Appl. No. 16/452,231.
Response to Final Office Action dated May 10, 2021, U.S. Appl. No. 16/452,231.
Non-Final Office Action dated Jul. 19, 2021, U.S. Appl. No. 16/452,231.
Response to Non-Final Office Action dated Sep. 29, 2021, U.S. Appl. No. 16/452,231.
Notice of Allowance dated Oct. 21, 2021, U.S. Appl. No. 16/452,231.
Casser, et al., "Depth Prediction Without the Sensors: Leveraging Structure for Unsupervised Learning from Monocular Videos," Nov. 15, 2018, arXiv:1811.06152 [cs.CV].
Yahia, "Frame Interpolation using Convolutional Neural Networks on 2D animation," Jun. 24, 2016, Universiteit van Amsterdam, Bachelor Thesis, available at: https://esc.fnwi.uva.nl/thesis/centraal/files/f1305544686.pdf.
Wikipedia contributors, "Checkerboard rendering", Wikipedia, the Free Encyclopedia, Nov. 12, 2018, available at: https://en.wikipedia.org/w/index.php?title=Checkerboard_rendering&oldid=868418279.
Liabe Brave, "Checkerboard rendering, standard rendering, and upscaling," Jan. 4, 2017, available at: https://www.neogaf.com/threads/checkerboard-rendering-standard-rendering-and-upscaling.1330505/.
David Heaney, "Is Oculus Rift's Asynchronous Spacewarp 2.0 Releasing Soon?," Dec. 19, 2018, available at: https://uploadvr.com/asw-2-oculus-medium-changelog/#top).
Nikholai Koolon, "Oculus Announce Asynchronous Spacewarp Version 2.0," Sep. 28, 2018, available at: https://www.vrfocus.com/2018/09/oculus-announce-asynchronous-spacewarp-version-2-0/.
Wikipedia contributors, "Timewarp," Wikipedia, the Free Encyclopedia, Nov. 2, 2016, available at: vhttps://xinreality.com/wiki/Timewarp.

\* cited by examiner

GRAPHICS PROCESSING SYSTEMS

CLAIM OF PRIORITY

This application is a continuation-in-part of, and claims priority to, U.S. patent application Ser. No. 16/452,231, entitled "Graphics Processing Systems", filed Jun. 25, 2019, which application is incorporated by reference herein in its entirety.

BACKGROUND

The technology described herein relates to graphics processing systems, and in particular to graphics processing systems that provide images for display, for example for virtual reality (VR) and/or augmented reality (AR) and/or mixed reality (MR) (head mounted) display systems.

Graphics processing is normally carried out by first splitting a scene of objects to be displayed into a number of similar basic components or "primitives", which primitives are then subjected to the desired graphics processing operations. The graphics "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This data is then used in order to generate the desired render output of the graphics processing system.

FIG. 1 shows an exemplary system on chip (SoC) graphics processing system 10 that comprises a host processor comprising a central processing unit (CPU) 2, a graphics processing unit (GPU) 4, a display controller 5, and a memory controller 7. The exemplary graphics processing system 10 may also comprise an image signal processor (ISP) 1 and/or a neural network processing unit (NPU) 3. As shown in FIG. 1, these units communicate via an interconnect 6 and have access to off-chip memory 12. In this system, the graphics processing unit (GPU) 4 will render frames (images) to be displayed, and the display controller 5 will then provide the frames to a display panel 13 for display.

In use of this system, an application such as a game, executing on the host processor (CPU) 2 will, for example, require the display of frames on the display 13. To do this, the application will submit appropriate commands and data to a driver for the graphics processing unit (GPU) 4 that is executing on the CPU 2. The driver will then generate appropriate commands and data to cause the graphics processing unit (GPU) 4 to render appropriate frames for display and to store those frames in appropriate frame buffers, e.g. in the main memory 12. The display controller 5 will then read those frames into a buffer for the display from where they are then read out and displayed on the display panel of the display 13.

The graphics processing system 10 will be configured to provide frames for display, and the graphics processing unit (GPU) 4 will correspondingly be configured to render frames, at an appropriate rate, such as 30 frames per second.

An example of a use of a graphics processing system such as that illustrated in FIG. 1 is to provide a virtual reality (VR) or augmented reality (AR) or mixed reality (MR) head mounted display (HMD) system. In this case, the display 13 may be a head-mounted display of some kind.

In a head mounted display operation, appropriate frames (images) to be displayed to each eye will be rendered by the graphics processing unit (GPU) 4 in response to appropriate commands and data from the application, such as a game, (e.g. executing on the CPU 2) that requires the display.

In such arrangements, the system will also operate to track the movement of the head/gaze of the user (so-called head pose (orientation) tracking). This head orientation (pose) data is then used to determine how the images should actually be displayed to the user for their current head position (view orientation (pose)), and the images (frames) are rendered accordingly (for example by setting the camera orientation (viewpoint and view direction) based on the head orientation data), so that an appropriate image (frame) based on the user's current direction of view can be displayed.

While it would be possible simply to determine the head orientation (pose) at the start of the graphics processing unit (GPU) 4 rendering a frame to be displayed in a virtual reality (VR) or augmented reality (AR) system, and then to update the display 13 with the frame once it has been rendered, because of latencies in the rendering process, it can be the case that the user's head orientation (pose) has changed between the sensing of the head orientation (pose) at the beginning of the rendering of the frame and the time when the frame is actually displayed (scanned out to the display 13). Moreover, it is often desirable to be able to provide frames for display in a virtual reality (VR) or augmented reality (AR) system at a rate that is faster than the graphics processing unit (GPU) 4 may be able to render frames at.

To allow for this, a process known as "timewarp" has been proposed for head mounted display systems. In this process, an "application" frame is first rendered by the graphics processing unit (GPU) 4 based on the head orientation (pose) data sensed at the beginning of the graphics processing unit (GPU) 4 rendering the application frame, but then before an image is actually displayed on the display 13, further head orientation (pose) data is sensed, and that updated head orientation (pose) sensor data is used to transform the graphics processing unit (GPU) 4 rendered application frame to generate an "updated" version of the application frame that takes account of the updated head orientation (pose) data. The so-"timewarped" updated version of the application frame is then displayed on the display 13.

The processing required to "timewarp" a graphics processing unit (GPU) 4 rendered application frame can typically be performed in a much shorter time than the time required for the graphics processing unit (GPU) 4 to render a frame. Thus by performing "timewarp" processing, the time between head orientation (pose) data being sensed, and the image displayed on the display 13 being updated using the sensed head orientation (pose) data, can be reduced as compared to the graphics processing unit (GPU) 4 directly rendering each image to be displayed on the display 13 without "timewarp" processing. The effect of this is that, by using "timewarp" processing, the image displayed on the display 13 can more closely match the user's latest head orientation (pose), resulting in a more realistic virtual reality (VR) or augmented reality (AR) experience, for example.

Similarly, "timewarp" processing can be performed at a faster rate, such as 90 or 120 frames per second, than the graphics processing unit (GPU) 4 may be able to render frames at, such as 30 frames per second. Thus, "timewarp" processing can be used to provide frames for display that have been updated based on a sensed head orientation (pose) at a faster rate than would otherwise be possible without the use of "timewarp" processing. This can help to reduce motion sickness caused by a low refresh rate and "judder" artefacts, and provide a smoother virtual reality (VR) or augmented reality (AR) experience, for example.

FIGS. 2 and 3 illustrate the "timewarp" process in more detail.

FIG. 2 shows the display of an exemplary frame 20 when the viewer is looking straight ahead, and the required "timewarp" projection of that frame 21 when the viewing angle of the user changes due to a head rotation. It can be seen from FIG. 2 that for the frame 21, a modified version of the frame 20 must be displayed.

FIG. 3 correspondingly shows the "timewarp" rendering 31 of application frames 30 to provide the "timewarped" frames 32 for display. As shown in FIG. 3, a given application frame 30 that has been rendered may be subject to two (or more) "timewarp" processes 31 for the purpose of displaying the appropriate "timewarped" version 32 of that application frame 30 at successive intervals whilst waiting for a new application frame to be rendered. The "timewarp" processing 31 can be performed in parallel with (using a different thread to) the rendering of application frames 30 (i.e. asynchronously), which is referred to as "asynchronous timewarp" (ATW) processing.

FIG. 3 also shows the regular sampling 33 of the head orientation (pose) data that is used to determine the appropriate "timewarp" modification that should be applied to an application frame 30 for displaying the frame appropriately to the user based on their head orientation (pose).

Thus, in "timewarp" processing, an application frame is first rendered based on a first view orientation (pose) sensed at the beginning of rendering the application frame, and thus essentially represents a static "snapshot" of the scene being rendered as it should appear to a user at the point in time that the first view orientation (pose) was sensed. "Timewarp" processing can then be used to update (transform) the static "snapshot" application frame based on one or more second view orientations (poses) sensed at one or more respective later points in time, after the application frame has been rendered, to provide a series of one or more successive "timewarped" frames that each represent an updated view of the scene at the respective later point in time.

It has been recognised that while such "timewarp" processing takes account of changes to view orientation (pose) during the time period between the point in time at which the first view orientation (pose) is sensed, and the point in time at which a respective second view orientation (pose) is sensed, it does not account for, and so "timewarped" frames do not show, any changes due to the motion of objects within the scene during that same time period. This means that the "timewarp" processing of a rendered application frame that represents a dynamic scene, i.e. a scene that includes moving objects, can introduce distortions in what is displayed to a user.

To account for object motion when performing "timewarp" processing, a process known as "spacewarp" processing has been proposed. This process attempts to take account of any motion of objects when a "timewarped" frame is to be generated by "timewarping" an application frame based on a view orientation (pose) sensed at a later point in time, by extrapolating moving objects shown in the application frame to expected e.g. positions at that later point in time, with the "timewarp" processing then being performed on the basis of the extrapolated objects. The so-"timewarped" and "spacewarped" updated version of the application frame is then displayed on the display 13.

As with "timewarp" processing, "spacewarp" processing can typically be performed in parallel with (using a different thread to) the rendering of application frames (i.e. asynchronously), which is referred to as "asynchronous spacewarp" (ASW) processing.

"Spacewarp" processing typically involves image data of the current and previous GPU 4 rendered application frames being processed to determine the motion of any objects between the frames. The so-determined object motion is then extrapolated forward in time to generate an extrapolated ("spacewarped") version of the current application frame, showing moving objects at their expected (extrapolated) positions at a later point in time. The extrapolated ("spacewarped") frame may then be subjected to "timewarp" (ATW) processing before being output for display.

The Applicants believe that there remains scope for improvements to graphics processing systems, and in particular to graphics processing systems that provide "spacewarped" images for display, for example for virtual reality (VR) and/or augmented reality (AR) and/or mixed reality (MR) (head mounted) display systems.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
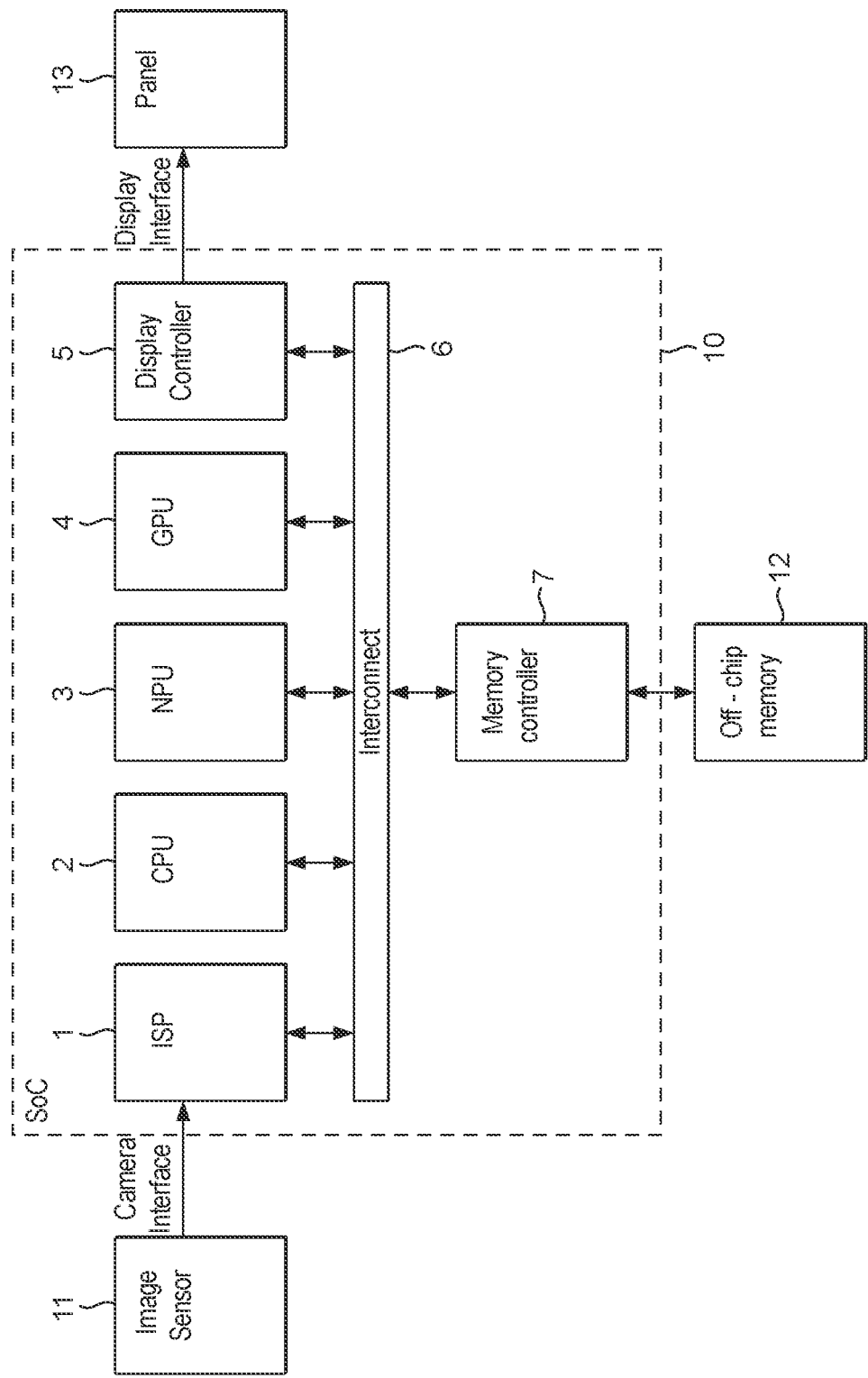
FIG. 1 shows an exemplary graphics processing system.
Figure 2:
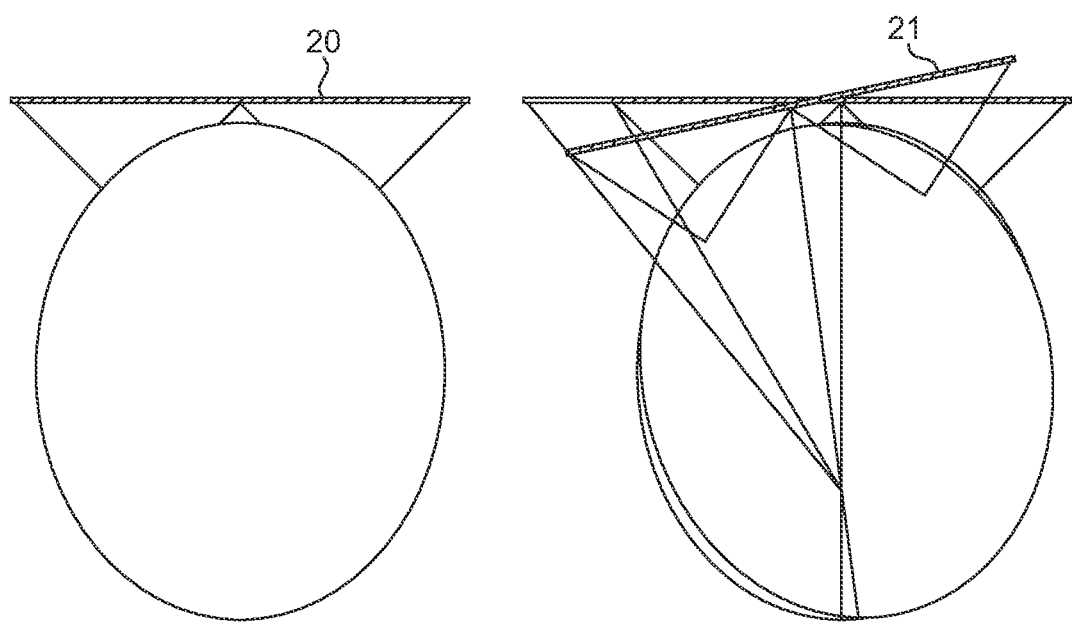
FIG. 2 illustrates the process of "timewarp" processing in a head mounted display system.
Figure 3:
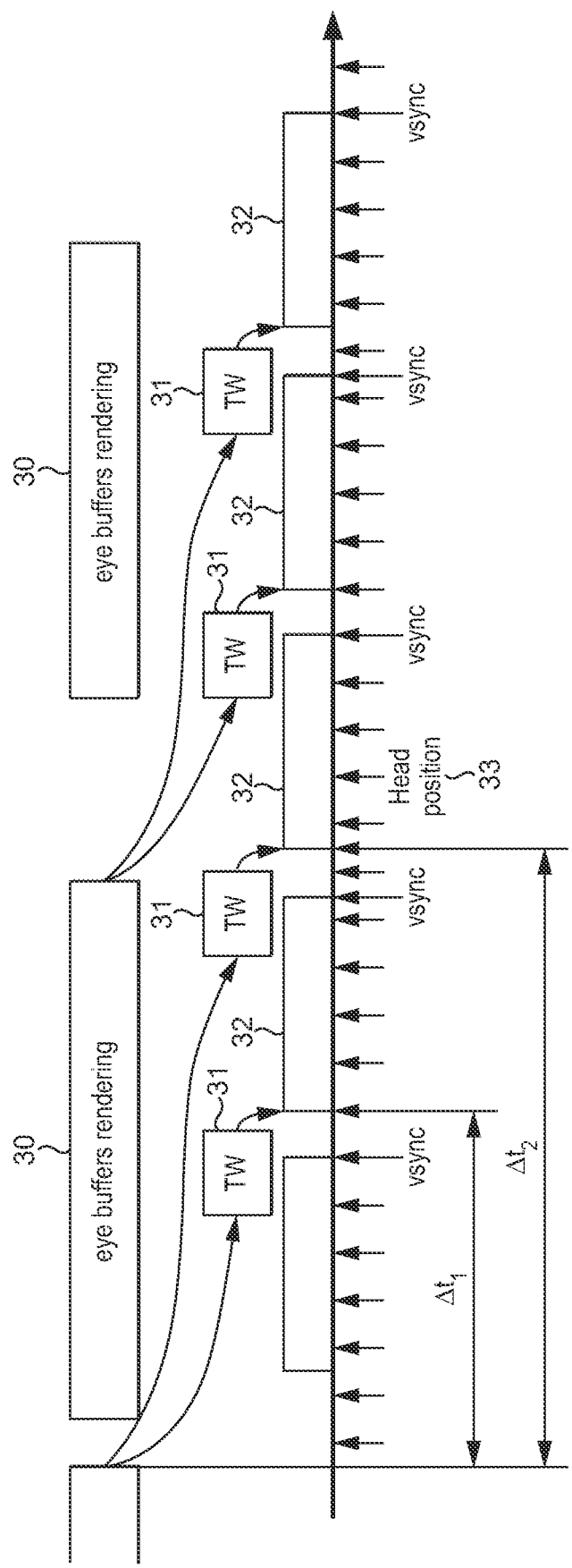
FIG. 3 shows another illustration of the process of "timewarp" processing in a head mounted display system.

A first embodiment of the technology described herein comprises a method of operating a graphics processing system that generates rendered frames representing a view of a scene of objects by rendering graphics primitives representing the scene, and generates extrapolated frames by extrapolating object motion from rendered frames, the method comprising:

provide one or more vectors each representing the motion of a primitive of a set of primitives to be rendered;

rendering the set of primitives to generate a rendered frame;

determining the motion of one or more objects in the rendered frame using the one or more vectors; and generating an extrapolated frame by extrapolating the determined motion of the one or more objects from the rendered frame.

A second embodiment of the technology described herein comprises a graphics processing system configured to generate rendered frames representing a view of a scene of objects by rendering graphics primitives representing the scene, and to generate extrapolated frames by extrapolating object motion from rendered frames, the graphics processing system comprising:

a motion vector generating circuit configured to provide one or more vectors each representing the motion of a primitive of a set of primitives to be rendered;

a rendering circuit configured to render a set of primitives to generate a rendered frame; and an extrapolated frame generating circuit configured to:
determine the motion of one or more objects in a rendered frame rendered by the rendering circuit using one or more vectors provided by the motion vector generating circuit; and generate an extrapolated frame by extrapolating the determined motion of the one or more objects from the rendered frame.

The technology described herein relates to a graphics processing system that generates an extrapolated (e.g. "spacewarped") frame by extrapolating objects based on their motion (e.g. translation and/or rotation) from a rendered (e.g. "application") frame, e.g. and in an embodiment, such that moving objects shown in the rendered (e.g. "application") frame are shown appropriately translated, rotated and/or scaled in the extrapolated (e.g. "spacewarped") frame based on their motion.

In the technology described herein, one or more vectors each representing the motion of (and being associated with) a primitive that is rendered to generate a rendered (e.g. "application") frame are provided and used to determine the motion of an object appearing in the rendered (e.g. "application") frame. An extrapolated (e.g. "spacewarped") version of the rendered (e.g. "application") frame is then generated using the so-determined object motion.

As discussed above, known approaches to "spacewarp" processing typically involve processing rendered image data from successive application frames to determine the motion of objects appearing in a GPU rendered application frame, before the determined object motion is used to generate an extrapolated ("spacewarped") version of the application frame. The Applicants have recognised, however, that such processing of rendered image data to determine object motion can consume significant processing resources. Known approaches to "spacewarp" processing according typically employ powerful processors in order to be able to generate "spacewarped" frames at a desirable frame rate (such as 90 or 120 frames per second).

Furthermore, the Applicants have realised that known approaches to "spacewarp" processing can produce relatively inaccurate estimates of object motion, since, for example, in such known methods the motion of an object is determined indirectly based on how the object appears in successive, rendered images (frames) of the object. This can lead to distortions and artefacts in what is displayed to a user.

The technology described herein, in contrast with known approaches, uses primitive motion vector information to determine object motion. The Applicants have realised that in addition to (or instead of) image information, primitive motion vector information (directly) representing the motion of primitives can be provided and used in determining object motion for "spacewarp" processing. Moreover, and as will be discussed further below, they have found that by using such motion vector information in the manner of the technology described herein, the overall amount of processing required to determine object motion in a rendered (e.g. "application") frame and generate an extrapolated ("spacewarped") version of the rendered (e.g. "application") frame can be significantly reduced, as compared to known approaches in which (only) rendered image information is used in determining object motion.

Furthermore, because such primitive motion vectors can directly represent the motion of objects being rendered, the technology described herein allows object motion to be determined more accurately, as compared to known "spacewarp" approaches which indirectly determine object motion from rendered image data, and so can thereby lead to fewer distortions and artefacts in what is displayed to a user.

Moreover, the Applicants have realised that it is possible for such primitive motion vector information to be provided without introducing significant additional processing requirements to the overall "spacewarp" process. For example, and as will be discussed further below, when application frames are rendered using a "checkerboard rendering" process, for example, such primitive motion vector information may be, in effect, already "freely available" to the graphics processing system.

Accordingly, the technology described herein can reduce distortions and artefacts, while providing significant savings in terms of memory bandwidth, processing resources and power, etc., when performing so-called "spacewarp" processing. This may be particularly advantageous in contexts in which processing resources are limited, such as in portable devices, e.g. mobile phones and tablets.

It will be appreciated, therefore, that the technology described herein provides an improved graphics processing system, and in particular an improved graphics processing system that provides "spacewarped" images for display, such as for virtual reality (VR) and/or augmented reality (AR) and/or mixed reality (MR) display systems.

The one or more vectors each represent the motion of a (graphics) primitive of a set of (graphics) primitives for rendering (to be rendered). Each vector should be associated with a primitive or group of primitives of the set of primitives for rendering, and should (directly) represent how the associated primitive or group of primitives is moving in the (three-dimensional) scene for rendering.

The motion that a vector represents can be any motion of a primitive within a scene for rendering. The motion that a vector represents may include translational movement, and/or rotational movement and/or scaling of a primitive or group of primitives. Equally, a vector may represent velocity and/or acceleration, etc., as desired and appropriate. There may be only a single (e.g. multi-dimensional) vector representing the motion of a primitive, or the motion of a primitive may be represented by more than one vector. A (each) vector can be provided in any suitable and desired form, for example in terms of its vector or scaler components within a suitable coordinate system.

Providing the one or more vectors can be performed in any suitable and desired manner. For example, data representing a primitive for rendering, e.g., primitive and/or vertex data, e.g. for one or more frames, may be processed (e.g. by a graphics processing unit (GPU) or central processing unit (CPU) of the graphics processing system) to generate a vector, or the one or more vectors may be otherwise provided, e.g. by an application that requires the rendered frame for display.

Thus, providing the one or more vectors can be performed by a (or the) graphics processing unit (GPU) (a graphics processor) or central processing unit (CPU) of the graphics processing system, or another component or components of the overall graphics processing system, if desired. Thus, a graphics processing unit (GPU) or central processing unit (CPU) of the graphics processing system in an embodiment comprises the motion vector generating circuit.

In an embodiment, providing the one or more vectors involves tracking primitives as they move, and generating the one or more vectors based on the primitive tracking. Thus, in an embodiment, providing a (each) vector is performed by determining the location of a primitive in a scene for rendering at a first point in time, determining the location of the primitive in the scene at one or more later points in time, and determining the vector according to the difference between the determined locations.

In an embodiment, the location of a primitive is determined for each rendered frame, and a (each) vector is determined according to a difference in locations of a primitive between different rendered frames. Thus, in an embodiment, providing a (each) vector is performed by determining the location of a primitive in a (the) rendered frame, determining the location of the primitive in one or more previous rendered frames, and determining the vector according to the difference between the determined locations.

Thus, each vector in an embodiment represents the motion of a primitive from the previous one or more rendered frames to the (current) rendered frame.

Primitive locations can be determined in any suitable manner. In an embodiment, primitive locations are recorded, in an embodiment in memory (storage). Similarly, once the one or more vectors have been determined or otherwise provided, they may (also) be stored in memory (storage). Such a memory (storage) may comprise any suitable memory (storage) and may be configured in any suitable and desired manner. For example, it may be a memory (storage) that is on chip with the graphics processing unit (GPU) or it may be an external memory (storage). In an embodiment it is an external memory, such as a main memory of the graphics processing system. It may be dedicated memory for this purpose or it may be part of a memory that is used for other data as well.

Primitive locations can be recorded (in memory) as desired. In an embodiment, each primitive in the set of primitives is assigned a unique identifier (ID), and the location of each primitive is recorded in association with its unique identifier (ID), in an embodiment for each rendered frame. This may be done, for example and in an embodiment, by recording, for each image element (pixel) of a (the) rendered frame, the identifier (ID) of any primitive covering the image element (pixel), e.g. in an "ID buffer" in memory. A vector is then in an embodiment determined based on the recorded ("ID buffer") data for different rendered frames.

Motion vectors may be provided for all primitives comprised in the scene being rendered, or for only some but not all of the primitives of the scene. In an embodiment, motion vectors for (only) those primitives that will appear in the rendered frame are provided (determined). Thus, the method in an embodiment comprises determining whether a primitive will appear in the rendered frame, and when it is determined that the primitive will appear in the rendered frame, providing (determining) a vector representing the motion of the primitive. Determining whether a primitive will appear in the rendered frame can be performed as desired, for example using a suitable primitive "culling" process.

A (and each) vector may be provided by (the graphics processing system) performing processing specifically for the purposes of providing the vector. However, in an embodiment, a (and each) vector is provided by (as part of) processing that is performed (principally) for other purposes, such as and in an embodiment, rendering the set of primitives to generate the rendered ("application") frame.

Thus, in an embodiment, the method comprises rendering (and the system is correspondingly configured to render) the set of primitives to generate (image data for) the rendered frame using the one or more vectors.

(It will be appreciated here that the method accordingly in an embodiment comprises providing the one or more vectors, and then rendering the set of primitives to generate (image data for) the rendered frame (using the one or more vectors). Thus, rendering the set of primitives to generate the rendered frame in an embodiment comprises generating image data for the rendered frame (using the one or more vectors), and providing (determining) the one or more vectors is in an embodiment performed without (other than) using (processing) (the) image data for the rendered frame.)

In one such embodiment, "checkerboard rendering" (CBR) is used to generate (image data for) the rendered frame. In checkerboard rendering, for any given frame, (image) data is newly generated in respect of only a portion of the frame, with the "missing" (image) data for the remainder of the frame being determined based on (image) data previously generated in one or more immediately preceding frames. This can reduce the overall processing required to generate rendered frames.

Typically, in checkerboard rendering, a frame is divided into an array of regularly sized and shaped rectangular, and in an embodiment square, blocks, and the portion of the frame in respect of which data is newly generated corresponds to a subset of the plurality of blocks arranged in a checkerboard pattern, e.g. corresponding to the white (or black) blocks of the checkerboard. The portion of the frame in respect of which data is not newly generated, i.e. is "missing", corresponds to the other blocks of the plurality of blocks, e.g. corresponding to the black (or white) blocks of the checkerboard. Typically, each block is formed of a block of 2×2 image elements (pixels). Other arrangements are possible.

The blocks for which data is newly generated in a frame typically correspond to the blocks for which data was "missing" (not newly generated) in the immediately preceding frame. Correspondingly, the blocks for which data is not newly generated in a frame typically correspond to the blocks for which data was newly generated in the immediately preceding frame.

Thus, for example, for a first frame, new data is generated in respect of one half of the frame, e.g. the black blocks of a checkerboard pattern. In the next (second) frame, new data is generated in respect of the other half of the frame, e.g. the white blocks of the checkerboard pattern, and so on. Other arrangements are possible.

In checkerboard rendering, "missing" data is typically derived from (image) data from the previous frame, taking into account the motion of primitives from the previous frame to the current frame. To do this, primitive motion vectors are determined by tracking the movement of primitives between frames, e.g. as discussed above. Thus, in checkerboard rendering, vectors representing the motion of primitives may be provided and used to determine "missing" (image) data in a rendered frame.

Thus, in an embodiment, the one or more vectors are used for checkerboard rendering.

Thus, in an embodiment, the method comprises rendering (and the system is correspondingly configured to render) (primitives of the set of primitives so as to generate) (image data for) only a portion of the rendered frame, and using the one or more vectors to generate (determine) the remainder of the (image data for the) rendered frame. Thus, at least some image data for the rendered frame is in an embodiment generated based on (using) the one or more motion vectors.

Embodiments in which the one or more vectors are used to generate the rendered frame (using a checkerboard rendering technique) are particularly advantageous, as primitive motion vectors which are obtained for the purposes of performing (checkerboard) rendering may be utilised for the new and additional purpose of determining object motion when generating an extrapolated (e.g. "spacewarped") frame. In other words, these embodiments may exploit already existing data for a new purpose of generating an extrapolated (e.g. "spacewarped") frame.

Rendering the set of primitives to generate (image data for) the rendered frame may be performed in any suitable and desired manner. For example, and in embodiments, the set of primitives is rendered (processed) using a rasterisation, ray tracing or hybrid rasterisation/ray tracing process. The set of primitives may be rendered (processed) using immediate mode rendering, i.e. whereby each primitive in the set of primitives is rendered in turn. Alternatively, a tile-based rendering process may be used.

Additionally or alternatively, and in an embodiment, rendering the set of primitives to generate (image data for) the rendered frame comprises using a checkerboard rendering (CBR) process.

As already mentioned, rendering the set of primitives should comprise generating image data for the rendered frame. Thus, the rendered frame in an embodiment comprises an array of data elements (sampling positions) (e.g. pixels), for each of which appropriate (image) data (e.g. a set of colour values) is rendered. Rendering the set of primitives may also include generating depth data for the rendered frame. As will be discussed further below, this may involve rendering the set of primitives using a "deferred shading" process, for example.

Rendering the set of primitives to generate the rendered frame is in an embodiment performed by a (the) graphics processing unit (GPU) (a graphics processor) of the graphics processing system, but it could also or instead be generated or provided by another component or components of the graphics processing system, such as a CPU, if desired. Thus, the graphics processing system in an embodiment comprises a graphics processing unit (GPU) that comprises the rendering circuit.

The rendered frame is in an embodiment a rendered frame in a sequence of successive such rendered frames representing successive views of a scene at respective points in time.

In an embodiment, the or each rendered frame comprises a frame generated for display, but which is to be processed before it is displayed, to generate a processed version of the rendered frame that is then displayed. For example, and in an embodiment, the or each rendered frame comprises a frame generated for display (for an application, such as a game), but which is to be processed by subjecting (a portion of) it to a transformation so that a processed (transformed) version of the rendered frame is displayed based on a determined view (head) orientation (pose) after it has been initially rendered (e.g., and in an embodiment, the or each rendered frame is an "application" frame which is to be subjected to "timewarp" processing).

The or each rendered frame should also or instead be processed by subjecting it to an extrapolation operation based on object motion so that a processed (extrapolated) version of the or each rendered frame is in an embodiment displayed (e.g., and in an embodiment, the or each rendered frame is an "application" frame which is to be subjected to "spacewarp" processing).

The or each rendered frame can be any suitable and desired size. However, in an embodiment, the or each rendered (e.g. "application") frame is rendered based on a field of view that is wider (in an embodiment in two dimensions) than the field of view that a (and each) processed (e.g. "timewarped") version of the rendered frame is to be displayed based on. For example, and in an embodiment, where a processed (e.g. "timewarped") version of a rendered (e.g. "application") frame is to be displayed based on a (different) determined view (head) orientation (pose), then the field of view of the rendered (e.g. "application") frame may be based on a permitted or expected (maximum) amount of camera (head) movement (rotation) ("ego-motion") in the time period that the rendered frame is supposed to be used for processing ("timewarping").

The or each rendered frame (image) may be stored in (written to) memory (storage) for subsequent use, as desired. For example, the or each rendered frame (image) may be stored in a frame buffer in memory, from where it can then be read for further processing and/or for display by a display controller. Such a memory may comprise any suitable memory (storage) (e.g. as described above).

The motion of an object or objects in the rendered frame can be determined from the vectors representing the motion of a primitive or primitives in any suitable and desired manner.

An object or objects whose motion is determined may be predefined, for example as comprising a particular primitive or primitives of the set of primitives to be rendered.

Additionally or alternatively, objects appearing in the rendered frame may be actively identified (determined), e.g. by processing image data for the rendered frame showing the one or more objects. Thus, the method in an embodiment comprises determining (identifying) (the) one or more objects in the rendered frame.

This can be achieved as desired. For example, and in an embodiment, objects appearing in the rendered frame may be detected (identified) by subjecting image data for the rendered frame (and, in an embodiment, one or more previous rendered frames) to an e.g. object detection operation, for example using edge detection.

Additionally or alternatively, the motion vector information for the rendered frame (and, in an embodiment, for (the) one or more previous rendered frames) may be processed to determine (identify) objects in the rendered frame. For example, a group or cluster of motion vectors that are the same or similar may be determined as belonging to the same object or objects. A size threshold may be utilised, e.g. to avoid erroneously identifying noise as being a moving object.

Additionally or alternatively, a parallax comparison of left eye and right eye frames may be performed, and/or depth (buffer) data for the rendered frame (and, in an embodiment, for (the) one or more previous rendered frames) may be processed to determine (identify) objects in the rendered frame.

Once an object in the rendered frame is identified, its motion may then be determined. This in an embodiment comprises determining the motion vector(s) that the object is associated with, and determining the motion of the object using the motion vector(s) that the object is determined to be associated with. The motion of an object may, for example, be determined as the average of the motion represented by the motion vector(s) associated with the object.

The motion vector(s) associated with an object are in an embodiment determined based on (and in an embodiment as being) the (motion) vector(s) of a primitive or primitives that is/are associated with the object. (As discussed above, each object appearing in the rendered frame should be associated with one or more primitives of the set of primitives which make up the object. Each object should correspondingly be associated with one or more of the one or more primitive motion vectors.)

As discussed above, it may be predefined which primitives make up (are associated with) which objects appearing in the rendered frame. Thus, an association between motion vectors and objects may be deduced from a known association between primitives and objects, and the motion of an object in the rendered frame may be determined using the motion vector(s) representing the motion of the primitives that are known to make up the object.

Thus, for example, metadata indicating the object that each primitive (motion vector) is associated with may (also) be (and in an embodiment is) provided, and determining the motion of the one or more objects may be (and in an embodiment is) performed using the one or more vectors and the metadata indicating the object that each primitive (motion vector) is associated with. Such metadata can be provided in any suitable manner. In an embodiment the metadata is provided by an (the) application that requires the extrapolated frame for display. The Applicants have found that providing metadata indicating which primitives are associated with which objects, and using the metadata to determine the motion of objects, can further decrease the processing requirements for performing "spacewarp" processing.

Where an object appearing in the rendered frame is actively identified (determined), primitive motion vector(s) associated with the object can be determined as desired. For example, primitive motion vector information for the rendered frame (and, in an embodiment, for (the) one or more previous rendered frames) may be processed to determine e.g. a group or cluster of motion vectors that can be associated with the object.

In an embodiment, depth data is (in an embodiment also) used to associate motion represented by primitive motion vectors with objects in the rendered frame. The Applicants have found that depth information can be used to help distinguish between different objects shown in a rendered frame, such that motion can be more accurately associated with objects.

Thus, rendering the set of primitives to generate the rendered frame in an embodiment comprises generating depth (and image) data for the rendered frame (in an embodiment as discussed above), and the depth (and image) data and the one or more vectors for the rendered frame (and in an embodiment for one or more previous rendered frames) are used to determine the motion of the one or more objects in the rendered frame.

In an embodiment, depth data is used to determine object visibility, e.g. and in an embodiment, whether an object is (fully or partially) occluded (by an occluding object), and/or whether an object is (fully or partially) visible, and/or whether an object is (fully or partially) occluding another object. In an embodiment, depth and/or motion information is used to determine (predict) whether the visibility of an object will change, e.g. in a (next) rendered and/or extrapolated frame. For example, and in an embodiment, motion associated with an object that is (determined to be) occluded is used to determine (predict) whether the object will become visible. In an embodiment, motion associated with an object that is (determined to be) visible/occluding is used to determine (predict) whether the object will become occluded.

Such change of visibility information can be, and in an embodiment is, appropriately used when generating an extrapolated (e.g. "spacewarped") frame. Thus, in an embodiment, generating an (the) extrapolated frame comprises extrapolating (predicting) object visibility (using depth and motion information).

The depth data that is generated for the rendered frame may be in any suitable form, e.g. and in an embodiment in the form of a depth buffer, e.g. a "Z-buffer". Thus, the depth (buffer) data in an embodiment comprises an array of data elements, each of which indicating the (Z-) distance from the camera to the rendered object that a corresponding image element (pixel) of the rendered frame corresponds to.

Depth (buffer) data may be provided by (the graphics processing system) performing processing specifically for the purposes of providing the depth data. However, in an embodiment, the depth data is provided by (as part of) processing that is performed (principally) for other purposes, such as and in an embodiment, rendering the set of primitives to generate the rendered (application) frame.

In one such embodiment, as already mentioned, "deferred shading" is used to generate the rendered frame. In "deferred shading", multiple render passes are performed to generate a rendered frame. Usually a first rendering pass outputs colour, depth, surface normals, and potentially other attributes, to separate render targets. The outputs from the first rendering pass are then read in to do complex light calculations and compositions to produce the final result in a second rendering pass.

Thus, in an embodiment, rendering the set of primitives to generate (image data for) the rendered frame in an embodiment comprises using deferred shading, and depth (buffer) data is in an embodiment provided (stored in (the) memory) as part of (a first rendering pass of) the deferred shading process to generate the rendered frame. The depth data is then in an embodiment used (with the one or more vectors) to determine object motion in the rendered frame.

Embodiments in which depth data generated as part of a deferred shading process is used to determine object motion are particularly advantageous, as the depth data which is obtained for the purposes of performing deferred shading may be utilised for the new and additional purpose of determining object motion when generating an extrapolated (e.g. "spacewarped") frame. In other words, these embodiments may exploit already existing data for a new purpose of generating an extrapolated (e.g. "spacewarped") frame.

Determining object motion may be implemented in hardware and/or software, as desired. Thus, for example, determining the motion of the one or more objects in the rendered frame may be performed by a (or the) graphics processing unit (GPU) (a graphics processor) of the graphics processing system, or another component or components of the overall graphics processing system, such as a CPU, if desired.

The motion of all (moving) objects appearing in the rendered frame may be determined, or the motion of only some but not all of the (moving) objects appearing in the rendered frame may be determined.

In an embodiment, one or more (moving) objects appearing in the rendered frame are selected, and the motion of (only) the one or more selected objects is determined.

Objects whose motion is determined may be selected as desired. For example, and in embodiments, objects that are or appear to be moving faster and/or that are or appear to be larger in the rendered frame, e.g. because they are large and/or because they are close to the camera, are preferentially selected. This can then allow the motion of (only) those objects having the greatest potential for causing distortions in what is displayed to a user to be determined (and subsequently extrapolated), thereby saving processing power while reducing or avoiding distortions, for example.

Once the motion of an object (or objects) to be extrapolated has been determined, the object is extrapolated, e.g. and in an embodiment, translated, rotated and/or scaled to the appropriate point in the extrapolated frame based on the determined object motion (to generate the extrapolated frame). This can be achieved as desired.

It will be appreciated that extrapolating (e.g. translating, rotating and/or scaling) an object in this manner may reveal regions of the scene that were previously occluded by the object. In this case, pixel values of any such "disoccluded" regions of the extrapolated frame may also be determined, e.g. and in an embodiment, based on the contents of previous rendered frames.

The extrapolated frame that is to be (and that is) generated can be any suitable and desired frame (image) that is generated by extrapolating object motion. The extrapolated frame (image) may comprise an array of data elements (sampling positions) (e.g. pixels), for each of which appropriate data (e.g. a set of colour values) is generated.

The extrapolated frame should (and in an embodiment does) represent an extrapolated (e.g. "spacewarped") version of the rendered (e.g. "application") frame. Thus, moving objects shown in the rendered frame that the extrapolated frame represents an extrapolated version of should be (and in an embodiment are) shown appropriately extrapolated (e.g. displaced, rotated and/or scaled) in the extrapolated frame. Accordingly, the extrapolated frame in an embodiment represents a view of the same scene that the rendered frame represents, but at a later point in time, and moving objects are in an embodiment shown in the extrapolated frame (e.g. at expected positions) extrapolated forward in time to that later point in time.

In an embodiment, and as discussed above, the rendered frame that the extrapolated frame represents an extrapolated version of is a frame in a sequence of successive rendered frames representing successive views of a scene, and the extrapolated frame represents a view of the scene at a point in time after the point in time that the rendered frame it represents an extrapolated version of represents a view of the scene at, but before a point in time that a next rendered frame in the sequence of rendered frames represents a view of the scene at. Thus, in an embodiment, the extrapolated frame represents an extrapolated view of the scene at a point in time in between points in time that consecutive (graphics processing unit (GPU)) rendered frames represent a view of the scene at.

The extrapolated frame is in an embodiment generated by a (or the) graphics processing unit (GPU) (a graphics processor) of the graphics processing system, but it could also or instead be generated or provided by another component or components of the overall graphics processing system, such as a CPU, if desired. Thus, a graphics processing unit (GPU) of the graphics processing system in an embodiment comprises the extrapolated frame generating circuit.

The extrapolated frame (image) may be stored in (written to) memory (storage) for subsequent use, as desired. For example, the extrapolated frame (image) may be stored in a frame buffer in memory, from where it can then be read for further processing and/or for display by a (or the) display controller. Such a memory can comprise any suitable and desired memory of or accessible to the graphics processing system (as discussed above).

Generating an extrapolated frame may involve generating (new) image data for the entirety of the extrapolated frame, or generating (new) image data for only some but not all of the extrapolated frame. For example, and in an embodiment, the extrapolated frame may be generated substantially as described in US 2019/0033961, the entire contents of which are incorporated herein by reference.

Thus, (new) image data for the extrapolated frame is in an embodiment generated only where determined to be desired or necessary, e.g. due to the presence of an (moving) object whose motion has been determined. Thus, in an embodiment, generating the extrapolated frame comprises extrapolating the motion of only (generating image data only in respect of) objects that are (determined to be) moving.

Image data which is not (newly) generated for the extrapolated frame may be based on (e.g. and in an embodiment, copied from) the rendered frame that the extrapolated frame represents an extrapolated version of.

Thus, where the motion of (only) one or more selected objects is determined, generating the extrapolated frame in an embodiment comprises extrapolating the motion of only (generating image data only in respect of) the one or more selected objects.

In an embodiment, (new) image data for an (the) extrapolated frame is generated on a region-by-region basis. Thus, in an embodiment, generating the extrapolated frame comprises: for at least one region of a set of regions that the rendered frame has been divided into, generating a corresponding extrapolated region for the extrapolated frame by extrapolating object motion from the region of the rendered frame; and, in an embodiment, for at least one other region of the set of regions that the rendered frame has been divided into, using the region of the rendered frame as a corresponding region for the extrapolated frame.

In an embodiment, the extrapolated frame is subjected to a transformation, e.g., and in an embodiment, by "timewarp" processing, to generate a transformed ("timewarped") frame (image) that may then be provided for display (e.g. by a (or the) display controller of the graphics processing system). The transformation may also or instead include a lens distortion correction transformation, a chromatic aberration (distortion) correction transformation, and/or another suitable transformation.

The transformed extrapolated frame (image) may be stored in (written to) memory (storage) for subsequent use as desired. For example, the transformed (e.g. "timewarped") frame (image) may be stored in a frame buffer in memory from where it can then be read for further processing and/or for display by a (or the) display, e.g. controller. Again, such a memory can comprise any suitable and desired memory of or accessible to the graphics processing system (as discussed above).

The transformation that is applied to the extrapolated frame is in an embodiment based on view (head) orientation (pose) data (e.g., and in an embodiment sensed by one or more sensors of a virtual reality (VR) and/or augmented reality (AR) and/or mixed reality (MR) (head mounted) display system that the graphics processing system is providing images for display to), which view (head) orientation (pose) data is in an embodiment sensed after the rendered frame being considered has been generated (rendered) (and so in an embodiment represents a second view (head) orientation (pose) of a user of the VR and/or AR and/or MR (head mounted) display system (after the rendered frame has been generated (rendered))).

The so-transformed (so-"timewarped") extrapolated frame thus in an embodiment represents a view of the scene being displayed based on the (sensed) (second) view (head) orientation (pose), and is in an embodiment then provided for display (to a (head mounted) display of the VR and/or AR and/or MR (head mounted) display system).

Thus, in an embodiment, the method further comprises transforming (and the system is further configured to transform) (a portion of) the generated extrapolated frame, in an embodiment based on (sensed) view (head) orientation (pose) data ("ego-motion").

The transformation may be performed in any suitable and desired manner. The transformation (e.g. "timewarp" processing) is, in an embodiment, performed by the graphics processing unit (GPU), a (or the) display controller, or a dedicated image processor of the graphics processing system.

In an embodiment, the transformation operation is performed by executing a (artificial) neural network. In this regard, as will be discussed further below, the Applicants have recognised that neural networks can be particularly efficient at performing such operations.

As discussed above, the extrapolation operation to generate the extrapolated (e.g. "spacewarped") frame can comprise any suitable and desired extrapolation process. For example, a suitable interpolation process may be used such that objects shown in the rendered frame appear moved to expected positions in the extrapolated frame.

In an embodiment, the extrapolation operation is (also) performed by executing a (the) (artificial) neural network. In this regard, the Applicants have again recognised that neural networks can be particularly efficient at performing such operations. Thus, according to an embodiment, the extrapolated (e.g. "spacewarped") frame is generated using a neural network. This can further decrease the processing requirements for performing "spacewarp" processing.

It is believed that the idea of generating an output extrapolated (e.g. "spacewarped") and/or transformed (e.g. "timewarped") frame using a neural network may be novel and inventive in its own right.

A third embodiment of the technology described herein comprises a method of operating a graphics processing system that generates rendered frames representing a view of a scene of objects, and generates output frames from rendered frames by transforming rendered frames based on received view orientation data and/or object motion, the method comprising:
  generating a rendered frame; and
  generating an output frame from the rendered frame by using a neural network to transform the rendered frame based on received view orientation data and/or to extrapolate motion of one or more objects in the rendered frame.

A fourth embodiment of the technology described herein comprises a graphics processing system configured to generate rendered frames representing a view of a scene of objects, and to generate output frames from rendered frames by transforming rendered frames based on received view orientation data and/or object motion, the graphics processing system comprising:
  a rendering circuit configured to generate a rendered frame; and
  a neural network circuit configured to generate an output frame from a rendered frame generated by the rendering circuit by using a neural network to transform the rendered frame based on received view orientation data and/or to extrapolate motion of one or more objects in the rendered frame.

As will be appreciated by those skilled in the art, these embodiments of the technology described herein can and in an embodiment do include one or more, and in an embodiment all, of the features of the technology described herein described herein, as appropriate.

Thus, for example, the output frame is in an embodiment an extrapolated (e.g. "spacewarped") frame generated by extrapolating motion of one or more objects in the rendered frame from the rendered frame (using the neural network), and the method in an embodiment comprises determining (and the system is in an embodiment configured to determine) the motion of the one or more objects, in an embodiment using (the) one or more vectors each representing the motion of a primitive of a (the) set of primitives for rendering, and generating the extrapolated frame by extrapolating the determined motion of the one or more objects from the rendered frame (using the neural network), e.g. as described above.

The output frame is in an embodiment also or instead a transformed (e.g. "timewarped") frame that is transformed based on the received view orientation data (using the neural network), e.g. as described above.

The neural network is in an embodiment executed by a (or the) graphics processing unit (GPU) (a graphics processor) of the graphics processing system, but it could also or instead be generated or provided by another component or components of the overall graphics processing system, such as a CPU, if desired.

In an embodiment, the neural network is executed by a neural network processing unit (processor) (NPU) of the graphics processing system. Thus, in an embodiment, the output (e.g. extrapolated) frame is generated using a neural network that is implemented on (executed by) a neural network processor (NPU) of the graphics processing system.

In this regard, the Applicants have recognised that some modern graphics processing systems include a neural network processing unit (processor) (NPU) configured specifically (dedicated) to execute neural networks (in addition to other processing units, such as a graphics processing unit (GPU) and a central processing unit (CPU)). Executing a neural network using a neural network processing unit (NPU) can improve processing efficiency, since a neural network processing unit (NPU) is specifically set up for this task. Moreover, the processing resources of the neural network processing unit (NPU), which may otherwise be idle, can be utilised. Thus, neural network processing, which may otherwise be performed by the e.g. GPU or CPU, can be "offloaded" from the e.g. GPU or CPU to the neural network processing unit (NPU). This means that the processing resources of a graphics processing system can be more efficiently utilised. It will accordingly be appreciated that these embodiments can further improve processing efficiency when performing "timewarp" and/or "spacewarp" processing.

Thus, in an embodiment the method comprises: (a graphics processing unit) generating the rendered frame; and a neural network processing unit of the graphics processing system generating the output (e.g. extrapolated) frame (in an embodiment by extrapolating the motion of the one or more objects from the rendered frame) using a neural network.

Correspondingly, the graphics processing system in an embodiment comprises a neural network processing unit (processor) (NPU) comprising the neural network circuit (and a graphics processing unit (processor) (GPU) comprising the rendering circuit).

The neural network may take any desired and suitable form or "network topology". The neural network may, for example, comprise one or more fully connected networks including one or more activation layers, such as an input layer that receives an input, one or more intermediate or "hidden" layers, and an output layer that provides a result.

In an embodiment, the neural network has an "hourglass" topology. Thus, the neural network in an embodiment comprises a plurality of layers arranged such that a resolution of the layers, from an input layer to an output layer, decreases and then increases. In an embodiment, the resolution of the input layer is the same as the resolution of the output layer. The Applicants have found that such network topologies can be particularly suited to the task of image extrapolation (transformation).

In an embodiment, the neural network is (also or instead) a convolutional neural network (CNN), for example having one or more convolutional layers (e.g. that each apply one or more convolution operations to generate an output for the layer), and/or one or more pooling layers (e.g. that each pool or aggregate sets of input values to generate an output from the layer), and/or one or more fully connected networks (e.g. comprising one or more activation layers), and/or one or more deconvolution layers. The Applicants have found that convolutional neural networks (CNNs) can be particularly efficient at the task of image extrapolation (transformation).

There may be only a single (e.g. convolutional) neural network, which is then used to generate the (and in an embodiment each) output (e.g. extrapolated) frame. Alternatively, plural (different) neural networks may be available, and one or more of the plural neural networks may be selected to use to generate an output (e.g. extrapolated) frame.

Thus, different neural networks may be selected to use to generate different e.g. regions of and/or objects in the (same) output (e.g. extrapolated) frame, and/or different neural networks may be selected to use to generate different output (e.g. extrapolated) frames.

Where plural (different) neural networks are available to be used, then each of the plural neural networks is in an embodiment suitable for use in a different context (use case). The neural network(s) to use to generate an output (e.g. extrapolated) frame (region) is then in an embodiment selected based on the context (use case) that the output (e.g. extrapolated) frame (region) is to be generated for.

This can be achieved as desired. In an embodiment, the plural (different) neural networks are each trained using a different set of training data, each set of training data in an embodiment relating to a different context (use case), e.g. of the application that requires the output (e.g. extrapolated) frame for display.

For example, and in an embodiment, different neural networks may be available (and trained) for different "levels" or environments of a game, and the neural network(s) to use to generate an output (e.g. extrapolated) frame may be then selected based on the current "level" or environment of the game. For example, and in an embodiment, a first neural network may be used for generating output (e.g. extrapolated) frames in outdoor environments of a game, and a second different neural network may be used for generating output (e.g. extrapolated) frames in indoor environments of the game. This can then allow a more efficient use of neural network processing resources and/or a more accurate output, for example.

It would also be possible to use (and train) a e.g. "default" neural network that is to be used e.g. when there is no neural network specifically for the current context (use case) (and in an embodiment, this is what is done).

Thus, the method in an embodiment comprises selecting a neural network (from plural neural networks) to use to generate the output (e.g. extrapolated) frame based on a context (use case) that the output (e.g. extrapolated) frame is to be generated for, and using the selected neural network to generate the output (e.g. extrapolated) frame.

Equally, it would be possible, e.g. when there is no neural network specifically for the current context (use case), to not use a neural network, but to instead, e.g. use another (e.g. "conventional") process to generate the output (e.g. extrapolated) frame.

Thus, the method in an embodiment comprises selectively using a neural network to generate the output (e.g. extrapolated) frame. For example, a (the) neural network may be selectively used to generate only some but not all (regions and/or objects) of an (the) output (e.g. extrapolated) frame. Similarly, a (the) neural network may be selectively used to generate only some but not all output (e.g. extrapolated) frames of plural output (e.g. extrapolated) frames being generated.

Determining (selecting) a neural network to use (if any) can be performed by any suitable component of the graphics processing system, for example, a (the) graphics processing unit (GPU), and/or central processing unit (CPU) and/or neural network processing unit (NPU). In an embodiment, a driver for the graphics processing unit (GPU) running on the central processing unit (CPU) indicates which (if any) neural network to use for a particular frame (region) and/or object.

The neural network should operate to transform input data to a useful output for the output (e.g. extrapolated) frame. This may involve the neural network identifying or classifying features present within the input. The output and input to the neural network can be any suitable output and input.

The output of the neural network should enable the output (e.g. extrapolated) frame to be generated (by extrapolating objects from the rendered frame). The output of the neural network may be in the form of image data for the output (e.g. extrapolated) frame, or it could be data enabling image data for the output (e.g. extrapolated) frame to be generated, e.g. from the rendered frame. The output of the neural network may relate to the entire output (e.g. extrapolated) frame, or it could provide an output (only) in respect of only some but not all of the output (e.g. extrapolated frame), e.g. and in an embodiment in respect of (only) (regions containing) moving objects.

The input to the neural network can be as desired. The input in an embodiment comprises an input data array which can be processed by the neural network to produce the desired useful output. The input should include the data from which the desired useful output can be determined.

Thus, the input (data array) in an embodiment includes one or more of: (i) data indicating the determined motion of the one or more objects (e.g. determined substantially as described above); (ii) image data for the rendered frame (and for one or more previous rendered frames); (iii) (the) metadata indicating associations between primitives and objects; (iv) depth data for the rendered frame (and for one or more previous rendered frames); (v) (the) one or more vectors each representing the motion of a primitive of a (the) set of primitives for rendering (e.g. as described above); and (vi) view orientation ("ego-motion") data.

Where the input to the neural network includes data indicating the determined motion of the one or more objects (e.g. determined substantially as described above), the neural network may then process that data to generate an output extrapolated frame.

However, the Applicants have recognised that it would also be possible for the neural network to determine itself the motion of the one or more objects. Thus, in an embodiment, a (or the) neural network is used to determine the motion of the one or more objects in the rendered frame (as well as to generate the output extrapolated frame). Thus, determining the motion of the one or more objects is in an embodiment (also) performed using a (the) neural network that is in an embodiment executed on the neural network processing unit (NPU) of the graphics processing system. The neural network that is used to determine the motion of the one or more objects may be the same as or different to the neural network that is used to generate the output (e.g. extrapolated) frame.

The Applicants have found that neural networks can be particularly efficient at this task. Moreover, "offloading" this processing to the neural network processing unit (NPU) can further improve processing resource utilisation. Furthermore, by performing this processing on the neural network processing unit (NPU), any latency, e.g. caused by the transferring of data between different processing units (processors) of the graphics processing system, can be reduced.

A (the) neural network can be used to determine the motion of the one or more objects in any suitable and desired manner. In an embodiment, the input (data array) to the neural network includes (the) one or more vectors each representing the motion of a primitive of a (the) set of primitives for rendering for the rendered frame (and for one or more previous rendered frames), e.g. as described above, and the neural network in an embodiment processes that input data to determine the motion.

However, it would be possible for the neural network to determine the motion of the one or more objects without the one or more vectors being provided as an input. In this case, the neural network in an embodiment determines the motion of the one or more objects using the image data (and, in an embodiment, depth data) for the rendered frame and for one or more previous rendered frames.

The Applicants have furthermore recognised that where a (the) neural network (also) receives view orientation ("ego-motion") information as an input, a (the) neural network can (also) be used to determine a, e.g. "timewarp" transformation (in an embodiment as well as to generate an extrapolated frame and/or to determine the motion of one or more objects in the rendered frame).

Thus, in an embodiment, a (the) neural network is used to transform a (extrapolated) frame for output, e.g. based on a change in view orientation ("ego-motion"), e.g. as described above. Thus, in an embodiment, the method comprises transforming a (extrapolated) frame for output (based on a received view orientation ("ego-motion")) using a (the) neural network that is in an embodiment executed on the neural network processing unit (NPU) of the graphics processing system. The neural network that is used to transform a frame for output can be same as or different to the neural network used to determine the motion of the one or more objects and/or to generate an output (extrapolated) frame.

Again, the Applicants have found that neural networks can be particularly efficient at this task. Moreover, "offloading" this processing to the neural network processing unit (NPU) can further improve processing resource utilisation. Furthermore, by performing this processing on the neural network processing unit (NPU), any latency, e.g. caused by the transferring of data between different processing units (processors) of the graphics processing system, can be reduced.

It would also be possible for a (the) neural network to determine itself a change in view orientation ("ego-motion"), e.g. from image (and depth) data for successive frames, and to then perform an e.g. "timewarp" transformation based on that determined change in view orientation ("ego-motion").

As discussed above, the technology described herein is in an embodiment implemented in the context of virtual reality (VR) and/or augmented reality (AR) and/or mixed reality (MR) displays. Thus, the output (e.g. transformed and/or extrapolated) frame is in an embodiment a frame generated for display. Thus, in an embodiment, the output (e.g. transformed and/or extrapolated) frame is provided for display (by a (or the) display controller of the graphics processing system) to a display. In an embodiment, the output (e.g. transformed and/or extrapolated) frame is provided for display to a head mounted display of a (virtual reality (VR) and/or augmented reality (AR) and/or mixed reality (MR)) head mounted display system.

Thus, in an embodiment, the rendered (e.g. "application") frame is a frame (image) rendered for a (virtual reality (VR) and/or augmented reality (AR) and/or mixed reality (MR)) head mounted display system, and the output (extrapolated) frame represents an extrapolated ("spacewarped") version of the rendered (e.g. "application") frame, that is then in an embodiment transformed ("timewarped"), before being provided for display to (a head mounted display of) the (virtual reality (VR) and/or augmented reality (AR) and/or mixed reality (MR)) head mounted display system.

Such a (virtual reality (VR) and/or augmented reality (AR) and/or mixed reality (MR)) head mounted display system may include one or more sensors for sensing (tracking) the orientation (pose) of the user's head (and/or their view (gaze) direction) in use (while images are being displayed to the user on the head mounted display of the (virtual reality (VR) and/or augmented reality (AR) and/or mixed reality (MR)) head mounted display system).

In this case, the rendered frame may be rendered based on a first head (view) orientation (pose) in an embodiment representing a head orientation (pose) of a user of the (virtual reality (VR) and/or augmented reality (AR) and/or mixed reality (MR)) head mounted display system that is sensed by the (one or more sensors of the) (virtual reality (VR) and/or augmented reality (AR) and/or mixed reality (MR)) head mounted display system, in an embodiment at the beginning of (the graphics processing unit (GPU)) rendering the rendered (e.g. "application") frame.

The output (extrapolated) frame in an embodiment then represents an extrapolated ("spacewarped") version of the rendered (e.g. "application") frame, and the transformation (by "timewarp" processing) of that extrapolated frame is in an embodiment then based on (second) head orientation (pose) data (sensed by the (one or more sensors of the) (virtual reality (VR) and/or augmented reality (AR) and/or mixed reality (MR)) head mounted display system), that is in an embodiment sensed after the rendered (e.g. "application") frame is rendered, and that in an embodiment represents a second head orientation (pose) of a user of the (virtual reality (VR) and/or augmented reality (AR) and/or mixed reality (MR)) head mounted display system (after the first frame is rendered). In this case, the output (extrapolated) frame in an embodiment shows moving objects at expected e.g. positions extrapolated forward in time to the point in time that this (second) head orientation (pose) is sensed. Thus, in this case, the output (extrapolated) frame in an embodiment represents a view of the scene at the point in time that this (second) head orientation (pose) is sensed.

It will be appreciated, however, that in another embodiment, the output (e.g. transformed and/or extrapolated) frame is provided for display to a display that is not head mounted, such as a hand held display of a hand held (virtual reality (VR) and/or augmented reality (AR) and/or mixed reality (MR)) display system, e.g. a mobile phone or tablet. Such a system may operate to track the movement (orientation) of the display (e.g. of the mobile phone or tablet) itself, and the display orientation data may then be used (in a similar manner to head orientation data described above) to determine how images should actually be displayed to the user on the display.

Although the technology described herein has been described above with particular reference to generating a single output (e.g. extrapolated) frame, it will be appreciated that plural output (e.g. extrapolated) frames may be generated (and displayed on a display). For example, plural output (e.g. extrapolated) frames (e.g. two, four, eight etc. output (e.g. extrapolated) frames) may be generated from a (and each) rendered frame, e.g. (and in an embodiment) during the time period that a next rendered frame is being rendered (by the graphics processing unit (GPU)).

Similarly, there may be an output (e.g. extrapolated) frame generated for each eye, and a respective output (e.g. transformed and/or extrapolated) frame may be displayed to each eye appropriately so as to provide a three-dimensional effect when the images are viewed.

Correspondingly, the technology described herein is in an embodiment applied to a plurality of (rendered) frames, and in an embodiment to a plurality of (rendered) frames that are being generated as a sequence of frames for display.

Thus, particularly in the case where the rendered frame is part of a sequence of rendered frames, in an embodiment the process of the technology described herein of generating output (e.g. extrapolated) frames is performed for plural rendered frames of a sequence of rendered frames, and, in an embodiment, for each rendered frame of a sequence of rendered frames.

The technology described herein is in an embodiment implemented in and as part of an overall graphics processing system that includes one or more of: a host processor (central processing unit (CPU)), a graphics processing unit, a display controller, a video processor (codec), a neural network processing unit (NPU), a system bus, and a memory controller.

A (each) circuit of the technology described herein may, e.g., form part of the graphics processing unit, the display controller and/or another suitable component of the graphics processing system, e.g. as described above, or may otherwise be provided in the graphics processing system. It may comprise a programmable and/or fixed function processing circuit, and/or may comprise a dedicated processing circuit and/or a processing circuit used for other processing as well, as desired.

The host processor may execute applications that can require graphics processing by the graphics processing unit, and send appropriate commands and data to the graphics processing unit to control it to perform graphics processing operations and to produce graphics processing (render) output required by applications executing on the host processor (including in the manner of the technology described herein).

To facilitate this, the host processor should, and in an embodiment does, also execute a driver for the graphics processing unit and a compiler or compilers for compiling shader programs to be executed by programmable shading stages of the graphics processing unit (which compiler may be, and in an embodiment is, a part of the driver).

Thus in an embodiment, the graphics processing unit is in communication with a host microprocessor (that is part of the overall graphics processing system) that executes a driver for the graphics processing unit and/or a compiler or compilers for the graphics processing unit.

Similarly, there is in an embodiment an application on the host processor that indicates a requirement for performing processing operations in the manner of the technology described herein, which requirement is then recognised by, e.g., the driver executing on, the host processor, with the, e.g. driver on, the host processor then operating to instruct the graphics processing unit to render data accordingly.

The graphics processing unit (GPU) and/or host microprocessor (CPU) are in an embodiment also in communication with a (head mounted) display for displaying the images generated by the graphics processing unit (thus in an embodiment the graphics processing system further comprises a display for displaying the images generated by the graphics processing unit) (e.g. via the display controller).

Similarly, the graphics processing system in an embodiment has or is in communication with a memory in which images generated by the graphics processing unit may be stored, e.g. for subsequent processing, e.g. display (e.g. via the memory controller). Thus, in an embodiment, the graphics processing system and/or unit comprises, and/or is in communication with, one or more memories and/or memory devices that store the data described herein, and/or that store software for performing the processes described herein.

The graphics processing unit can include, and in an embodiment does include, any one or more, and in an embodiment all, of the processing stages that a graphics processing unit can normally include. Thus, for example, the graphics processing unit in an embodiment includes a primitive setup stage, a rasteriser and a renderer. In an embodiment the renderer is in the form of or includes a programmable fragment shader.

The graphics processing unit is in an embodiment a tile-based graphics processing unit comprising a tile buffer for storing tile sample values and/or a write out unit that operates to write the data in the tile buffer (e.g. once the data in the tile buffer is complete) out to external (main) memory (e.g. to a frame buffer).

It will be appreciated by those skilled in the art that all of the described embodiments of the technology described herein can, and in an embodiment do, include, as appropriate, any one or more or all of the features described herein.

Although embodiments have been described above with particular reference to the use of per-primitive motion vectors, other embodiments relate to the use of other motion vectors, such as, and in an embodiment, per-pixel motion vectors.

Thus, another embodiment of the technology described herein comprises a method of operating a graphics processing system that generates rendered frames representing a view of a scene of objects by rendering graphics primitives representing the scene, and generates extrapolated frames by extrapolating object motion from rendered frames, the method comprising:
providing a set of one or more motion vectors for a rendered frame;
generating a rendered frame; and
generating an extrapolated version of the rendered frame;
wherein generating the extrapolated version of the rendered frame comprises:
determining the motion of one or more objects in the rendered frame using the set of one or more motion vectors; and
generating the extrapolated version of the rendered frame by extrapolating, from the rendered frame, the motion of the one or more objects determined using the set of one or more motion vectors.

Another embodiment of the technology described herein comprises a graphics processing system configured to generate rendered frames representing a view of a scene of objects by rendering graphics primitives representing the scene, and to generate extrapolated frames by extrapolating object motion from rendered frames, the graphics processing system comprising:
a motion vector providing circuit configured to provide a set of one or more motion vectors for a rendered frame;
a rendering circuit configured to generate a rendered frame; and
an extrapolated frame generating circuit configured to generate an extrapolated version of a rendered frame generated by the rendering circuit by:
determining the motion of one or more objects in the rendered frame using a set of one or more motion vectors provided by the motion vector providing circuit; and
generating the extrapolated version of the rendered frame by extrapolating, from the rendered frame, the motion of the one or more objects determined using the set of one or more motion vectors.

These embodiments of the technology described herein can and in an embodiment do include one or more, and in an embodiment all, of the features of the technology described herein described herein, as appropriate.

Another embodiment of the technology described herein comprises a method of operating a graphics processing system that generates rendered frames, and generates extrapolated frames by extrapolating motion from rendered frames, the method comprising:
generating a rendered frame using a set of one or more motion vectors; and
generating an extrapolated version of the rendered frame; wherein generating the extrapolated version of the rendered frame comprises:
generating the extrapolated version of the rendered frame by extrapolating motion from the rendered frame using the set of one or more motion vectors.

Another embodiment of the technology described herein comprises a graphics processing system configured to generate rendered frames, and to generate extrapolated frames by extrapolating motion from rendered frames, the graphics processing system comprising:
a rendering circuit configured to generate a rendered frame using a set of one or more motion vectors; and
an extrapolated frame generating circuit configured to generate an extrapolated version of a rendered frame generated by the rendering circuit using a set of one or more motion vectors by:
generating the extrapolated version of the rendered frame by extrapolating motion from the rendered frame using the set of one or more motion vectors.

As will be appreciated by those skilled in the art, these embodiments of the technology described herein can and in an embodiment do include one or more, and in an embodiment all, of the features of the technology described herein described herein, as appropriate. For example, these embodiments may include one or more, and in an embodiment all, of the features described above (with any reference to a primitive motion vector being replaced appropriately by a reference to a motion vector, such as a per-pixel (image element) motion vector).

In these embodiments, a set of one or more motions vectors that is used for the purposes of generating a rendered frame is also used for the purposes of generating an extrapolated (e.g. "spacewarped") version of the rendered frame. Thus, in these embodiments, the same set of one or more motion vectors is used both when generating a rendered frame, and when generating an extrapolated version of the (same) rendered frame. As discussed above, this can allow a more accurate determination of e.g. object motion, and reduce the overall processing requirements associated with generating an extrapolated (e.g. "spacewarped") frame.

As discussed above, each motion vector in the set of one or more motion vectors can be a vector that represents the motion of a primitive of a set of primitives that is rendered to generate a (the) rendered frame. However, in an embodiment, each motion vector in the set of one or more motion vectors is a vector that represents motion associated with a respective region of a (the) rendered frame. For example, and in an embodiment, each motion vector is a "per-pixel" (image element) motion vector.

It will be appreciated here that a rendered frame will typically comprise an array of image elements (sampling points), for each of which appropriate render output data (e.g. a set of colour value data) is generated (sampled) (by the rendering circuit). A rendered frame may be generated for display on a display device having a display or output comprising a plurality of pixels, such as a computer monitor or a printer. A rendered frame may accordingly include, for each output pixel of the display device, a set of one or more corresponding image elements (sampling points). Each such set of image elements (sampling points) may include only a single image element (sampling point). Alternatively, each set of image elements may include plural image elements (sampling points). In this latter case, each image element (sampling point) may effectively correspond to a part of a pixel (e.g. a sub-pixel) of the display device, and rendered data may be subjected to an appropriate downsampling operation, e.g. to generate the output pixel values for displaying the final image on the display device.

A motion vector may be provided for each of one or more, such as all, image elements of a (the) rendered frame. Where image elements are grouped into respective sets of image elements (that e.g. each correspond to a respective output pixel), a motion vector may be provided for each of one or more, such as all, sets of image elements of a (the) rendered frame.

Thus, in an embodiment, each motion vector in the set of one or more motion vectors is a vector that represents motion associated with (a respective set of) one or more image elements (e.g., and in an embodiment, corresponding to an output pixel) of a (the) rendered frame. The set of one or more motion vectors may comprise a respective (e.g. "per-pixel") motion vector for each of some or all (sets of) image elements of a (the) rendered frame.

A (e.g. "per-pixel") motion vector can represent any suitable and desired motion associated with an image element or set of image elements of a (the) rendered frame. In an embodiment, a (and in an embodiment each) (e.g. "per-pixel") motion vector represents motion from a rendered frame to another, in an embodiment the next, rendered frame.

Thus, in an embodiment, plural rendered frames are generated, and a set of one or more motion vectors is provided for a (and in an embodiment each) pair of, in an embodiment successive, rendered frames, wherein each motion vector is a vector that represents motion from the first rendered frame of the (respective) pair of rendered frames to the second rendered frame of the (respective) pair of rendered frames.

Thus, the rendered frame (the extrapolated version of which is generated) may be referred to as a current rendered frame, and one or more earlier (previous) rendered frames may (also) have been generated (before the current rendered frame). In this case, the set of one or more (e.g. "per-pixel") motion vectors may represent motion between one of the earlier rendered frames (e.g. the immediately preceding rendered frame) and the current rendered frame. In an embodiment, the set of one or more ("per-pixel") motion vectors represents motion between one of the earlier rendered frames and another of the earlier rendered frames. For example, and in an embodiment, the set of one or more ("per-pixel") motion vectors represents motion between the pair of earlier rendered frames immediately preceding the current rendered frame.

In an embodiment, such motion vector information is provided (generated) for each rendered frame that is generated (by the rendering circuit). Thus, in an embodiment, a (and in an embodiment each) rendered frame is generated and stored in association with respective motion vector information that represents motion from an earlier (e.g., and in an embodiment, the immediately preceding) rendered frame (by the rendering circuit).

Thus, information indicative of the set of one or more motion vectors is in an embodiment stored, in an embodiment in association with a respective (earlier) rendered frame. In an embodiment, generating the (current) rendered frame comprises generating (and storing) (information indicative of) an associated set of one or more motion vectors. Where plural such sets of one or more motion vectors are provided (and stored), generating a (the current) rendered frame and/or generating a (the) extrapolated version may comprise using one or more, such as plural, such sets of one or more motion vectors.

A (the) set of one or more (e.g. "per-pixel") motion vectors can be generated in any suitable and desired manner. A (the) set of one or more (e.g. "per-pixel") motion vectors may be provided (directly) by an application that requires the graphics processing, or a (the) set of one or more (e.g. "per-pixel") motion vectors may be generated by comparing rendered frames, e.g. by processing rendered image data from successive rendered frames.

In an embodiment, a (the) set of one or more (e.g. "per-pixel") motion vectors is generated and/or used for the purposes of image quality enhancement. For example, and in an embodiment, a (the) set of one or more (e.g. "per-pixel") motion vectors is generated and/or used for the purposes of temporal enhancement. For example, and in an embodiment, a (the) set of one or more (e.g. "per-pixel") motion vectors is generated and/or used for the purposes of one or more of: (i) Temporal Anti-Aliasing (TAA); (ii) Ray Tracing Denoising; (iii) Machine Learning Super Sampling (MLSS); and (iv) Machine Learning Anti-Aliasing (MLAA).

Thus, in an embodiment, a (the) rendered frame is generated using a (the) set (or sets) of one or more (e.g. "per-pixel") motion vectors by (the rendering circuit) rendering an initial rendered frame, and then temporally enhancing the initial rendered frame using the set(s) of one or more (e.g. "per-pixel") motion vectors.

In an embodiment, a (the) rendered frame is generated using a (the) set(s) of one or more (e.g. "per-pixel") motion vectors by rendering an initial rendered frame, and combining (image) data for the initial rendered frame with (image) data for one or more earlier rendered frames using the set(s) of one or more (e.g. "per-pixel") motion vectors. For example, and in an embodiment, (image) data for one or more earlier rendered frames may be reprojected (extrapolated) using a (the) set(s) of one or more (e.g. "per-pixel") motion vectors. Resulting reprojected (image) data may then be blended with (image) data for the initial rendered frame to generate the (current) rendered frame.

Data for the one or more earlier rendered frames may be provided separately. However, in an embodiment, data for the one or more earlier rendered frames is accumulated, in an embodiment in an accumulation buffer.

Once a (the current) rendered frame is generated, an extrapolated version of the (current) rendered frame is then generated using the set(s) of one or more (e.g. "per-pixel") motion vectors.

An extrapolated version of a rendered frame can be generated in any suitable and desired manner. In an embodiment, it is done substantially as described above. Thus, in an embodiment, generating an (the) extrapolated version of a (the) rendered frame comprises determining the motion of one or more objects in the rendered frame using the set(s) of one or more (e.g. "per-pixel") motion vectors, and generating the extrapolated version of the rendered frame by extrapolating the so-determined motion from the rendered frame. In an embodiment, generating an (the) extrapolated version of a (the) rendered frame comprises extrapolating the motion of one or more image elements of the rendered frame using the set(s) of one or more (e.g. "per-pixel") motion vectors.

In an embodiment, as discussed above, generating an (the) extrapolated version of a (the) rendered frame comprises (in addition to using the set(s) of one or more (e.g. "per-pixel") motion vectors) using depth data, that is in an embodiment generated for the rendered frame. In an embodiment, as also discussed above, the depth data is used to determine object visibility, and in an embodiment to predict changes in object visibility. Thus, in an embodiment, generating an (the) extrapolated version of a (the) rendered frame comprises extrapolating (object) motion and visibility from the rendered frame (using the depth data and the set(s) of one or more (e.g. "per-pixel") motion vectors).

As discussed above, once an (the) extrapolated version of a (the) rendered frame is generated, the extrapolated version of the rendered frame may be transformed based on received view orientation data to generate a transformed and extrapolated version of the rendered frame (for display).

The technology described herein can be implemented in any suitable system, such as a suitably configured microprocessor based system. In an embodiment, the technology described herein is implemented in a computer and/or micro-processor based system.

The technology described herein is in an embodiment implemented in a portable device, such as, and in an embodiment, a mobile phone or tablet. The technology described herein is in an embodiment implemented in a virtual reality and/or augmented reality and/or mixed reality display device such as, and in an embodiment, a virtual reality and/or augmented reality and/or mixed reality headset. Thus, another embodiment of the technology described herein comprises a virtual reality and/or augmented reality and/or mixed reality display device comprising the graphics processing system of any one or more of the embodiments of the technology described herein. Correspondingly, another embodiment of the technology described herein comprises a method of operating a virtual reality and/or augmented reality and/or mixed reality display device, comprising operating the virtual reality and/or augmented reality and/or mixed reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuit, processing logic, microprocessor arrangements, etc., that are operable to perform the various functions, etc., such as appropriately dedicated hardware elements (processing circuit) and/or programmable hardware elements (processing circuit) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share a processing circuit, etc., if desired.

Furthermore, any one or more or all of the processing stages of the technology described herein may be embodied as a processing stage circuit, e.g., in the form of one or more fixed-function units (hardware) (processing circuit), and/or in the form of a programmable processing circuit that can be programmed to perform the desired operation. Equally, any one or more of the processing stages and processing stage circuits of the technology described herein may be provided as a separate circuit element to any one or more of the other processing stages or processing stage circuits, and/or any one or more or all of the processing stages and processing stage circuits may be at least partially formed of a shared processing circuit.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, nontransitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Embodiments of the technology described herein will now be described with reference to the Figures.

An embodiment of the technology described herein relates to providing frames (images) for display for a virtual reality (VR) and/or augmented reality (AR) and/or mixed reality (MR) head mounted display (HMD) system.

Such a system may be configured as shown in FIG. 1 (and described above), with the display 13 of the system comprising an appropriate head mounted display that includes, inter alia, a display screen or screens (panel or panels) for displaying frames to be viewed by a user wearing the head mounted display, one or more lenses in the viewing path between the user's eyes and the display screens, and one or more sensors for tracking the position (orientation (pose)) of the user's head (and/or their view (gaze) direction) in use (while images are being displayed on the display to the user).

Figure 4:
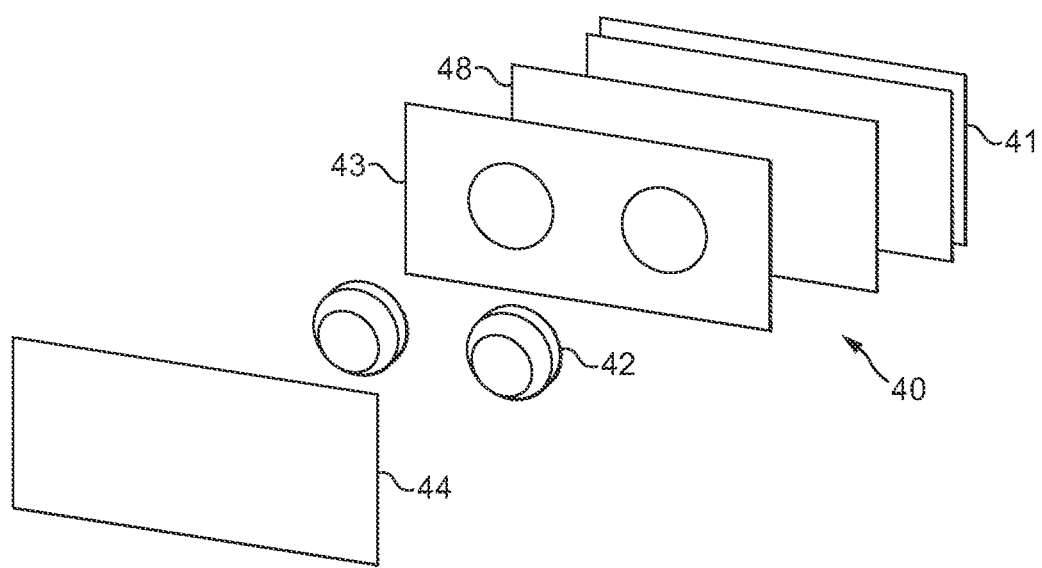
FIG. 4 shows schematically an exemplary virtual reality head mounted display headset.

FIG. 4 shows schematically an exemplary virtual reality (VR) head mounted display 40. As shown in FIG. 4, the head mounted display 40 comprises, for example, an appropriate display mount 41 that includes one or more head pose (orientation) tracking sensors, to which a display screen (panel) 48 is mounted. A pair of lenses 42 are mounted in a lens mount 43 in the viewing path of the display screen 48. Finally, there is an appropriate fitting 44 for the user to wear the headset.

In the system shown in FIG. 1, images to be displayed on the head mounted display 13 will be, e.g., rendered by the graphics processing unit (GPU) 4 in response to requests for such rendering from an application executing on a host processor (CPU) 2 of the graphics processing system and store those frames in the main memory 12. The display controller 5 may then read the frames from memory 12 and provide those frames appropriately to the head mounted display 13 for display to the user.

The graphics processing unit (GPU) 4 may render a frame (image) for display for each eye: one image representing a scene as seen from the left eye, and one image representing the scene as seen from the right eye. The images may then be displayed to each eye appropriately using the head mounted display 13 so as to provide a three-dimensional effect when the images are viewed.

As discussed above, it would be possible for the graphics processing unit (GPU) 4 of the graphics processing system 10 to directly render each frame for display on the head mounted display 13 based on the user's head orientation (pose) sensed at the start of rendering a frame. However, because of various latencies in the rendering process, it can be the case that the user's head orientation (pose) has changed between the sensing of the head orientation (pose) at the beginning of the rendering of the frame and the time when the frame is actually displayed on the display 13. Moreover, it is typically desirable to update the display 13 at a rate that is faster than the graphics processing unit (GPU) 4 is able to render frames at, e.g., to avoid "judder" artefacts or motion sickness caused by a low refresh rate.

To account for this, the graphics processing system 10 may perform so-called "timewarp" processing on the frames rendered by the graphics processing unit (GPU) 4 before providing those frames to the display 13 for display to a user.

As discussed above, in "timewarp" processing, rather than the graphics processing unit (GPU) 4 directly rendering each frame (image) to be displayed on the head mounted display 13, an "application" frame is first rendered by the graphics processing unit (GPU) 4 based on the head orientation (pose) data sensed at the beginning of the graphics processing unit (GPU) 4 rendering the application frame. But then before an image is actually displayed on the display 13, further head orientation data is sensed, and that updated head orientation sensor data is used to transform (a portion of) the graphics processing unit (GPU) 4 rendered application frame to generate an "updated" version of the application frame that takes account of the updated head orientation (pose) data. The so-"timewarped" updated version of the application frame is then displayed on the head mounted display 13.

Figure 5:
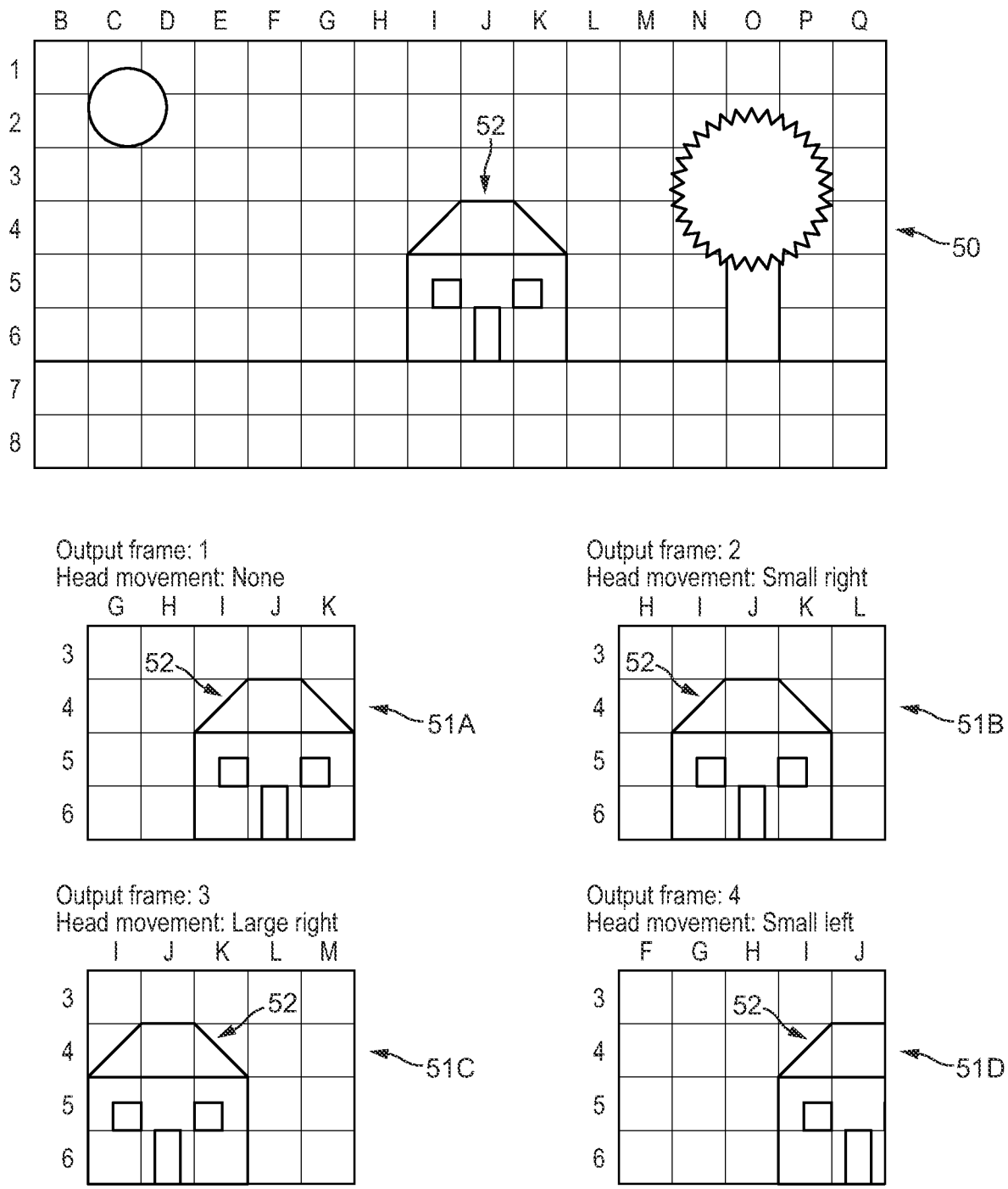
FIG. 5 illustrates an exemplary rendered "application" frame together with exemplary "timewarped" versions of that frame.

FIG. 5 shows a schematic illustration of an exemplary graphics processing unit (GPU) 4 rendered application frame 50 representing a view of a scene comprising a number of objects including house 52. In this example, application frame 50 is subjected to four "timewarp" processes to generate four respective output "timewarped" frames 51A-D which may be displayed at successive time intervals while a new application frame is being rendered by the graphics processing unit (GPU) 4. The new application frame may then be subjected to four further "timewarp" processes, and so on.

It will be appreciated, therefore, that in the present example, "timewarp" processing is performed at a rate (such as 120 frames per second) that is four times faster than the graphics processing unit (GPU) 4 renders applications frames at (such as 30 frames per second). This can help to reduce motion sickness caused by a low refresh rate and "judder" artefacts, and provide a smoother virtual reality (VR) or augmented reality (AR) experience, for example.

As shown in FIG. 5, in this example, application frame 50 represents a 16×8 region field of view of the scene (columns B to Q, and rows 1 to 8) that is wider (in both dimensions) than the 5×4 region field of view of the "timewarped" frames 41A-D that are actually displayed to the user. This ensures that graphics processing unit (GPU) 4 rendered application frame data is available to be "timewarped" for a wide range of possible head movements (e.g. rotations and/or translations).

In the example of FIG. 5, head orientation (pose) data is sensed (at a first point in time), and then the graphics processing unit (GPU) 4 renders the application frame 50 based on this head orientation (pose) data. Then, before an image is actually displayed on the head mounted display 13, further head orientation (pose) data is sensed (at a second, later point in time) and used to transform the application frame 50 to generate a first "timewarped" frame 51A for display.

As shown in FIG. 5, the further head orientation (pose) data indicates that no change in the user's head orientation has occurred since the original head orientation (pose) data was sensed at the beginning of the graphics processing unit (GPU) 4 rendering the application frame 50. First "timewarped" frame 51A therefore simply represents an appropriate window ("letterbox") (in this example, columns G to K, and rows 3 to 6) taken from the wider field of view of the application frame 50, and no "timewarp" transformation has been performed.

After the (first) further head orientation (pose) data is sensed, second further head orientation (pose) data is sensed and used to transform the application frame 50 again to generate a second "timewarped" frame 51B for display.

In the present example, as shown in FIG. 5, the second further head orientation (pose) data indicates that the user's head has made a small movement (e.g. rotation and/or translation) to the right, compared to when the original head orientation (pose) data was sensed at the beginning of the graphics processing unit (GPU) 4 rendering the application frame 50. Second "timewarped" frame 51B therefore represents an appropriate window ("letterbox") taken from the wider field of view of the application frame 50, but has been subjected to a "timewarp" transformation such that, compared to first "timewarped" frame 51A where no head movement was detected, column L of application frame 50 has become visible, while column G is no longer visible. The effect of this is that object 52 appears shifted to the left in the second "timewarped" frame 51B (compared to the first "timewarped" frame 51A) as a result of the small right head movement.

Third (51C) and then fourth (51D) "timewarped" frames are then generated in a similar manner, i.e. each based on updated further head orientation (pose) data. Thus, as shown in FIG. 5, when a larger head movement to the right is detected compared to the "original" head orientation, object 52 appears shifted farther to the left in "timewarped" frame 51C; and when a head movement to the left is detected compared to the "original" head orientation, object 52 appears shifted to the right in "timewarped" frame 51D (compared to the first "timewarped" frame 51A where no head movement was detected).

It will be appreciated that, in the case that an upwards head movement (rotation and/or translation) (relative to the original head orientation) were to be detected, object 52 would appear to shift downwards in an output "timewarped" frame; in the case that a downwards head movement (rotation and/or translation) (relative to the original head orientation) were to be detected, object 52 would appear to shift upwards in the respective output "timewarped" frame (compared to the first "timewarped" frame 51A where no head movement was detected); and so forth.

Figure 6:
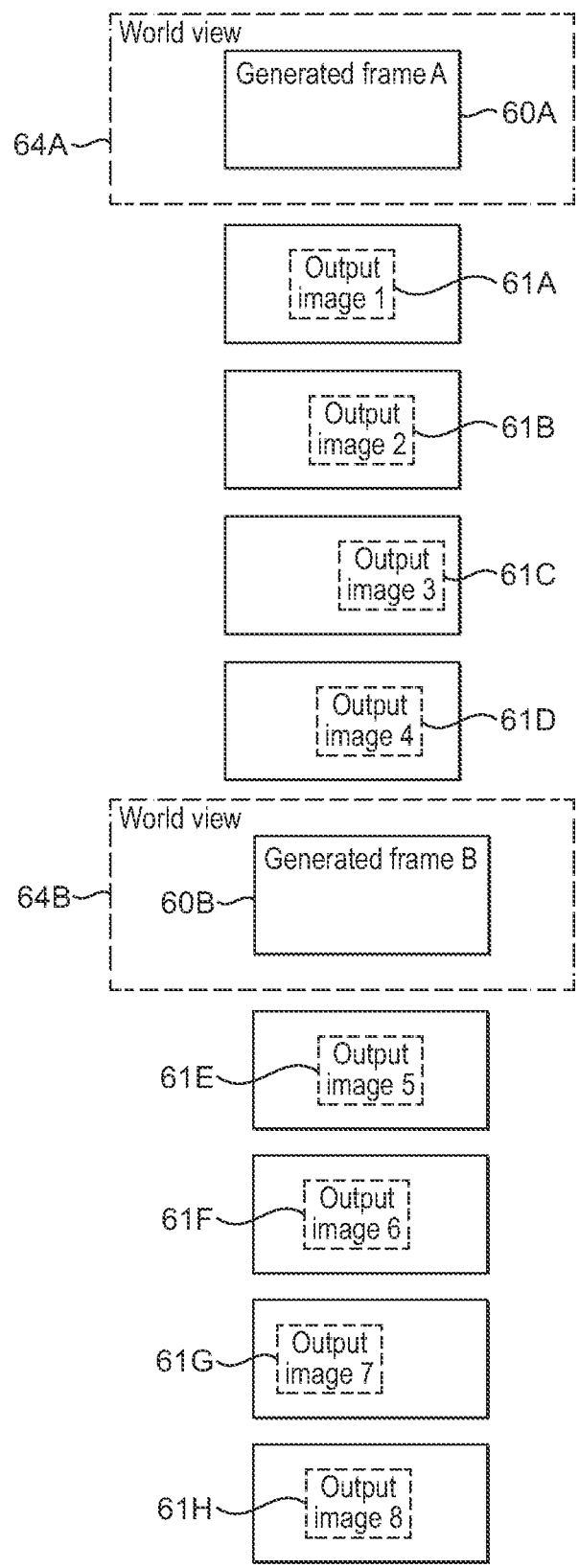
FIG. 6 schematically illustrates the process of "timewarp" processing.

FIG. 6 shows another schematic illustration of "timewarp" processing. As shown in FIG. 6, a first application frame 60A is initially rendered by the graphics processing unit (GPU) 4, and is then subjected to four "timewarp" processes to generate four respective "timewarped" frames 61A-D which are displayed on display 13 at successive time intervals while a second application frame 60B is being rendered by the graphics processing unit (GPU) 4. Once the second application frame 60B has been rendered, it is subjected to four further "timewarp" processes to generate four further respective "timewarped" frames 61E-H which are again displayed on display 13 at successive time intervals while the next application frame is being rendered by the graphics processing unit (GPU) 4, and so on.

As illustrated in FIG. 6, an application frame 60A, 60B can be thought of as representing a portion of a respective "world view" 64A, 64B representing a full view of the entire scene being rendered from a respective camera position (viewpoint). The portion of the "world view" that an application frame represents is based on a view direction corresponding to the (first) head orientation (pose) data that the application frame is rendered based on.

Similarly, a "timewarped" frame can represent a portion of a respective application frame, with the portion of the application frame that a "timewarped" frame represents being based on a view direction corresponding to the (second) head ordination (pose) data that the application frame is "timewarped" based on to generate the "timewarped" frame.

As discussed above, it has been recognised that while such "timewarp" processing takes account of changes to head orientation (pose) during the time period between the sensing of a (first) head orientation (pose) that an application frame is rendered based on, and the sensing of a (second) head orientation (pose) that the application frame is "timewarped" based on to provide a "timewarped" frame, it does not account for, and so "timewarped" frames do not show, any changes due to the motion of objects within the scene during that time period. This means that the "timewarp" processing of a rendered application frame that represents a dynamic scene, i.e. a scene that includes moving objects, can introduce distortions in what is displayed to a user.

Figure 7:
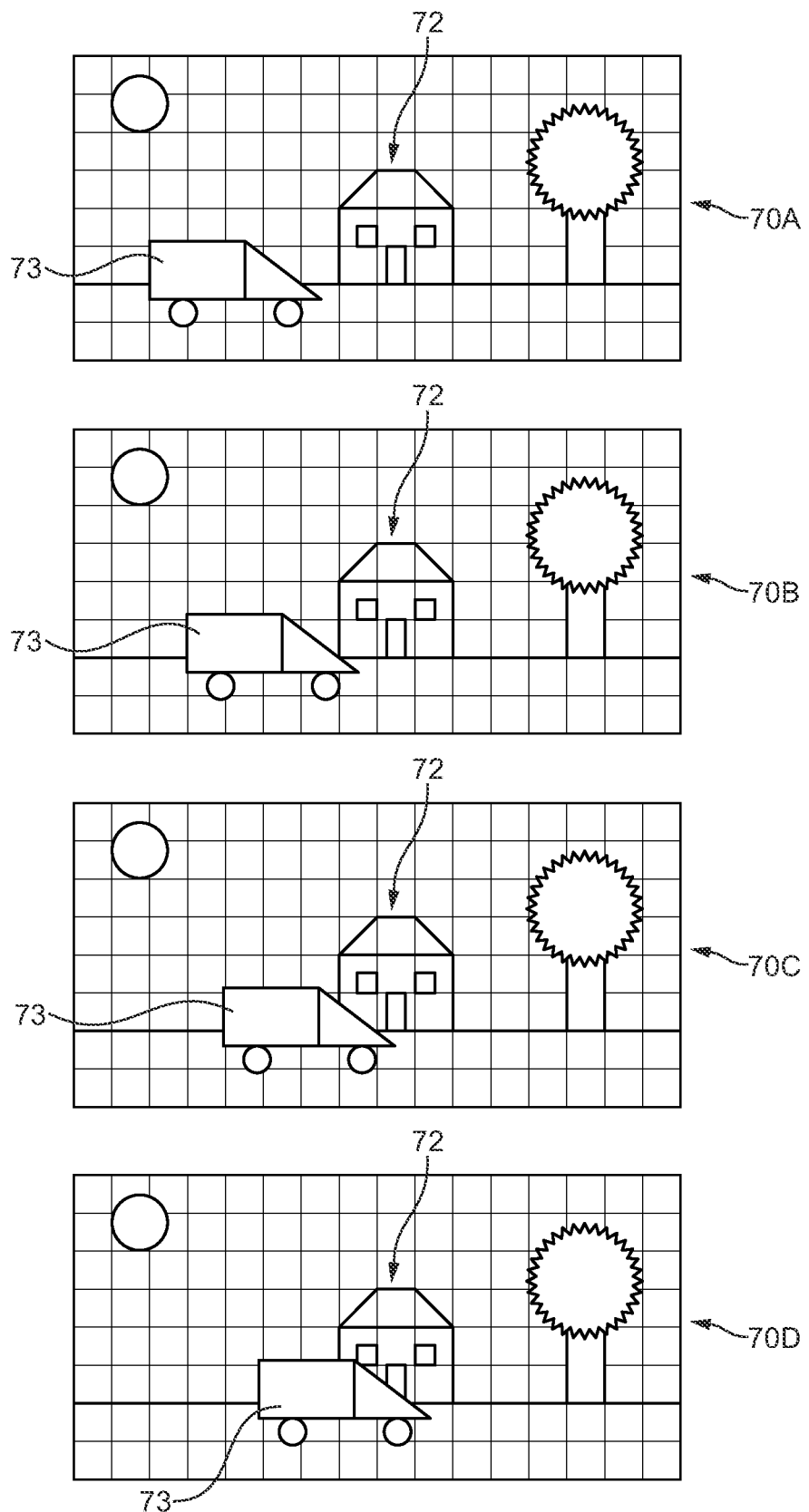
FIG. 7 shows an exemplary series of rendered frames representing successive views of an exemplary dynamic scene.

FIG. 7 illustrates an exemplar dynamic scene, which is the same scene as shown in FIG. 5, i.e. comprising a number of objects including house 72, except that it also includes an additional moving object, car 73. FIG. 7 shows four successive graphics processing unit (GPU) 4 rendered frames 70A-D which represent successive views of the dynamic scene at successive points in time.

In the scene shown in FIG. 7, car 73 is moving left to right with respect to static background objects in the scene, including house 72. Thus, the position of car 73 relative to house 72 should appear to change in time due to the motion of the car 73. Thus, as shown in FIG. 7, car 73 appears to the left of house 72 in the first graphics processing unit (GPU) 4 rendered frame 70A that represents a view of the scene at a first point in time. In a subsequent graphics processing unit (GPU) 4 rendered frame 70B that represents a view of the scene at a second, later point in time, car 73 appears farther to the right and closer to house 72 than it appeared in the earlier rendered frame 70A due to the left to right motion of car 73. Then, in the next rendered frame 70C, and the frame 70D rendered after that, car 73 continues to move further to the right in the frame and relative to house 72, such that, in this example, it moves in front of house 72.

If, however, rather than being directly rendered by the graphics processing unit (GPU) 4, each of the frames 70A-D were instead to be generated by transforming an earlier rendered application frame by "timewarp" processing, then each "timewarped" frame would show the car 73 at the same position relative to house 72 that is shown in the earlier application frame, because, as discussed above, "timewarp" processing does not account for any such object motion. Thus car 73 would appear in each of the "timewarped" frames at a position relative to house 72 that corresponds to an earlier point in time than it should do (i.e. the point in time that the application frame represents a view of the scene at), so that car 73 would appear further to the left of house 72 than it should do. Moreover, car 73 would appear at the same position in each of the "timewarped" frames, and so would appear to be static in those frames. This means that distortions in what is displayed to a user would be introduced.

As discussed above, to account for object motion when performing "timewarp" processing, a process known as "spacewarp" processing has been proposed. This process attempts to take account of any motion of objects when a "timewarped" frame is to be generated by "timewarping" an application frame based on a head (view) orientation (pose) sensed at a later point in time, by extrapolating the positions of moving objects shown in the application frame to expected e.g. positions at that later point in time, with the "timewarp" processing then being performed on the basis of the extrapolated (expected) object positions. The so-"timewarped" and "spacewarped" updated version of the application frame is then displayed on the display 13.

Figure 8:
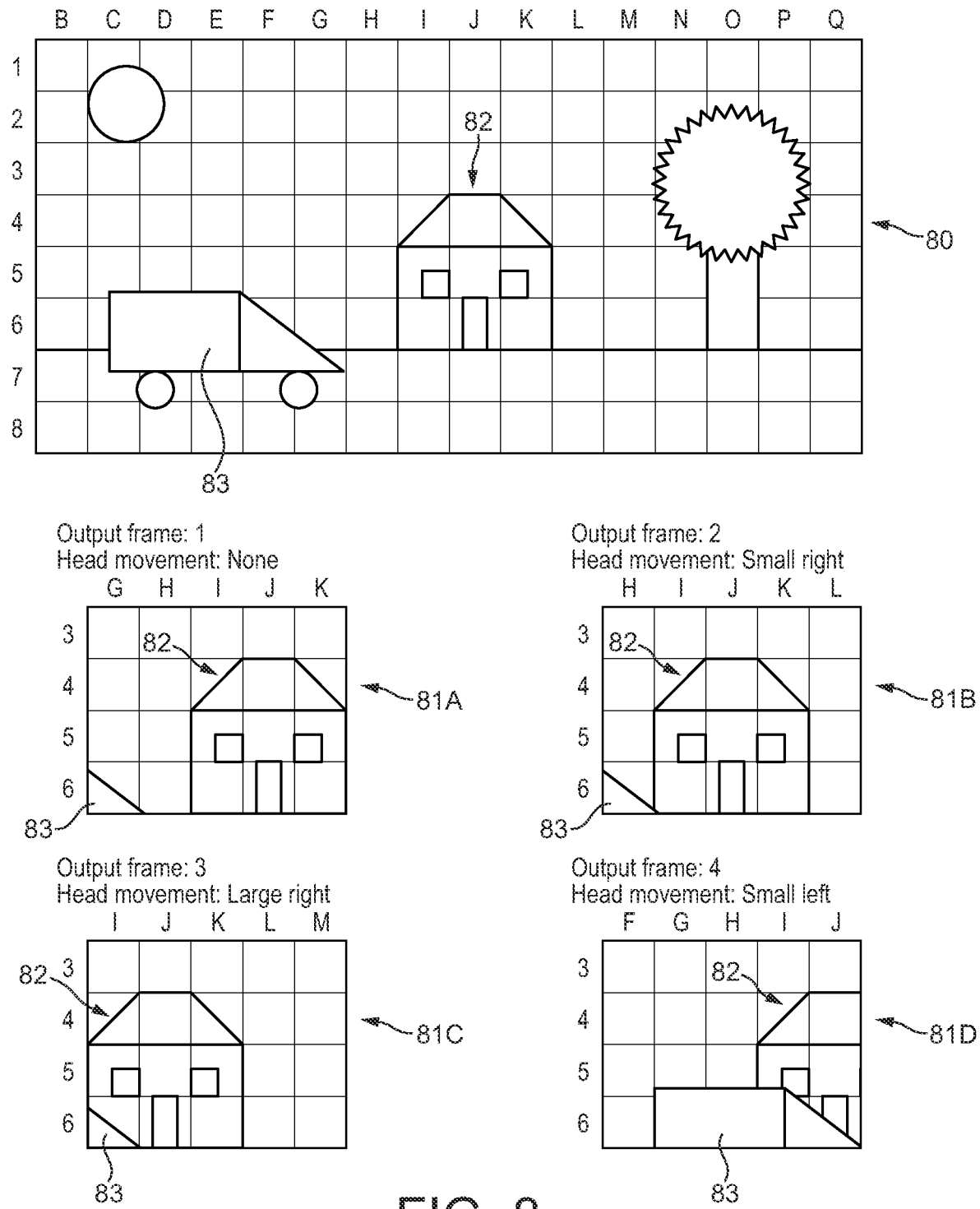
FIG. 8 illustrates an exemplary rendered "application" frame together with exemplary "timewarped" and "spacewarped" versions of that frame.

FIG. 8 illustrates this process and shows the same dynamic scene as shown in FIG. 7, i.e. comprising a number of objects including static house 82, and moving car 83. As in the example of FIG. 5, in the example of FIG. 8, (first) head orientation (pose) data is initially sensed, and then the graphics processing unit (GPU) 4 renders an application frame 80 representing a view of the scene based on that head orientation (pose) data. Thus, application frame 80 represents a "snapshot" of the dynamic scene at the point in time that the (first) head orientation (pose) data was sensed. In this "snapshot" of the dynamic scene, moving car 83 appears to the left of static house 82.

Then, in this example, as in the example of FIG. 5, the application frame 80 is subjected to four "timewarp" processes to generate four respective output frames 81A-D for display at successive time intervals, while a new application frame is being rendered by the graphics processing unit (GPU) 4. However, in contrast with the example of FIG. 5, the "timewarp" processing in the example shown in FIG. 8 is performed on the basis of extrapolated moving object positions according to "spacewarp" processing. Thus, in the example of FIG. 8, each output frame for display 81A-D represents a "timewarped" and "spacewarped" updated view of application frame 80.

Thus, after application frame 80 has been rendered and before an image is actually displayed on the head mounted display 13, further head orientation (pose) data is sensed. As shown in FIG. 8, as in the example of FIG. 5, the further head orientation (pose) data indicates that no change in the user's head orientation has occurred since the original head orientation (pose) data was sensed at the beginning of the graphics processing unit (GPU) 4 rendering the application frame 80. First output frame 81A therefore represents an appropriate window ("letterbox") taken from the wider field of view of the application frame 80, and no "timewarp" transformation has been performed. However, car 83 is determined to be moving, and its position in output frame 81A is thus extrapolated based on its motion by "spacewarp" processing, such that car 83 appears in output frame 81A at the position that it is expected to be at the point in time that the output frame 81A represents a view of the scene at. Thus, in this example, due to the left to right motion of car 83, moving car 83 appears closer to static house 82 in output frame 81A that it appeared in application frame 80.

Then, after the (first) further head orientation (pose) data is sensed, second further head orientation (pose) data is sensed and used to transform the application frame 80 again to generate a second output frame 81B for display.

In the example shown in FIG. 8, as in the example shown in FIG. 5, the second further head orientation (pose) data indicates that the user's head has made a small movement (rotation) to the right, compared to when the original head orientation (pose) data was sensed at the beginning of the graphics processing unit (GPU) 4 rendering the application frame 80. Second output frame 81B therefore represents an appropriate window ("letterbox") taken from the wider field of view of the application frame 80, but has been subjected to a "timewarp" transformation such that, compared to first output frame 81A where no head movement was detected, column L of application frame 80 has become visible, while column G is no longer visible. The effect of this is that static house 82 appears shifted to the left in the second output frame 81B (compared to the first output frame 81A) as a result of the small right head movement. Furthermore, as a result of the "spacewarp" processing, moving car 83 appears closer to static house 82 in output frame 81B than it appeared in earlier output frame 81A.

Third (81C) and then fourth (81D) output frames are then generated in a similar manner, i.e. each based on updated further head orientation (pose) data and an updated expected (extrapolated) position of moving car 83. Thus, as shown in FIG. 8, as in the example of FIG. 5, when a larger head movement to the right is detected compared to the "original" head orientation, static house 82 appears shifted farther to the left in output frame 81C; and when a head movement to the left is detected compared to the "original" head orientation, static house 82 appears shifted to the right in output frame 81D (compared to the first output frame 81A where no head movement was detected). Furthermore, as a result of the "spacewarp" processing, moving car 83 appears to pass in front of static house 82 in output frames 81C and 81D.

Figure 9:
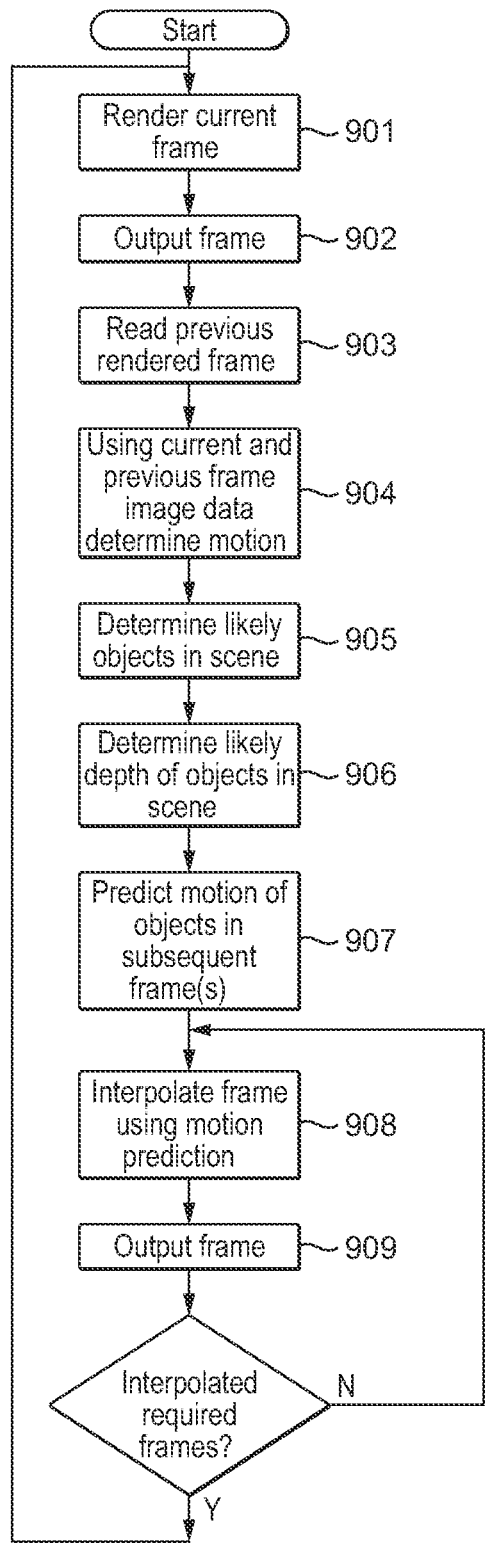
FIG. 9 is a flowchart showing schematically an example of a graphics processing system performing "spacewarp" processing.

FIG. 9 schematically illustrates the steps of a typical "spacewarp" process. As shown in FIG. 9, at step 901, a current application frame is rendered by the GPU 4, which is provided to display 13 for display at step 902. Step 902 typically includes "timewarping" the application frame such that an appropriately "timewarped" output frame is displayed on the display 13. Steps 903-909 may then be performed to generate one or more extrapolated ("spacewarped") frames from the current and previous rendered application frame while the GPU 4 is rendering the next application frame for display.

Thus, at step 903 the previous application frame rendered by the GPU 4 is read from memory 12, and at steps 904-907 image data from the current and previous application frames is processed to determine the motion of any objects shown in the current frame. This involves processing the image data to determine any motion between the current and previous application frames at step 904, determining likely objects shown in the current application frame by processing image data at step 905, determining the likely depths of the objects shown in the current application frame by processing image data at step 906, and predicting the motion of the objects shown in the current application frame at step 907 based on the image data processing.

Once the current object motion has been determined, it is used at step 908 to generate an extrapolated ("spacewarped") frame by extrapolating (interpolating) the object motion from the current application frame. The extrapolated ("spacewarped") frame is then provided to display 13 for display at step 909. Step 909 typically includes "timewarping" the extrapolated frame such that an appropriately "timewarped" and "spacewarped" output frame is displayed on the display 13. Step 909 may also or instead include a lens distortion correction and/or a chromatic aberration correction. The transformation and/or correction processing may be performed by the GPU 4 or display processor 5.

As shown in FIG. 9, steps 908 and 909 may be repeated one or more times to generate one or more further extrapolated ("spacewarped" (and "timewarped")) frames for display based on the current application frame and the determined object motion. Thus, 1, 2, 3, 4 or more than 4 "spacewarped" and/or "timewarped" frames may be generated and displayed for each GPU 4 rendered application frame. The rate of frames being updated on the display 13 may accordingly be greater than the rate of the GPU 4 rendering application frames.

As shown in FIG. 9, the entire process may be repeated by looping back to step 901 and generating the next application frame.

Figure 10:
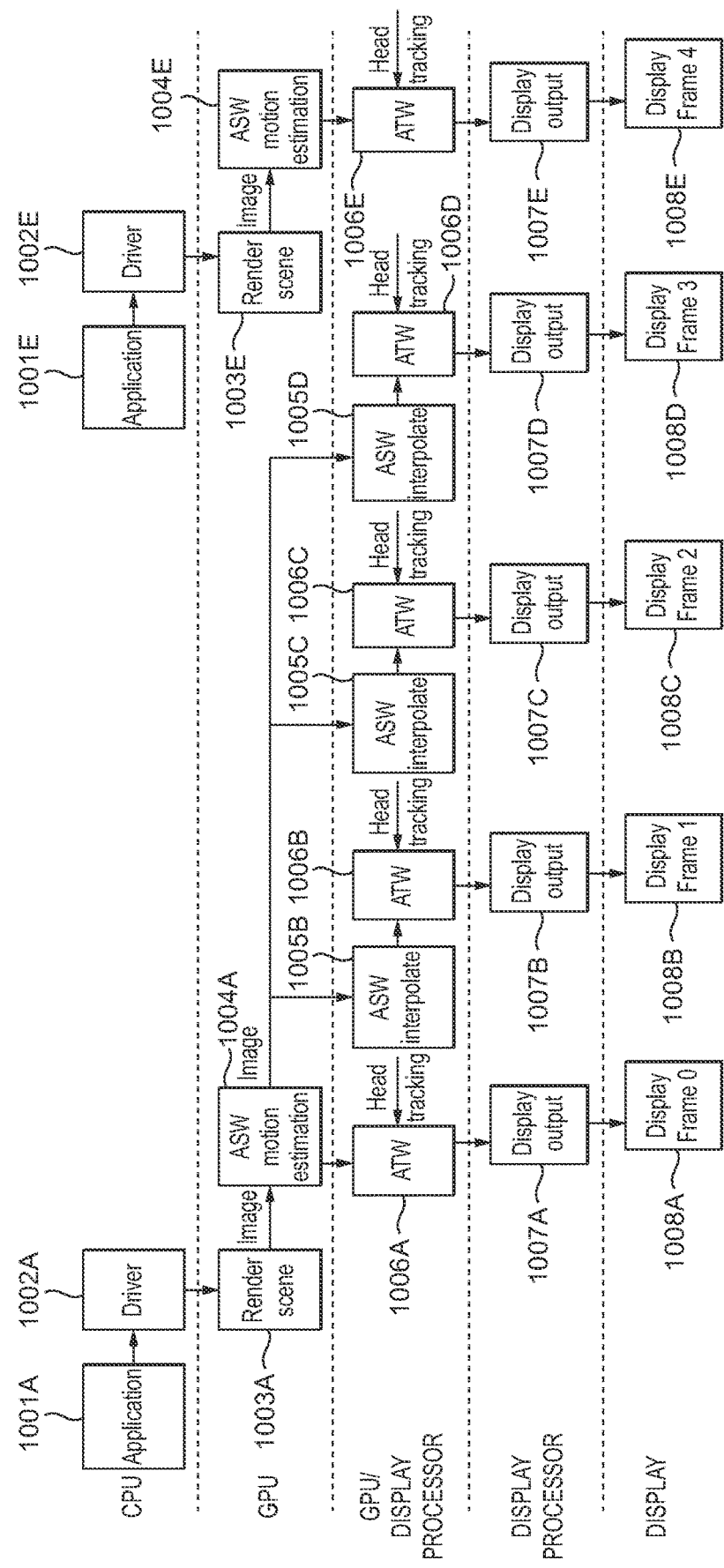
FIG. 10 shows schematically the flow of data in a graphics processing system operating according to the example of FIG. 9.

FIG. 10 illustrates schematically a corresponding flow of data within the graphics processing system. Block 1001A of FIG. 10 represents an application that is executing on the CPU 2 which requires graphics processing from the GPU 4, in the form of a frame to be displayed. The application therefore sends appropriate commands and data to a driver for the GPU 4 that is running on the host processor 2 (block 1002A).

The driver then sends appropriate commands and data to the GPU 4 to cause the GPU 4 to generate the render output required by the application (block 1003A). In the present example, the commands sent to the GPU 4 cause the GPU 4 to render a set of primitives to generate an application frame.

Image data generated for the rendered application frame is then subjected to "spacewarp" (ASVV) motion estimation (block 1004A) to determine the motion of any objects shown in the rendered application frame. As discussed above, this typically also involves processing image data generated for the previously rendered application frame.

In the example shown in FIG. 10, four output versions of the application frame are then displayed on the display, before the GPU 4 has finished rendering the next application frame.

Thus, at block 1006A, the rendered application frame image data is subjected to a first "timewarp" (ATVV) process based on head tracking information at a first point in time to generate a first output "timewarped" frame. The display processor 5 then provides the first "timewarped" frame to the display 13 for display (block 1007A), and the image is displayed on the display 13 (block 1008A).

As shown in FIG. 10, the "timewarp" (ATW) processing can be performed either by the GPU 4 or by the display processor 5. When the "timewarp" (ATW) processing is performed by the GPU 4, the "timewarped" image is provided from the GPU 4 to the display controller 5 for output. Alternatively, when the display controller 5 performs the "timewarp" (ATVV) processing, the application frame is provided to the display controller 5, which then performs the "timewarp" (ATVV) processing and provides the "timewarped" frame for output.

Then, at block 1005B, the image data of the application frame and the object motion determined at block 1004A are used to generate an extrapolated ("spacewarped") version of the application frame representing a view of the scene at a second, later point in time. Then, at block 1006B, the extrapolated ("spacewarped") frame is subjected to a second "timewarp" (ATVV) process based on head tracking information to generate a second output "timewarped" and "spacewarped" frame. The display processor 5 then provides the second "timewarped" and "spacewarped" frame to the display 13 for display (block 1007B), and the image is displayed on the display 13 (block 1008B).

In this example, these steps are repeated to generate and display third and fourth "timewarped" and "spacewarped" frames based on the current application frame (at blocks 1005C-1008C, and 1005D-1008D), before the entire process is repeated based on the next application frame rendered by the GPU 4 (at blocks 1001E-1008E).

In this way, a sequence of output "timewarped" and/or "spacewarped" frames (images) is displayed on the display 13. It will be appreciated that the process will typically be performed for each eye, such that a sequence of frames representing the scene as seen from the left eye is generated, and a sequence of frames representing the scene as seen from the right eye is generated. The frames will then be displayed to each eye appropriately using the head mounted display 13 so as to provide a three-dimensional effect when the images are viewed.

Figure 11:
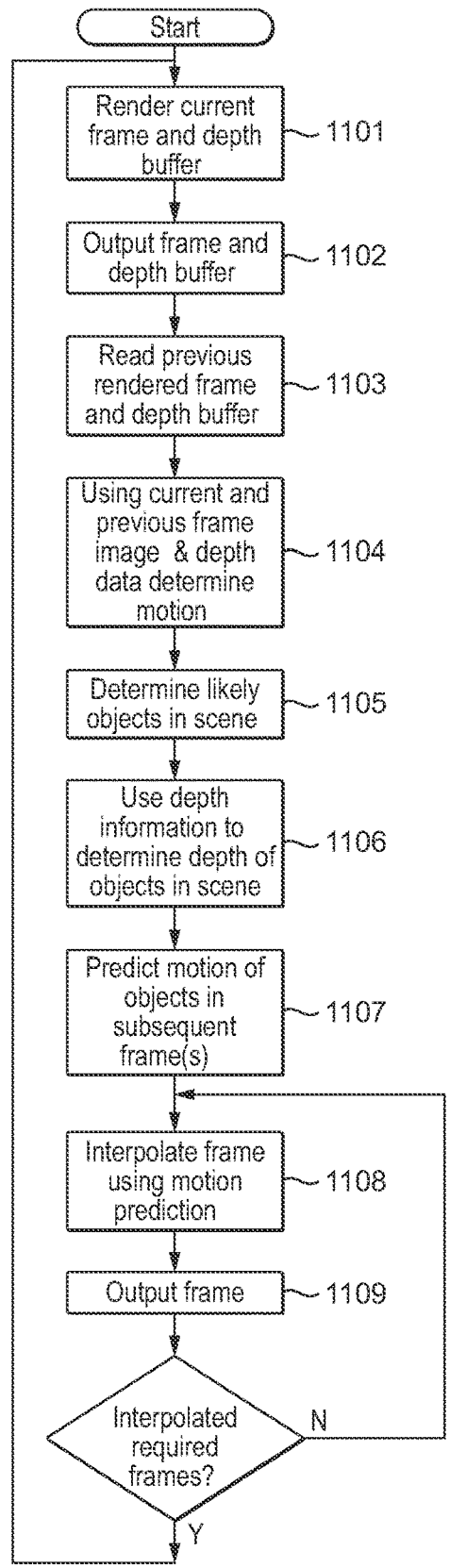
FIG. 11 is a flowchart showing schematically an example of a graphics processing system performing "spacewarp" processing.

FIG. 11 schematically illustrates the steps of a "spacewarp" process that makes use of additional depth information when determining object motion, which can reduce the processing requirements as compared to the "spacewarp" process described above with reference to FIGS. 9 and 10. The "spacewarp" process illustrated in FIG. 11 is broadly similar to the process described above in relation to FIG. 9, and the following description will focus on the main differences.

As shown in FIG. 11, at step 1101, GPU 4 renders image data to a frame buffer and depth data to a depth (Z-) buffer for a current application frame. At step 1102, the rendered image data is provided to display 13 for display. Step 1102 typically includes "timewarping" the application frame image data such that an appropriately "timewarped" output frame is displayed on the display 13. The depth data is also output and written to main memory 12. Steps 1103-1109 may then be performed to generate one or more extrapolated ("spacewarped") frames from the current and previous rendered application frame data while the GPU 4 is rendering the next application frame for display.

Thus, at step 1103 image data and depth data for the previous application frame rendered by the GPU 4 is read. At steps 1104-1107 the image data and the depth data for the current and previous application frames is processed to determine the motion of any objects shown in the current frame. This involves processing the image data to determine any motion between the current and previous application frames at step 1104, determining likely objects shown in the current application frame by processing the image data at step 1105, determining depths of objects shown in the current application frame using the depth data at step 1106, and predicting the motion of objects based on the image and depth data processing at step 1107.

Once the object motion has been determined, it is used at step 1108 to generate an extrapolated ("spacewarped") frame by extrapolating (interpolating) object motion from the current application frame. The extrapolated ("spacewarped") frame is then provided to display 13 for display at step 1109. Step 1109 typically includes "timewarping" the extrapolated frame such that an appropriately "timewarped" and "spacewarped" output frame is displayed on the display 13.

As shown in FIG. 11, steps 1108 and 1109 may be repeated one or more times to generate one or more further extrapolated ("spacewarped" (and "timewarped")) frames for display based on the current application frame and the determined object motion. The entire process may then be repeated by looping back to step 1101 and generating the next application frame.

Figure 12:
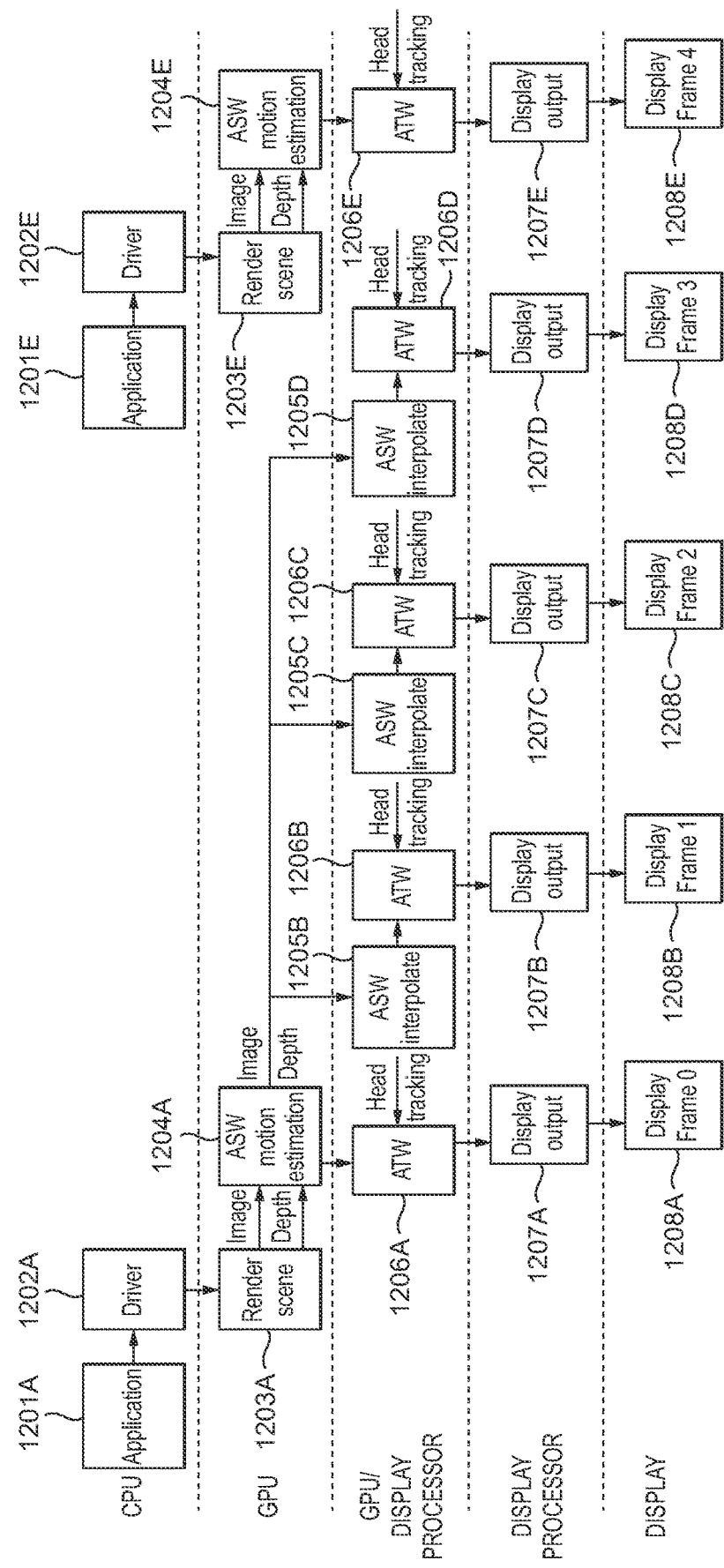
FIG. 12 shows schematically the flow of data in a graphics processing system operating according to the example of FIG. 11.

FIG. 12 illustrates schematically a corresponding flow of data within the graphics processing system for the "spacewarp" process of FIG. 11. Block 1201A of FIG. 12 represents an application that is executing on the CPU 2 which requires graphics processing from the GPU 4, in the form of a frame to be displayed. The application sends appropriate commands and data to a driver for the GPU 4 that is running on the host processor 2 (block 1202A).

The driver then sends appropriate commands and data to the GPU 4 to cause the GPU 4 to generate the render output required by the application (block 1203A). In the present example, the commands sent to the GPU 4 cause the GPU 4 to render the scene to generate an application frame and to output image data and depth data for the application frame to main memory 12.

The image and depth data for the rendered application frame is then subjected to "spacewarp" motion estimation (block 1204A) to determine the motion of any objects shown in the rendered application frame. This also involves processing image and/or depth data for the previously rendered application frame.

In the example shown in FIG. 12, four output versions of the application frame are then displayed on the display, before the GPU 4 has finished rendering the next application frame.

Thus, at block 1206A, the rendered application frame image data is subjected to a first "timewarp" (ATVV) process based on head tracking information at a first point in time to generate a first output "timewarped" frame. The display processor 5 then provides the first "timewarped" frame to the display 13 for display (block 1207A), and the image is displayed on the display 13 (block 1208A).

Then, at block 1205B, the image and depth data for the application frame and the object motion determined at block 1204A are used to generate an extrapolated ("spacewarped") version of the application frame representing a view of the scene at a second, later point in time. Then, at block 1206B, the extrapolated ("spacewarped") frame is subjected to a second "timewarp" (ATVV) process based on head tracking information to generate a second output "timewarped" and "spacewarped" frame. The display processor 5 then provides the second "timewarped" and "spacewarped" frame to the display 13 for display (block 1207B), and the image is displayed on the display 13 (block 1208B).

In this example, these steps are repeated to generate and display third and fourth "timewarped" and "spacewarped" frames based on the current application frame (at blocks 1205C-1208C, and 1205D-1208D), before the entire process is repeated based on the next application frame rendered by the GPU 4 (at blocks 1201E-1208E).

Figure 13:
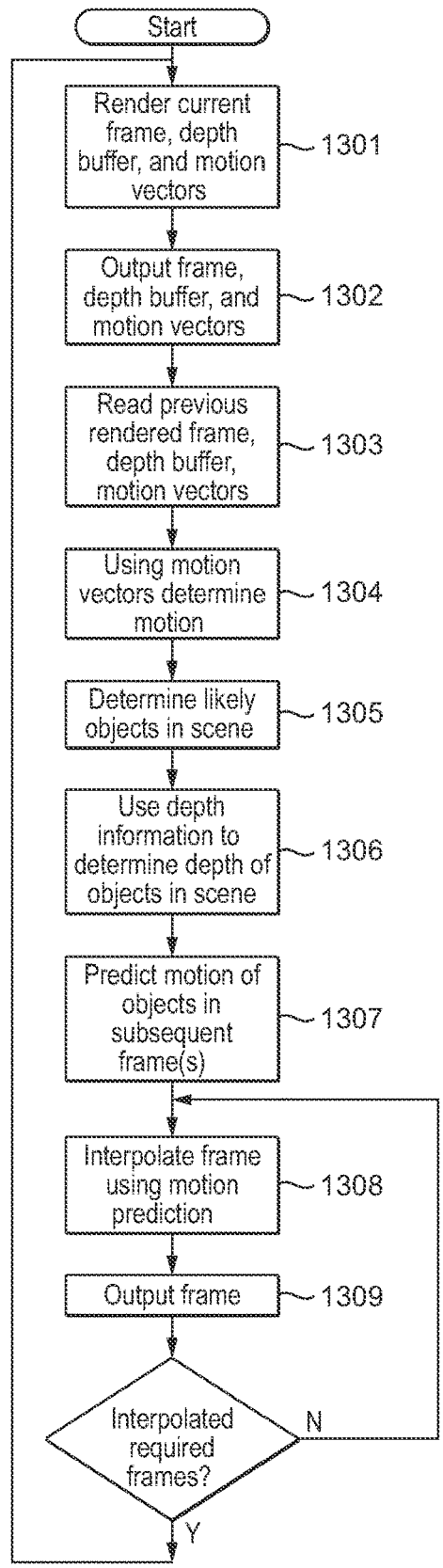
FIG. 13 is a flowchart showing schematically a graphics processing system operating according to an embodiment of the technology described herein.

FIG. 13 schematically illustrates a process for generating one or more extrapolated ("spacewarped") frames from a GPU 4 rendered application frame, according to an embodiment. The process illustrated in FIG. 13 has a number of similarities with the processes described above in relation to FIGS. 9 and 11, and the following description will focus on the main differences.

As shown in FIG. 13, as in the process of FIG. 11, GPU 4 renders image data to a frame buffer and depth data to a depth buffer for a current application frame at step 1301. In contrast with the process of FIG. 11, step 1301 also includes determining motion vectors representing the motion of primitives rendered for the application frame.

The motion vectors can be determined in any suitable manner, however in the present embodiment, as will be discussed further below in relation to FIGS. 15A, 15B and 16, the GPU 4 renders image data using a checkerboard rendering process which involves the motion vectors being determined by tracking the movement of primitives from the previous GPU 4 rendered application frame to the current application frame. Thus, each motion vector is determined as part of the checkerboard rendering process, and represents how a primitive rendered for the current application frame moved from the previous application frame to the current applications frame. The motion vectors are used in the checkerboard rendering process to determine "missing" image data for the rendered frame.

As discussed above, the Applicants have found that this motion vector information, which is already, in effect, "freely available" when performing checkerboard rendering, can be advantageously also used for determining object motion in "spacewarp" processing. In particular, using primitive motion vector information can allow a more accurate determination of object motion while reducing the overall processing requirements.

In other embodiments, e.g. where checkerboard rendering is not performed, the motion vectors may be provided specifically for the purposes of performing "spacewarp" processing, e.g. by the application. The Applicants have found that even where motion vectors are not, in effect, "freely available", it may still be advantageous to provide motion vectors for the purposes of performing "spacewarp" processing.

At step 1302, the rendered image data is provided to display 13 for display. Step 1302 includes "timewarping" the application frame image data such that an appropriately "timewarped" output frame is displayed on the display 13. The depth data and motion vector data is also output and stored in main memory 12. Steps 1303-1309 are then performed to generate one or more extrapolated ("spacewarped") versions of the current rendered application frame, while the GPU 4 is rendering the next application frame for display.

At step 1303 image data for the previous application frame rendered by the GPU 4 is read from the previous frame buffer, together with depth data from the previous depth buffer. Motion vectors for the previous application frame, representing the motion of primitives rendered for the previous application frame, may also be read.

At step 1304-1307 the motion of any objects shown in the current application frame is determined. This involves assigning motion indicated by the primitive motion vectors to objects shown in the current application frame. Thus, at step 1304, the primitive motion vectors are used to determine any motion in the current application frame. At step 1305, objects shown in the current application frame are determined (identified), which may involve processing the image data for the current application frame to detect objects. At step 1306, the depths of objects shown in the current application are determined using the depth data. At step 1307, the motion of objects shown in the current application frame is predicted based on the above processing.

As discussed above, the Applicants have found that depth information can be used to provide additional information regarding which primitives (motion vectors) are associated with which objects in the scene. For example, primitives that have the same or similar depths are likely to be associated with the same object. Thus, depth data can assist in assigning motion vectors to objects in "spacewarp" object motion determination. Furthermore, this depth information may again be already, in effect, "freely" available, for example in a deferred rendering system.

Once the object motion has been determined, it is used at step 1308 to generate an extrapolated ("spacewarped") frame by extrapolating (interpolating) object motion from the current application frame. In the present embodiment, this is done by the graphics processing unit (GPU) 4. However, in other embodiments, as will be discussed further below, this involves the neural network processing unit (NPU) 3 executing a neural network.

The extrapolated ("spacewarped") frame is then provided to display 13 for display at step 1309. Step 1309 includes "timewarping" the extrapolated frame such that an appropriately "timewarped" and "spacewarped" output frame is displayed on the display 13.

As shown in FIG. 13, steps 1308 and 1309 may be repeated one or more times to generate one or more further "spacewarped" and/or "timewarped" frames for display based on the current application frame and the determined object motion. The entire process may then be repeated by looping back to step 1301 and generating the next application frame.

Figure 14:
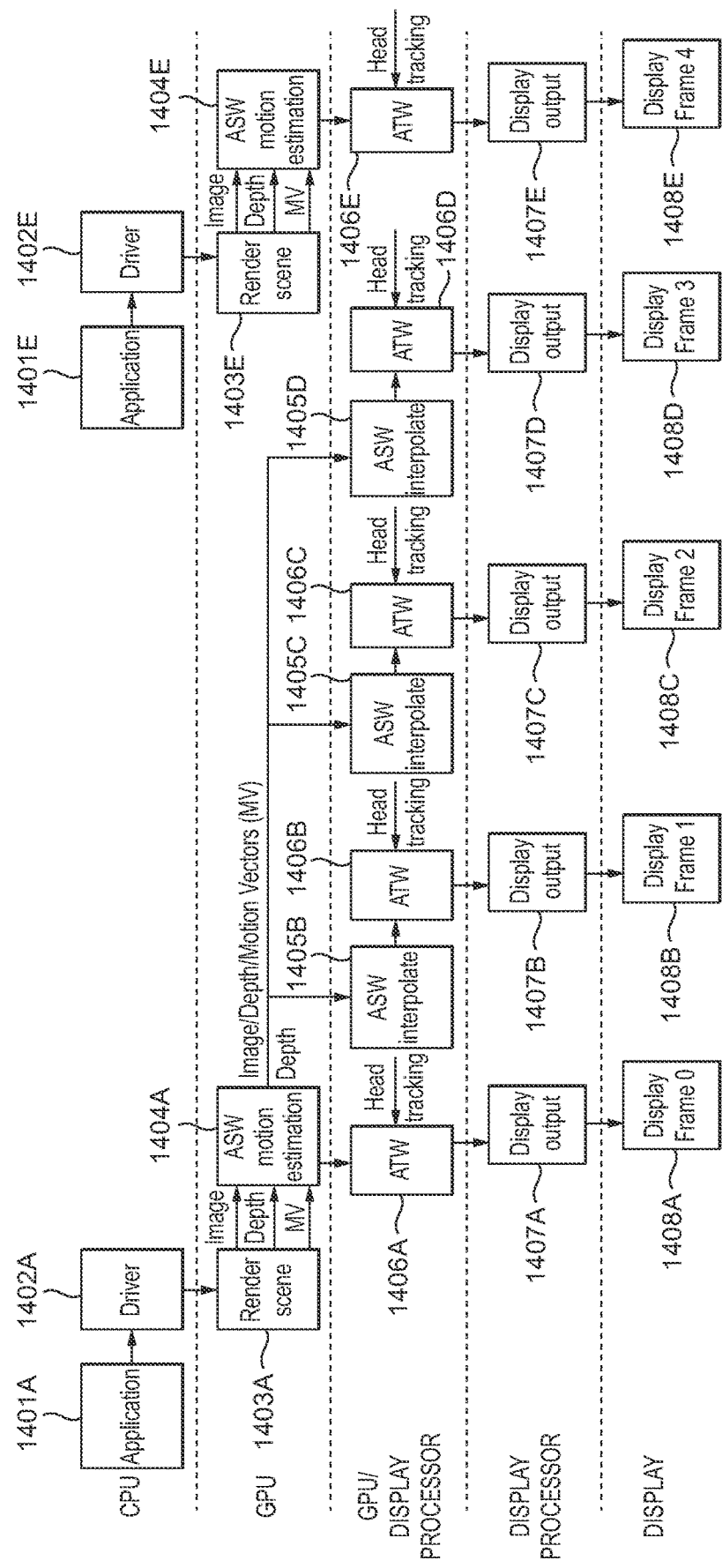
FIG. 14 shows schematically the flow of data in a graphics processing system operating according to the embodiment of FIG. 13.

FIG. 14 illustrates schematically a corresponding flow of data within the graphics processing system, according to an embodiment. Block 1401A of FIG. 14 represents an application that is executing on the CPU 2 which requires graphics processing from the GPU 4, in the form of a frame to be displayed. The application sends appropriate commands and data to a driver for the GPU 4 that is running on the host processor 2 (block 1402A).

The driver then sends appropriate commands and data to the GPU 4 to cause the GPU 4 to generate the render output required by the application (block 1403A). In the present embodiment, the commands sent to the GPU 4 cause the GPU 4 to render the scene to generate an application frame, and to output image data, depth data and primitive motion vectors for the application frame to main memory 12. The application frame is rendered using checkerboard rendering, and the primitive motion vectors are the motion vectors used in the checkerboard rendering process to determine "missing" regions of the application frame, e.g. as discussed above. Thus, at least some image data for the application frame is generated based on the primitive motion vectors.

The image data, depth data and motion vectors for the rendered application frame is then subjected to motion estimation (block 1404A) to determine the motion of any objects shown in the rendered application frame. This may also involve processing image data and/or depth data and/or motion vectors for the previously rendered application frame.

In the embodiment shown in FIG. 14, four output versions of the application frame are then displayed on the display, before the GPU 4 has finished rendering the next application frame.

Thus, at block 1406A, the rendered application frame image data is subjected to a first "timewarp" (ATVV) process based on head tracking information at a first point in time to generate a first output "timewarped" frame. The display processor 5 then provides the first "timewarped" frame to the display 13 for display (block 1407A), and the image is displayed on the display 13 (block 1408A).

Then, at block 1405B, an extrapolated ("spacewarped") version of the application frame representing a view of the scene at a second, later point in time, is generated based on the motion determined at block 1404A. Then, at block 1406B, the extrapolated ("spacewarped") frame is subjected to a second "timewarp" (ATVV) process based on head tracking information to generate a second output "timewarped" and "spacewarped" frame. The display processor 5 then provides the second "timewarped" and "spacewarped" frame to the display 13 for display (block 1407B), and the image is displayed on the display 13 (block 1408B).

In this embodiment, these steps are repeated to generate and display third and fourth "timewarped" and "spacewarped" frames based on the current application frame (at blocks 1405C-1408C, and 1405D-1408D), before the entire process is repeated based on the next application frame rendered by the GPU 4 (at blocks 1401E-1408E).

In this way, a sequence of output "timewarped" and/or "spacewarped" frames is displayed on the display 13. The process, in this embodiment, is performed for each eye such that a sequence of frames representing the scene as seen from the left eye is generated, and a sequence of frames representing the scene as seen from the right eye is generated. The frames are then displayed to each eye appropriately using the head mounted display 13 so as to provide a three-dimensional effect when the images are viewed.

As discussed above, in the present embodiment the primitive motion vectors are provided as part of a checkboard rendering (CBR) process for rendering application frames.

Figure 15A:
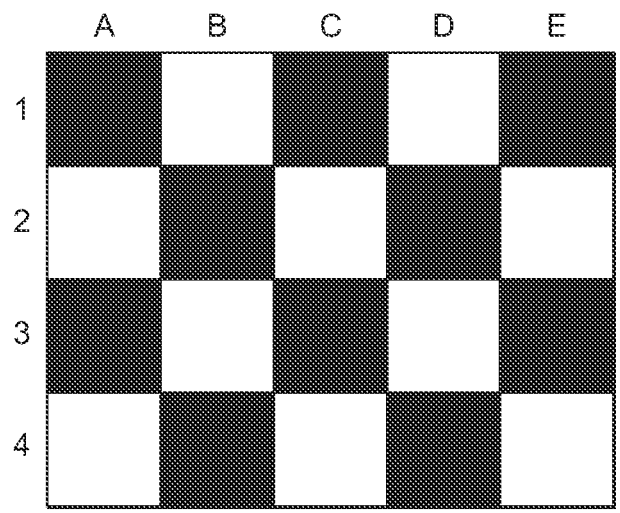
FIGS. 15A and 15B show schematically a checkerboard rendering process in accordance with an embodiment of the technology described herein.
Figure 15B:
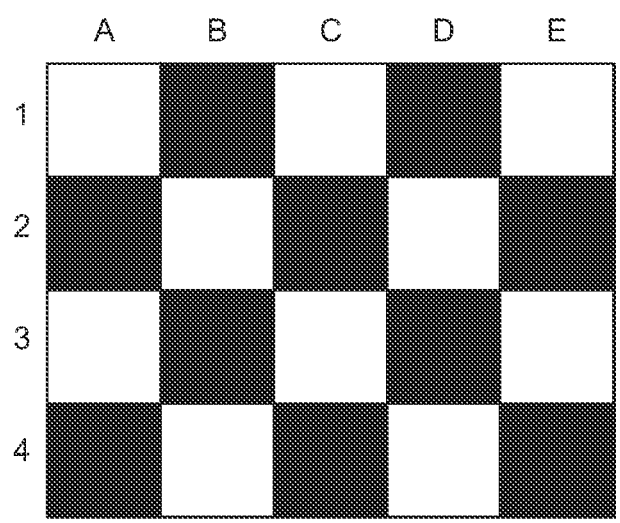

FIGS. 15A and 15B illustrate an example of checkerboard rendering, in accordance with the present embodiment. In this embodiment, for any given frame, data is newly generated in respect of only half of a set of blocks defining a checkerboard pattern within the frame. In the next frame, data is newly generated in respect of the other half of the blocks. Each block may comprise, e.g. 2×2 pixels.

FIGS. 15A and 15B show, for alternate frames, the areas within the frame in respect of which data is newly generated in black. Thus, for first and second successive frames, the areas within the frame for which data is newly generated will be as shown in FIGS. 15A and 15B respectively. For the next frame, the areas for which data is newly generated will be as shown in FIG. 15A again. For the next frame, the areas for which data is newly generated will be as shown in FIG. 15B, and so on. Accordingly, in alternative frames, data is newly generated in respect of "odd" and "even" blocks. This may reduce the data generating effort required for a given frame by half.

For any given frame, data for those areas of the frame in respect of which data is not newly generated for that frame is derived based on data from the preceding frame. Thus, in FIG. 15B, the data for the white blocks can be derived based on the data for the corresponding black blocks of the previous frame shown in FIG. 15A, for example. The data is derived by interpolation based on tracking the movement of primitives between the frames. This is achieved by recording the identity of individual primitives within a frame, to enable the objects to be tracked as they move between frames. Such functionality is provided by modern APIs, such as Vulcan.

It will be appreciated that checkerboard rendering may be performed at a different level of quality to that illustrated in FIGS. 15A and 15B. For example, data can be newly generated in relation to a smaller or greater fraction of the blocks than a half. For example, data may be generated in relation to one third of the blocks. In such arrangements, data will only be newly generated in respect of a given block every three frames, with data for the block in the intervening frames being obtained based upon the last newly generated data for that block.

Figure 16:
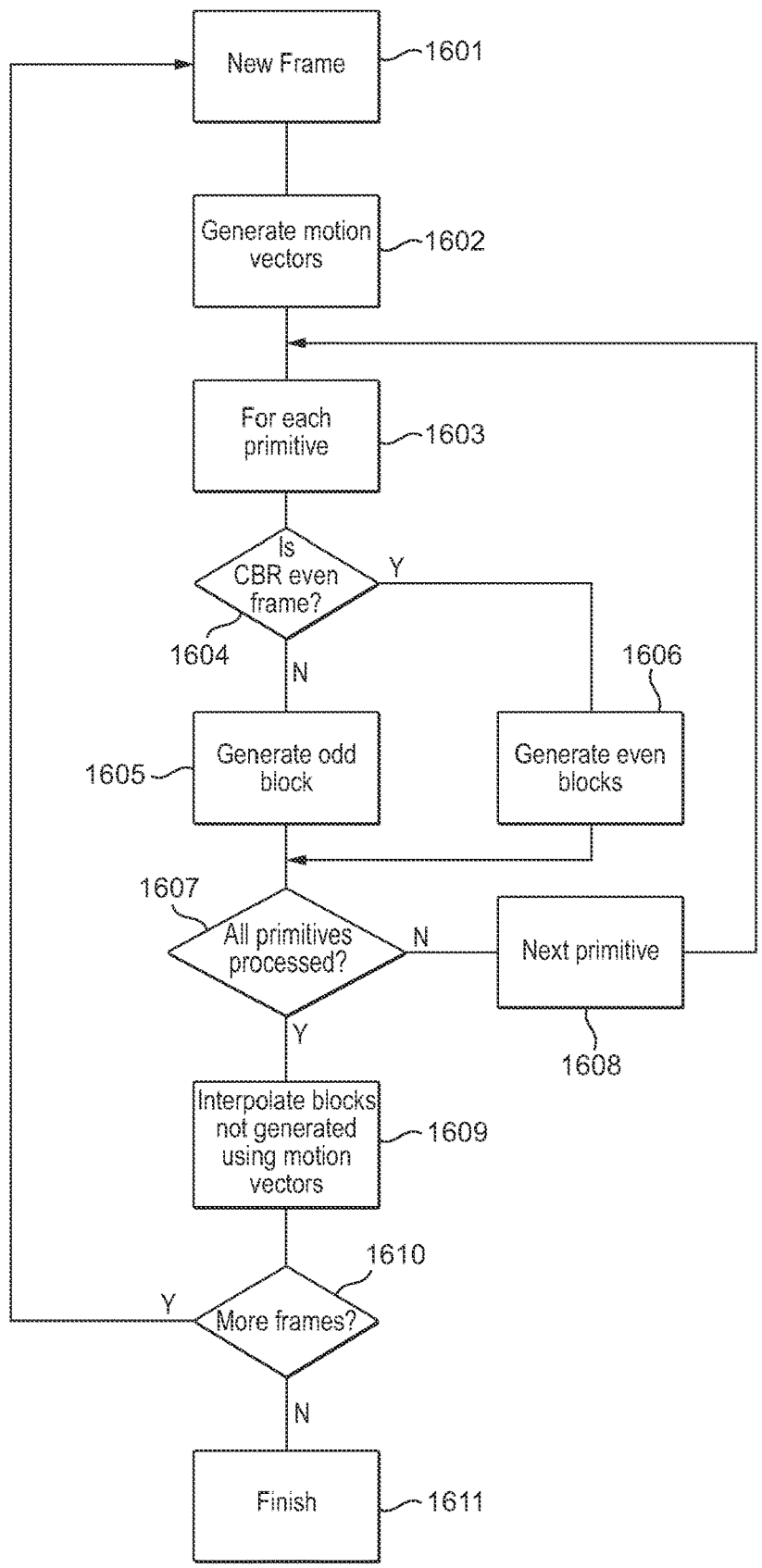
FIG. 16 is a flowchart showing a checkerboard rendering process in accordance with an embodiment of the technology described herein.

FIG. 16 is a flowchart illustrating the checkerboard rendering technique, according to the present embodiment. This embodiment involves immediate mode rendering, in which rendering is performed on primitives in turn, as they are received for processing. However, in other embodiments, deferred, tile-based rendering is performed.

In step 1601, the graphics processing system receives a new application frame to be rendered. In step 1602 the system generates motion vectors in respect of primitives that will appear in the frame. The motion vectors are generated based on tracking the movement of primitives between application frames. The identity of each individual primitive is recorded to enable the primitives to be tracked between frames. The generation of motion vectors for each primitive may be performed by the CPU 2 or GPU 4.

Each primitive in the frame is then considered in turn (step 1603). For each primitive, the following steps are performed. In step 1604 it is determined whether the application frame in question is an "odd" or "even" frame for the purposes of checkerboard rendering (CBR), i.e. a frame for which data is to be newly generated in respect of blocks corresponding to "black" or "white" regions of a checkboard pattern. Where the frame is not an even frame, the method proceeds to step 1605, in which image data is newly generated for the odd blocks of the checkerboard pattern that the primitive covers. Where the frame is an even frame, the method proceeds to step 1606, in which image data is newly generated in respect of the even blocks of the checkerboard pattern that the primitive covers.

It is then determined whether all primitives have been processed (step 1607). If not, the next primitive is considered (step 1608), and steps 1603 and 1604, and, as appropriate, step 1605 or step 1606, and then step 1607 are repeated.

Once all primitives have been processed, the method proceeds to step 1609, in which image data is derived for those blocks for which image data was not newly generated in steps 1605 and 1606, i.e. the even or odd blocks, depending whether the application frame was a CBR odd or even frame. The image data for the "missing" blocks is derived based on the image data from the preceding application frame, taking into account the motion vectors generated for the current application frame, i.e. for primitives within the current application frame.

The method then considers whether there are more application frames to be rendered (step 1610). If so, the method returns to step 1601, and repeats the steps in respect of the next application frame. This continues until each application frame has been rendered, at which time the process ends (step 1611).

As discussed above, in embodiments, the "spacewarp" extrapolation (interpolation) process is performed using a neural network executed by the neural network processing unit (NPU) 3 of the graphics processing system. The Applicants have found that neural networks, and in particular convolution neural networks (CNNs), are particularly efficient at this extrapolation task. Moreover, by "offloading" this processing to the neural network processing unit (NPU) 3, the various processing resources of the graphics processing system can be more efficiently utilised.

Figure 17:
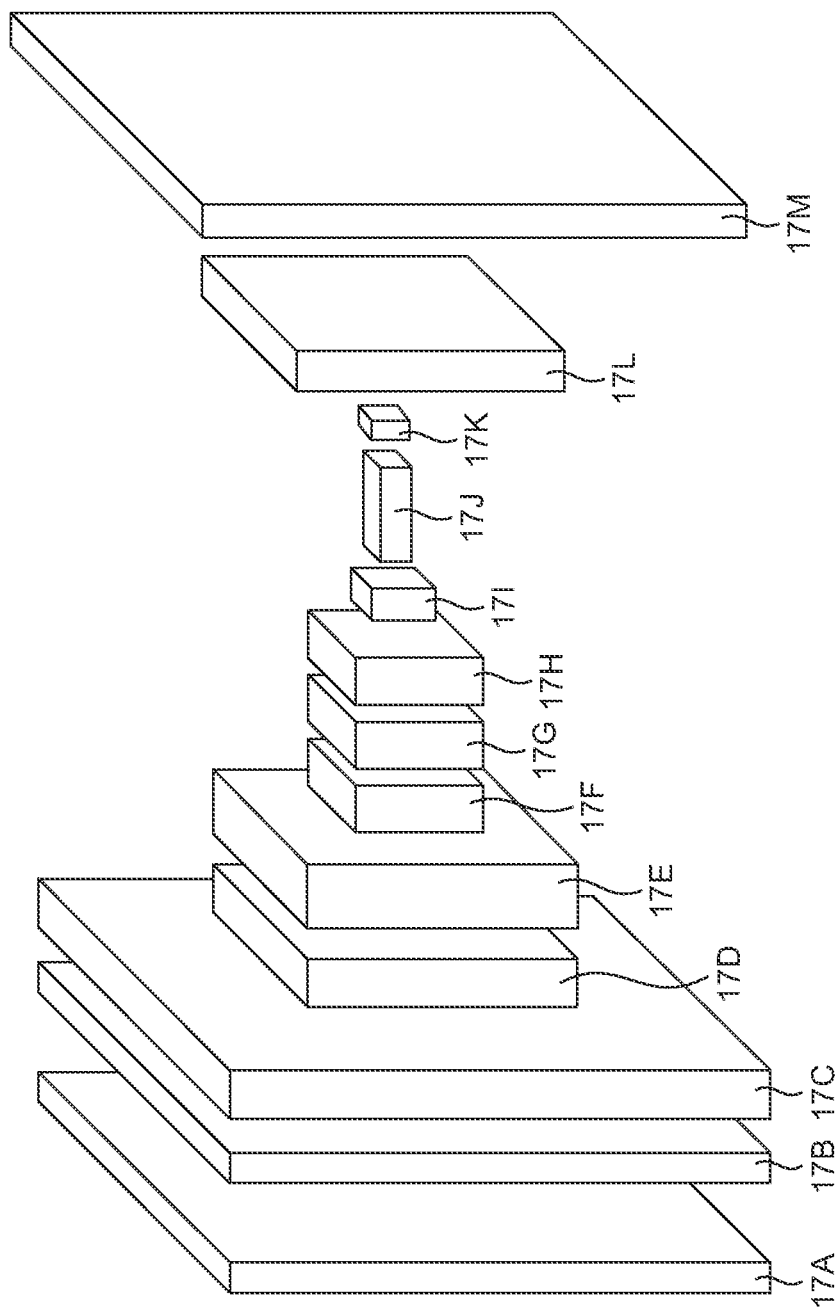
FIG. 17 schematically illustrates a convolutional neural network which may be used in an embodiment of the technology described herein to generate an extrapolated ("spacewarped") frame.

FIG. 17 illustrates a neural network 17 which may be executed by the network processing unit (NPU) 3 to generate a "spacewarped" frame. The neural network may be any suitable type of neural network, but in the present embodiment, the neural network is a convolutional neural network (CNN), which is the type of neural network shown in FIG. 17. The CNN comprises a number of layers 17A-17M which operate one after the other, such that the output data from one layer is used as the input data for a next layer.

The CNN shown in FIG. 17 comprises an input layer 17A. The input layer receives an input data array, and passes that data array on to the next layer of the neural network. The layers 17B-17I shown in FIG. 17 are convolutional and/or pooling layers.

A first layer 17B may comprise a convolutional layer. The convolutional layer may receive data generated by the input layer 17A for use as input data. The first convolutional layer may generate output data comprising an output feature map. The output feature map may comprise a representation of features that were present in the data array that was received by the convolutional layer. The output feature map may be used as the input data (i.e. as an input feature map) for a subsequent layer of neural network processing.

For example, a pooling layer 17C may be provided after a convolutional layer. The pooling (or "downsampling") layer may operate to reduce the size of a data array (e.g. feature map) that is input into the pooling layer. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer).

The neural network may comprise further convolutional layers 17D, 17F, 17G and pooling layers 17E, 17H, 17I.

After the one or more convolutional and/or pooling layers, the CNN may comprise a fully connected (FC) layer 17J. The fully connected layer may operate on a data array (e.g. feature map) generated by the convolutional and/or pooling layers.

Alternatively (although not shown in FIG. 17), the neural network could comprise multiple fully connected layers. In this case the fully connected layers may operate one after the other such that the data that is output from one fully connected layer is used as the input data for a next fully connected layer.

After the one or more convolutional and/or pooling and/or fully connected layers, the CNN may comprise one or more deconvolutional layers 17K, 17L which each operate to increase the size of the data array that is input into the deconvolutional layer, such that an output having a desired output resolution is produced. The final deconvolutional layer 17L may produce a final output data array or output data set which may comprise a useful output, e.g. in the form of image data for an output extrapolated frame.

The final deconvolutional layer 17L passes the useful output to the output layer 17M of the neural network. The output layer 17M comprises a number of processing nodes which receive the useful output data and pass the useful output data on towards other components of the graphics processing system which are outside of the neural network.

Although FIG. 17 shows a certain number of layers, the neural network may comprise fewer or more layers if desired (and may also or instead comprise other layers which operate in a different manner to the convolutional, pooling, FC and deconvolutional layers described herein). Similarly, although FIG. 17 shows an "hourglass" topology in which layer resolution decreases and then increases from input layer 17A to output layer 17M, other topologies may be used, if desired.

As discussed above, the data that is input to the neural network can include image data for an application frame, together with data indicating the motion of objects appearing in the application frame. The input to the neural network may also include depth data, as described above. The output of the neural network can then be image data for a "spacewarped" frame, or data indicating how an application frame is to be transformed to provide a "spacewarped" frame.

However, it is also possible for the input to the neural network to include (also) the primitive motion vectors described above. In this case, the neural network may (also) be operable to determine (itself) the motion of the objects appearing in the application frame. The Applicants have found that neural networks can be particularly efficient at this task. Moreover, "offloading" this processing to the neural network processing unit (NPU) can improve processing resource utilisation.

Furthermore, by performing this processing on the neural network processing unit (NPU), any latency, e.g. caused by the transferring of data between processing resources, can be reduced.

Thus, in embodiments, the neural network is used, not only to extrapolate (interpolate) determined object motion from an application frame, but to also determine the object motion in the first place from the primitive motion vectors.

In further embodiments, the input to the neural network includes (also) head tracking ("ego-motion") information. In this case, the neural network may (also or instead) be operable to perform a "timewarp" transformation based on a change in view orientation ("ego-motion"). Again, the Applicants have found that neural networks can be particularly efficient at this task. Moreover, "offloading" this processing to the neural network processing unit (NPU) can further improve processing resource utilisation. Furthermore, by performing this processing on the neural network processing unit (NPU), any latency, e.g. caused by the transferring of data between processing resources, can be reduced.

Thus, in embodiments, the neural network is used, not only to extrapolate (interpolate) determined object motion from an application frame (and to determine the object motion), but also to perform a "timewarp" transformation to provide an output "spacewarped" and "timewarped" frame for display.

Figure 18:
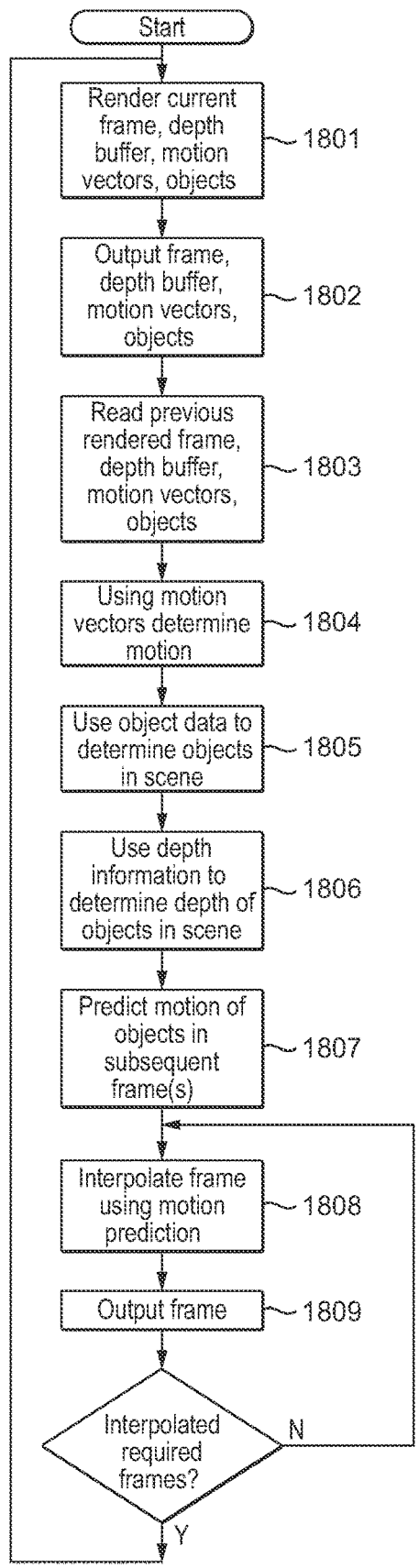
FIG. 18 is a flowchart showing schematically a graphics processing system operating according to an embodiment of the technology described herein.

FIG. 18 schematically illustrates a process for generating one or more extrapolated ("spacewarped") frames from a GPU 4 rendered application frame, according to another embodiment. The process illustrated in FIG. 18 is broadly similar to the process of FIG. 13, and the following description will focus on the main differences.

As shown in FIG. 18, at step 1801, GPU 4 renders image data to a frame buffer and depth data to a depth buffer for a current application frame. As in the embodiment of FIG. 13, motion vectors representing the motion of primitives rendered for the application frame are also determined. In contrast with the embodiment of FIG. 13, additional object metadata indicating which primitives make up (are associated with) which objects is also provided by the application.

At step 1802, the rendered image data is provided to display 13 for display. Step 1802 includes "timewarping" the application frame image data such that an appropriately "timewarped" output frame is displayed on the display 13. The depth data, motion vector data, and object metadata is also output and stored in main memory 12. Steps 1803-1809 are then performed to generate one or more extrapolated ("spacewarped") frames from the current and previous rendered application frame data while the GPU 4 is rendering the next application frame for display.

At step 1803 image data for the previous application frame rendered by the GPU 4 is read from the previous frame buffer, together with depth data from the previous depth buffer. Motion vectors for the previous application frame may also be read, together with data indicating which primitives are associated with which objects in the previous application frame.

At step 1804-1807 the motion of any objects shown in the current application frame is determined. This involves assigning motion indicated by the primitive motion vectors to objects shown in the current application frame. At step 1804, the primitive motion vectors are used to determine any motion in the current application frame. At step 1805, objects shown in the current application frame are determined using the additional metadata indicating which primitives are associated with which objects. This additional metadata can simplify the task of assigning motion to objects, and so further decrease the processing requirements for performing "spacewarp" processing. At step 1806, the depths of objects shown in the current application are determined using the depth data. At step 1807, the motion of objects shown in the current application frame is predicted based on the above processing.

Once the object motion has been determined, it is used at step 1808 to generate an extrapolated ("spacewarped") frame by extrapolating (interpolating) object motion from the current application frame.

The extrapolated ("spacewarped") frame is then provided to display 13 for display at step 1809. Step 1809 includes "timewarping" the extrapolated frame such that an appropriately "timewarped" and "spacewarped" output frame is displayed on the display 13.

As discussed above, steps 1804-1809 may be performed using a neural network.

As shown in FIG. 18, steps 1808 and 1809 may be repeated one or more times to generate one or more further extrapolated ("spacewarped" (and "timewarped")) frames for display based on the current application frame and the determined object motion. The entire process may then be repeated by looping back to step 1801 and generating the next application frame.

Figure 19:
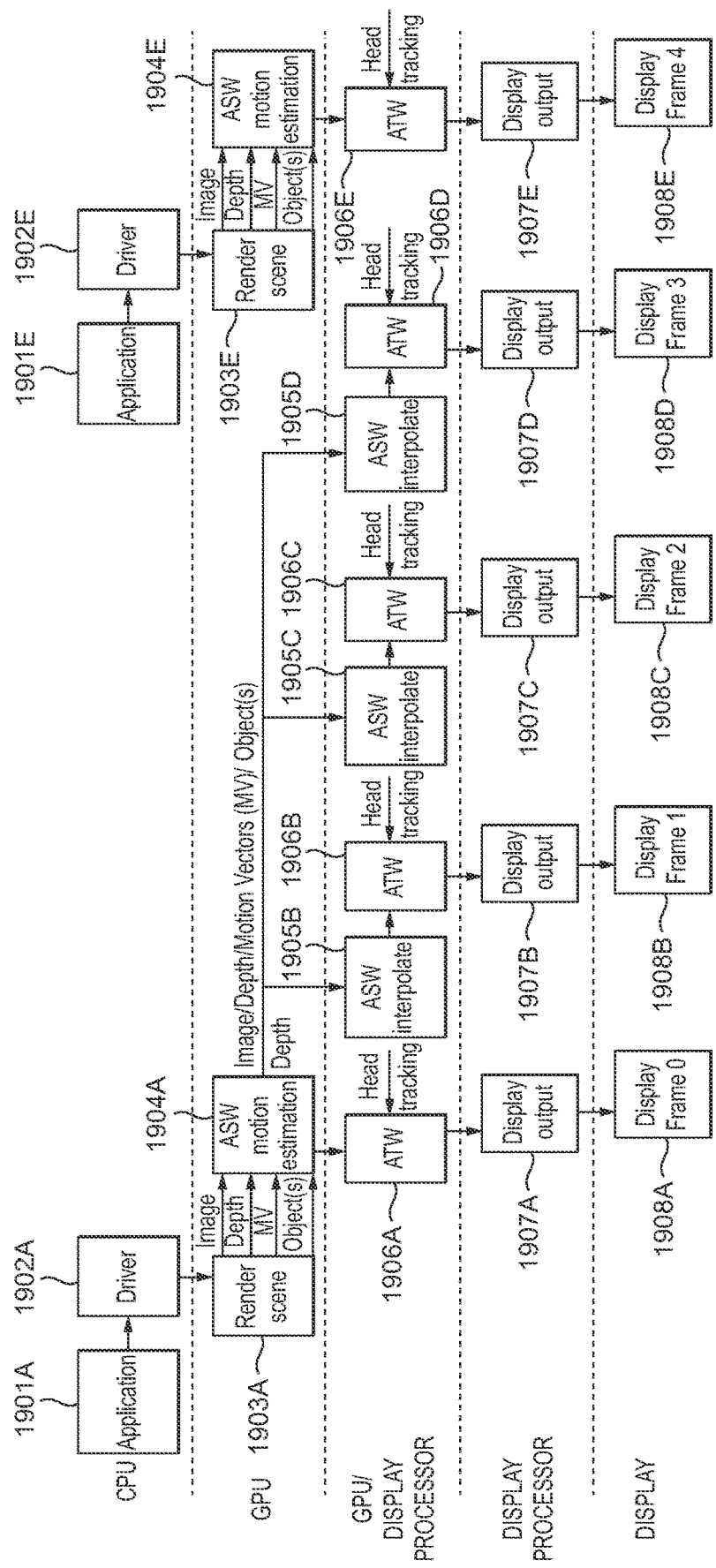
FIG. 19 shows schematically the flow of data in a graphics processing system operating according to the embodiment of FIG. 18.

FIG. 19 illustrates schematically a corresponding flow of data in the graphics processing system, according to an embodiment. Block 1901A of FIG. 19 represents an application that is executing on the CPU 2 which requires graphics processing from the GPU 4, in the form of a frame to be displayed. The application therefore sends appropriate commands and data to a driver for the GPU 4 that is running on the host processor 2 (block 1902A).

The driver then sends appropriate commands and data to the GPU 4 to cause the GPU 4 to generate the render output required by the application (block 1903A). In the present embodiment, the commands sent to the GPU 4 cause the GPU 4 to render the scene to generate an application frame and to output image data, depth data, primitive motion vectors and object metadata for the application frame to main memory 12.

The image data, depth data, motion vectors and object metadata for the rendered application frame is then subjected to motion estimation (block 1904A) to determine the motion of any objects shown in the rendered application frame. This may also involve processing image data and/or depth data and/or motion vectors and/or object metadata for the previously rendered application frame.

In the embodiment shown in FIG. 19, four output versions of the application frame are then displayed on the display, before the GPU 4 has finished rendering the next application frame.

Thus, at block 1906A, the rendered application frame image data is subjected to a first "timewarp" (ATVV) process based on head tracking information at a first point in time to generate a first output "timewarped" frame. The display processor 5 then provides the first "timewarped" frame to the display 13 for display (block 1907A), and the image is displayed on the display 13 (block 1908A).

Then, at block 1905B, an extrapolated ("spacewarped") version of the application frame representing a view of the scene at a second, later point in time, is generated based on the motion determined at block 1904A. Then, at block 1906B, the extrapolated ("spacewarped") frame is subjected to a second "timewarp" (ATVV) process based on head tracking information to generate a second output "timewarped" and "spacewarped" frame. The display processor 5 then provides the second "timewarped" and "spacewarped" frame to the display 13 for display (block 1907B), and the image is displayed on the display 13 (block 1908B).

In this embodiment, these steps are repeated to generate and display third and fourth "timewarped" and "spacewarped" frames based on the current application frame (at blocks 1905C-1908C, and 1905D-1908D), before the entire process is repeated based on the next application frame rendered by the GPU 4 (at blocks 1901E-1908E). In this way, a sequence of output "timewarped" and "spacewarped" frames is displayed on the display 13.

Although the above embodiments have been described with particular reference to using per-primitive motion vectors for determining object motion in "spacewarp" processing, other embodiments make use of per-pixel (image element) motion vectors for determining object motion in "spacewarp" processing.

Such "per-pixel" ("per-image element") motion vectors can be provided as part of a temporal enhancement scheme. Temporal enhancement schemes generally attempt to improve image quality, e.g. by reducing aliasing and/or noise, using information from previous frames.

For example, Temporal Anti-Aliasing (TAA) is a temporal enhancement scheme in which sampling positions can vary from one frame to the next (e.g. according to a "jitter"), and data sampled for different frames can be combined based on per-pixel motion vector information. Other examples of temporal enhancement schemes include Ray Tracing Denoising, Machine Learning Super Sampling (MLSS) (e.g. Deep Learning Super Sampling (DLSS)), and Machine Learning Anti-Aliasing (MLAA) (e.g. Deep Learning Anti-Aliasing (DLAA)).

Figure 20:
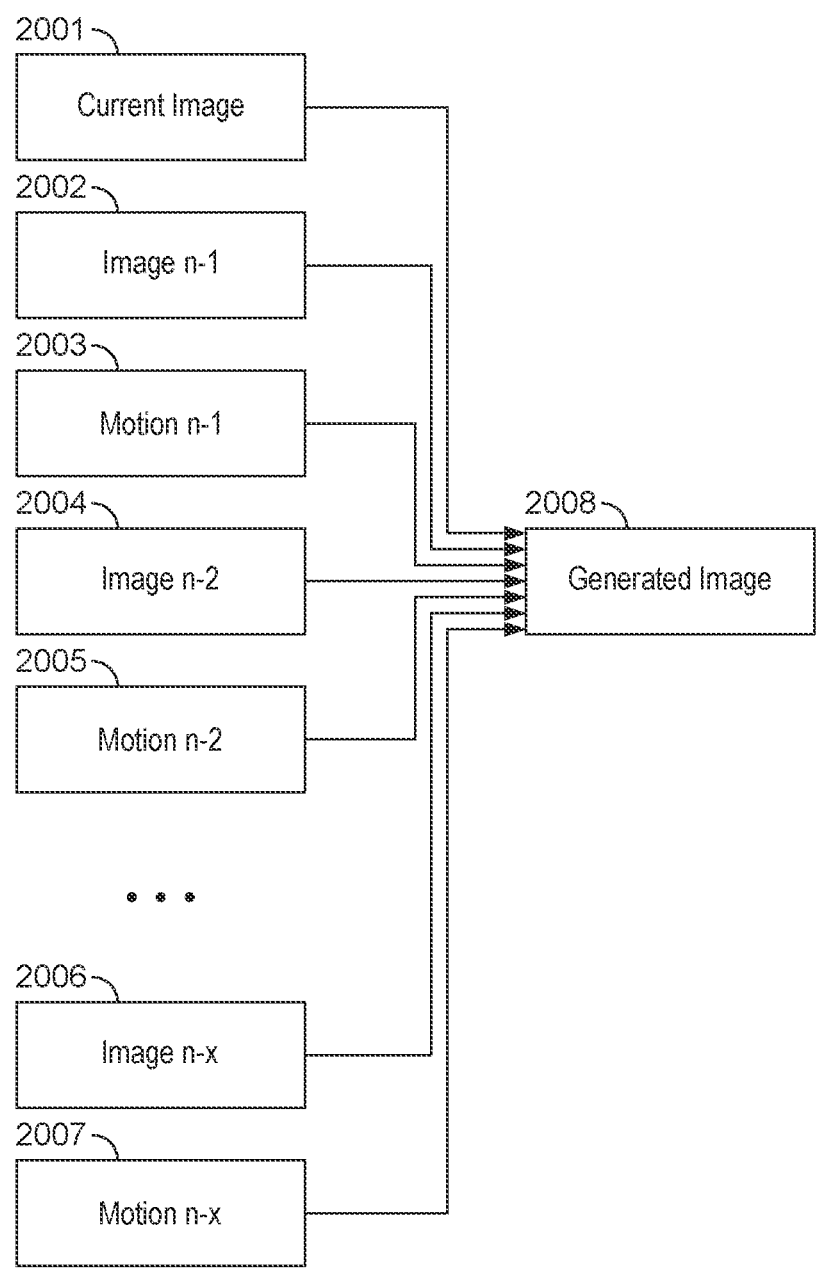
FIG. 20 shows schematically a temporally enhanced rendering process in accordance with an embodiment of the technology described herein.

FIG. 20 shows schematically a temporally enhanced rendering process in accordance with an embodiment. As illustrated in FIG. 20, a temporally enhanced frame 2008 is generated using the current GPU 4 rendered frame 2001, and one or more previous GPU 4 rendered frames 2002, 2004, 2006, together with per-pixel motion vector information 2003, 2005, 2007 for the previous frames that represents motion associated with pixels (image elements) of the respective rendered frames. The per-pixel motion vector information 2003, 2005, 2007 may be determined, e.g. by comparing the GPU 4 rendered frames, or may be output by the application that requires the graphics processing.

Figure 21:
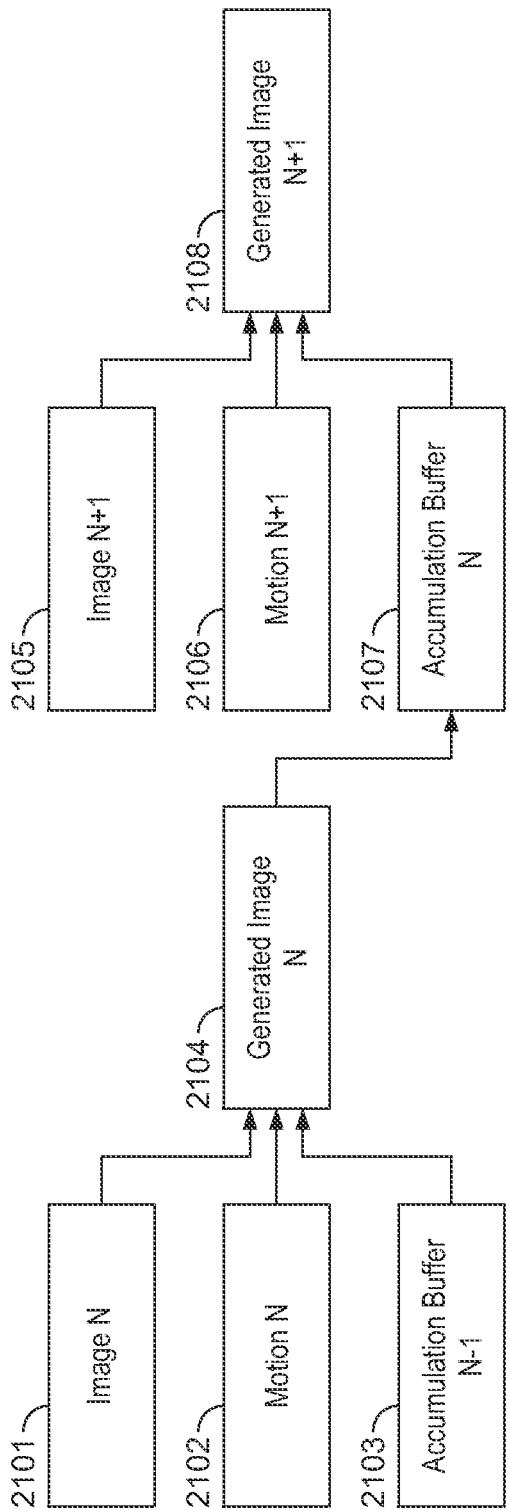
FIG. 21 shows schematically a temporally enhanced rendering process that uses an accumulation buffer in accordance with an embodiment of the technology described herein.

FIG. 21 shows schematically a temporally enhanced rendering process that utilises an accumulation buffer in accordance with an embodiment. As illustrated in FIG. 21, in this embodiment data for one or more previous GPU 4 rendered frames is combined into an accumulation buffer 2103, e.g. rather than data for previous frames being handled separately.

A temporally enhanced frame 2104 can then be generated by reprojecting accumulation buffer data 2103 using per-pixel motion vectors 2102, and blending with a current GPU rendered frame 2101. The temporally enhanced frame 2104 may then be combined into the accumulation buffer 2107, or written to the accumulation buffer 2107 (e.g. such that the temporally enhanced frame 2104 effectively becomes the next accumulation buffer), and the process repeated based on the next GPU 4 rendered frame 2105 and motion vectors 2106 to generate the next temporally enhanced frame 2108, and so on.

Figure 22:
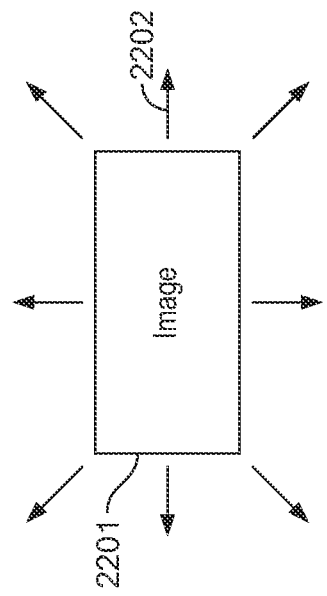
FIG. 22 shows schematically view port jittering in accordance with an embodiment of the technology described herein.

FIG. 22 shows schematically how a temporal enhancement scheme can involve adding view port jitter 2202 between frames 2201, which may follow a predefined sequence. The addition of view port jitter can facilitate an improvement in image quality where there would otherwise be little or no difference between the image data being blended. The view port jitter may be cancelled out as part of the "spacewarp" processing.

Figure 23:
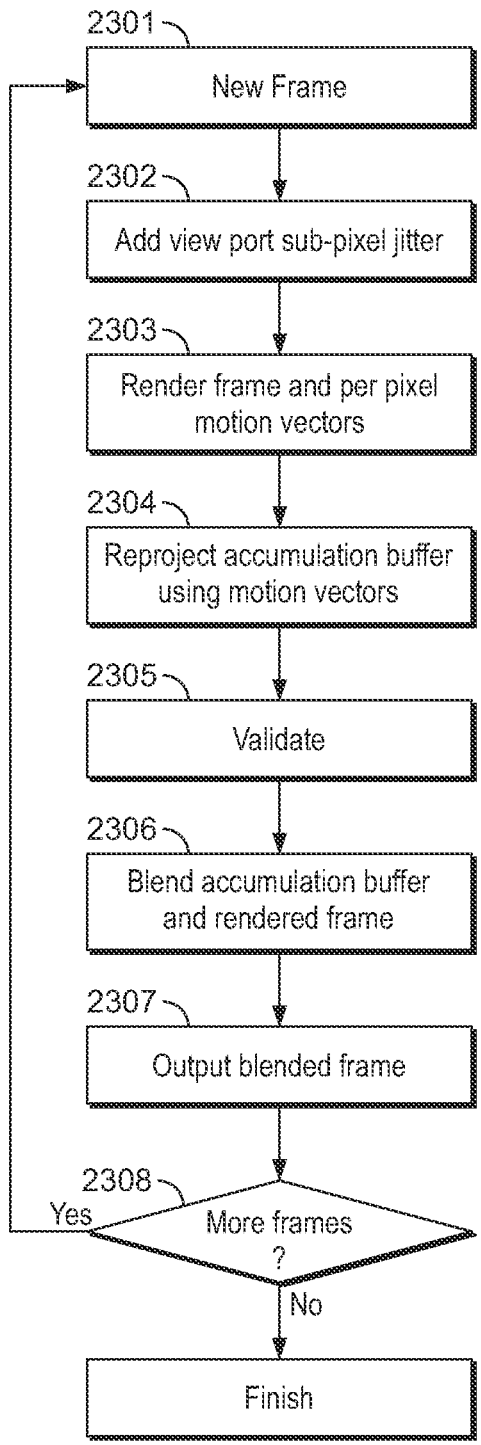
FIG. 23 is a flowchart showing schematically a temporally enhanced rendering process according to an embodiment of the technology described herein.

FIG. 23 schematically illustrates a process for generating a temporally enhanced frame, according to an embodiment. As shown in FIG. 23, when a new frame is to be generated at step 2301, view port jitter is applied (according to a predefined sequence) at step 2302, and GPU 4 renders image data to a frame buffer for a current frame at step 2303. As shown in FIG. 23, step 2303 also includes per-pixel motion vectors representing motion associated with pixels (image elements) of the frame being determined. At step 2304, the per-pixel motion vectors are used to reproject accumulation buffer data.

There is then a validation step 2305 in which it is determined whether rendered image data should be combined with reprojected accumulation buffer data. For example, it may be determined whether or not colour and/or depth values for pixels to be combined are significantly different. If it is determined that pixel values are significantly different, then that may be taken to indicate that the pixels to be combined represent different objects, and so should not be combined. If, on the other hand, it is determined that pixel values are not significantly different, then they may be combined. Additionally or alternatively, it may be determined whether or not significant motion is present. If it is determined that significant motion is present, then that may be taken to indicate that pixels should not be combined. If, on the other hand, it is determined that significant motion is not present, then that may be taken to indicate that pixels may be combined.

At step 2306 rendered image data and reprojected accumulation buffer data that step 2305 determined should be combined is combined in a blending step, and the resulting temporally enhanced frame is output at step 2307.

As shown in FIG. 23, if at step 2308 there are more frames to be generated, the process may loop back to step 2301 to generate the next temporally enhanced frame, and so on.

It will be appreciated from the above that when a temporal enhancement scheme is being used to generate (temporally enhanced) application frames, per-pixel motion vector information can be, in effect, "freely available". Using such "freely available" per-pixel motion vector information for "spacewarp" processing purposes (as well as for temporal enhancement purposes) can allow a more accurate determination of object motion, while reducing the overall processing requirements associated with "spacewarp" processing.

Figure 24:
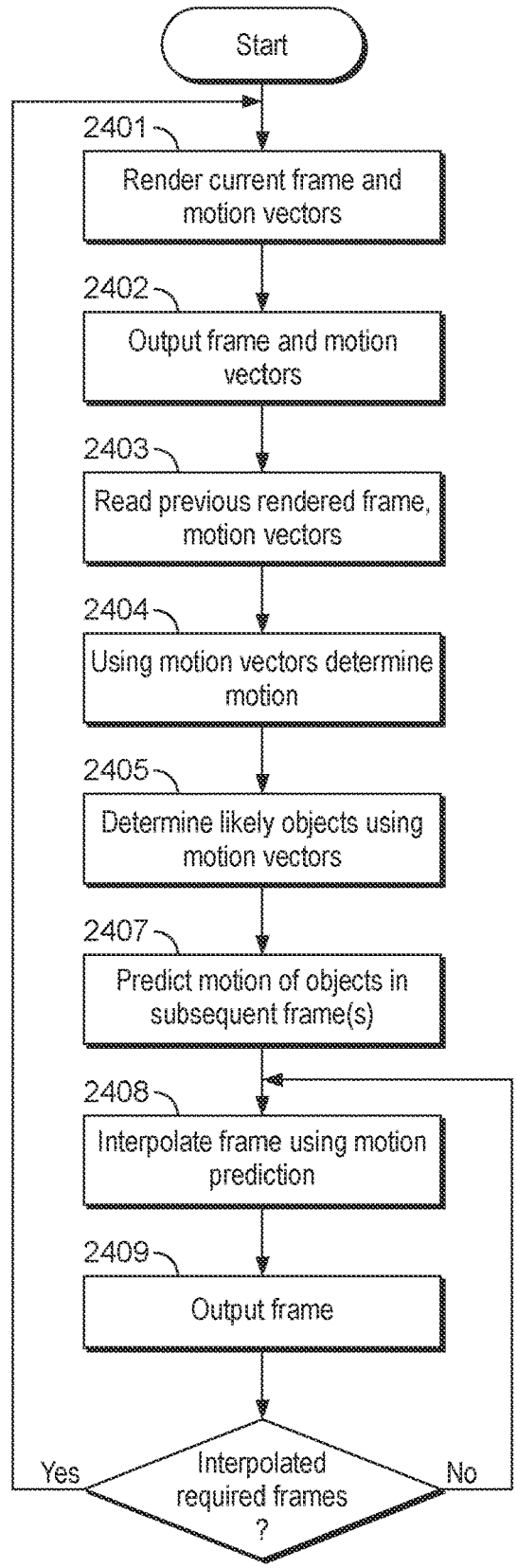
FIG. 24 is a flowchart showing schematically a graphics processing system operating according to an embodiment of the technology described herein.

FIG. 24 schematically illustrates a process for generating one or more extrapolated ("spacewarped") frames from a GPU 4 rendered application frame, according to an embodiment. The process illustrated in FIG. 24 has a number of similarities with the processes described above in relation to FIG. 13, and the following description will focus on the main differences.

As shown in FIG. 24, GPU 4 renders image data to a frame buffer for a current application frame at step 2401. As shown in FIG. 24, step 2401 also includes per-pixel motion vectors representing motion associated with pixels (image elements) of the application frame being generated.

At step 2402, the rendered image data is provided to display 13 for display. Step 2402 includes "timewarping" the application frame image data such that an appropriately "timewarped" output frame is displayed on the display 13. Step 2402 may also include the temporal enhancement process described above. The per-pixel motion vector data is also output and stored in main memory 12. Steps 2403-2409 are then performed to generate one or more extrapolated ("spacewarped") versions of the current rendered (temporally enhanced) application frame, while the GPU 4 is rendering the next application frame for display.

At step 2403 image data for the previous application frame rendered by the GPU 4 is read from the previous frame buffer. Per-pixel motion vectors for the previous application frame may also be read.

At step 2404-2407 the motion of any objects shown in the current application frame is determined. This involves assigning motion indicated by the per-pixel motion vectors to objects shown in the current application frame. Thus, at step 2404, the per-pixel motion vectors are used to determine any motion in the current application frame. At step 2405, objects shown in the current application frame are determined (identified), based on the per-pixel motion vector information. At step 2407, the motion of objects shown in the current application frame is predicted based on the above processing.

Once the object motion has been determined, it is used at step 2408 to generate an extrapolated ("spacewarped") frame by extrapolating (interpolating) object motion from the current (temporally enhanced) application frame. In the present embodiment, this is done by the graphics processing unit (GPU) 4. However, in other embodiments, this involves the neural network processing unit (NPU) 3 executing a neural network, e.g. as described above.

The extrapolated ("spacewarped") frame is then provided to display 13 for display at step 2409. Step 2409 includes "timewarping" the extrapolated frame such that an appropriately "timewarped" and "spacewarped" output frame is displayed on the display 13.

As shown in FIG. 24, steps 2408 and 2409 may be repeated one or more times to generate one or more further "spacewarped" and/or "timewarped" frames for display based on the current (temporally enhanced) application frame and the determined object motion. The entire process may then be repeated by looping back to step 2401 and generating the next application frame.

Figure 25:
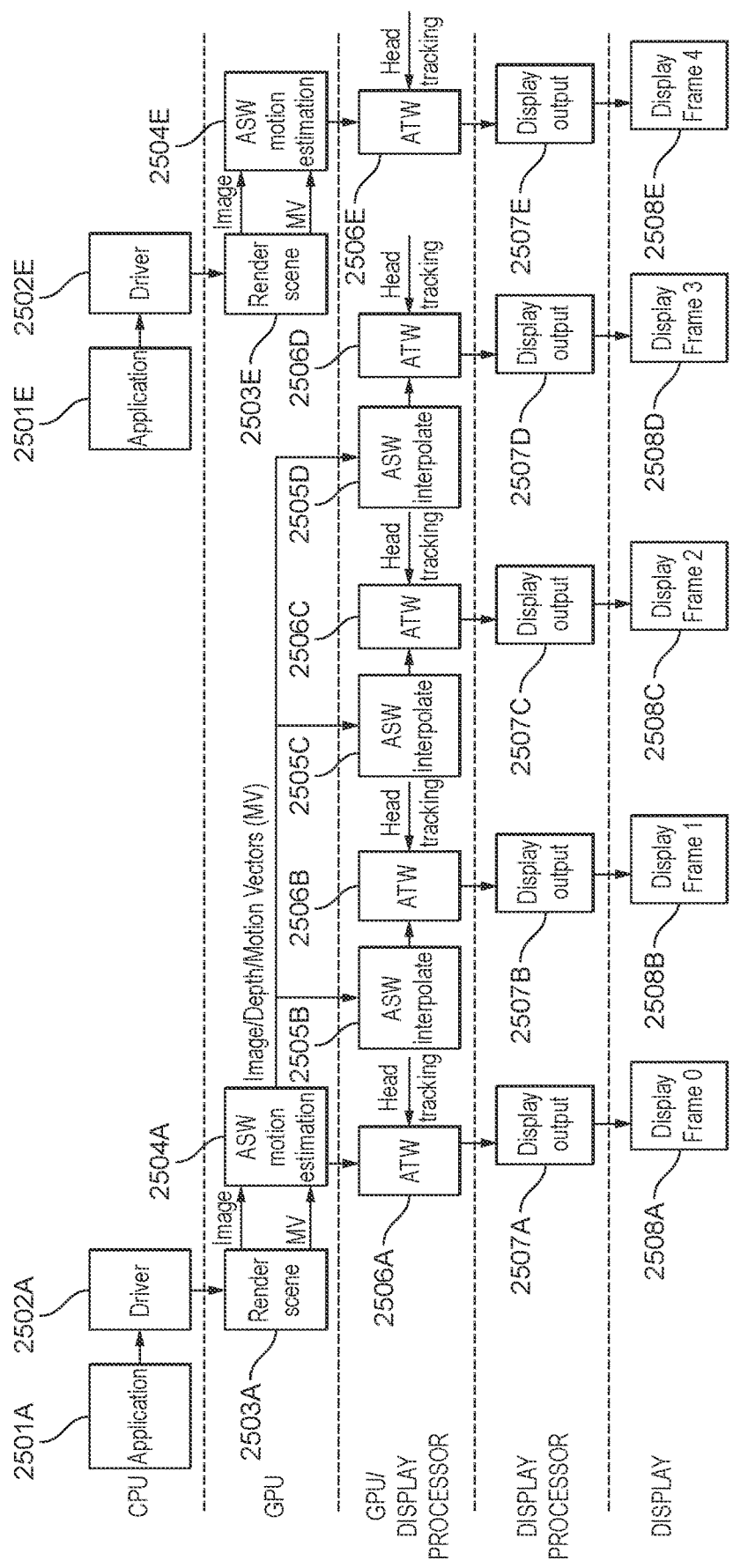
FIG. 25 shows schematically the flow of data in a graphics processing system operating according to the embodiment of FIG. 24.

FIG. 25 illustrates schematically a corresponding flow of data within the graphics processing system, according to an embodiment. Block 2501A of FIG. 25 represents an application that is executing on the CPU 2 which requires graphics processing from the GPU 4, in the form of a frame to be displayed. The application sends appropriate commands and data to a driver for the GPU 4 that is running on the host processor 2 (block 2502A).

The driver then sends appropriate commands and data to the GPU 4 to cause the GPU 4 to generate the render output required by the application (block 2503A). In the present embodiment, the commands sent to the GPU 4 cause the GPU 4 to render the scene to generate an application frame, and to output image data, and per-pixel motion vectors for the application frame to main memory 12.

The image data and per-pixel motion vectors for the rendered application frame are then subjected to motion estimation (block 2504A) to determine the motion of any objects shown in the rendered application frame. This may also involve processing image data and/or motion vectors for the previously rendered application frame. Block 2504A may also include temporal enhancement.

In the embodiment shown in FIG. 25, four output versions of the application frame are then displayed on the display, before the GPU 4 has finished rendering the next application frame.

Thus, at block 2506A, the rendered (temporally enhanced) application frame image data is subjected to a first "timewarp" (ATVV) process based on head tracking information at a first point in time to generate a first output "timewarped" frame. The display processor 5 then provides the first "timewarped" frame to the display 13 for display (block 2507A), and the image is displayed on the display 13 (block 2508A).

Then, at block 2505B, an extrapolated ("spacewarped") version of the application frame representing a view of the scene at a second, later point in time, is generated based on the motion determined at block 2504A. Then, at block 2506B, the extrapolated ("spacewarped") frame is subjected to a second "timewarp" (ATVV) process based on head tracking information to generate a second output "timewarped" and "spacewarped" frame. The display processor 5 then provides the second "timewarped" and "spacewarped" frame to the display 13 for display (block 2507B), and the image is displayed on the display 13 (block 2508B).

In this embodiment, these steps are repeated to generate and display third and fourth "timewarped" and "spacewarped" frames based on the current application frame (at blocks 2505C-2508C, and 2505D-2508D), before the entire process is repeated based on the next application frame rendered by the GPU 4 (at blocks 2501E-2508E).

In this way, a sequence of output "timewarped" and/or "spacewarped" frames is displayed on the display 13. The process, in this embodiment, is performed for each eye such that a sequence of frames representing the scene as seen from the left eye is generated, and a sequence of frames representing the scene as seen from the right eye is generated. The frames are then displayed to each eye appropriately using the head mounted display 13 so as to provide a three-dimensional effect when the images are viewed.

Figure 26:
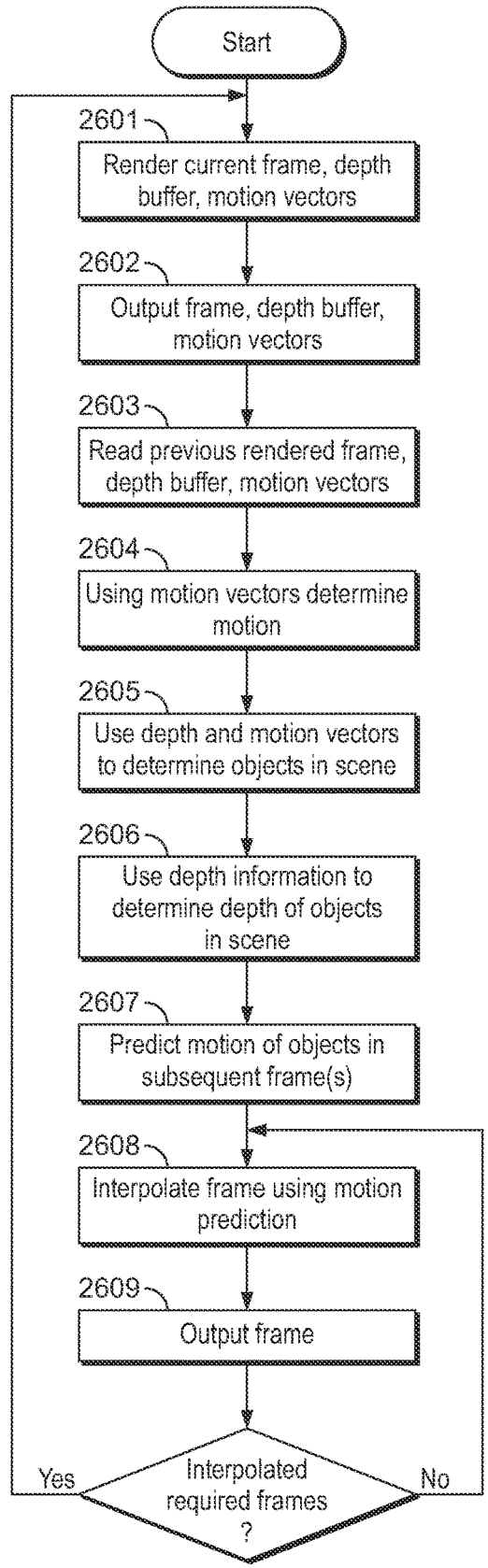
FIG. 26 is a flowchart showing schematically a graphics processing system operating according to an embodiment of the technology described herein.

FIG. 26 schematically illustrates a process for generating one or more extrapolated ("spacewarped") frames from a GPU 4 rendered application frame, according to another embodiment. The process illustrated in FIG. 26 is broadly similar to the process of FIG. 24, and the following description will focus on the main differences.

As shown in FIG. 26, GPU 4 renders image data to a frame buffer for a current application frame at step 2601. As shown in FIG. 26, step 2601 also includes per-pixel motion vectors representing motion associated with pixels (image elements) of the application frame being generated. In this embodiment, step 2601 also includes GPU 4 rendering depth data to a depth buffer for the current application frame.

At step 2602, the rendered image data is provided to display 13 for display. Step 2602 includes "timewarping" the application frame image data such that an appropriately "timewarped" output frame is displayed on the display 13. Step 2602 may also include the temporal enhancement process described above. The depth data and per-pixel motion vector data is also output and stored in main memory 12. Steps 2603-2609 are then performed to generate one or more extrapolated ("spacewarped") versions of the current rendered (temporally enhanced) application frame, while the GPU 4 is rendering the next application frame for display.

At step 2603 image data for the previous application frame rendered by the GPU 4 is read from the previous frame buffer, together with depth data from the previous depth buffer. Per-pixel motion vectors for the previous application frame may also be read.

At steps 2604-2607 the motion of any objects shown in the current application frame is determined. This involves assigning motion indicated by the per-pixel motion vectors to objects shown in the current application frame. Thus, at step 2604, the per-pixel motion vectors are used to determine any motion in the current application frame. At step 2605, objects shown in the current application frame are determined (identified), based on the depth and per-pixel motion vector information. At step 2606, the depths of objects shown in the current application are determined using the depth data. At step 2607, the motion of objects shown in the current application frame is predicted based on the above processing. The depth and motion information may also be used to determine object visibility (for example whether an object is visible or occluded), and to predict whether the visibility of an object will change (for example whether an object will become visible or occluded).

Once the object motion (and visibility) has been determined, it is used at step 2608 to generate an extrapolated ("spacewarped") frame by extrapolating (interpolating) object motion (and visibility) from the current (temporally enhanced) application frame. In the present embodiment, this is done by the graphics processing unit (GPU) 4. However, in other embodiments, this involves the neural network processing unit (NPU) 3 executing a neural network.

The extrapolated ("spacewarped") frame is then provided to display 13 for display at step 2609. Step 2609 includes "timewarping" the extrapolated frame such that an appropriately "timewarped" and "spacewarped" output frame is displayed on the display 13.

As shown in FIG. 26, steps 2608 and 2609 may be repeated one or more times to generate one or more further "spacewarped" and/or "timewarped" frames for display based on the current (temporally enhanced) application frame and the determined object motion. The entire process may then be repeated by looping back to step 2601 and generating the next application frame.

Figure 27:
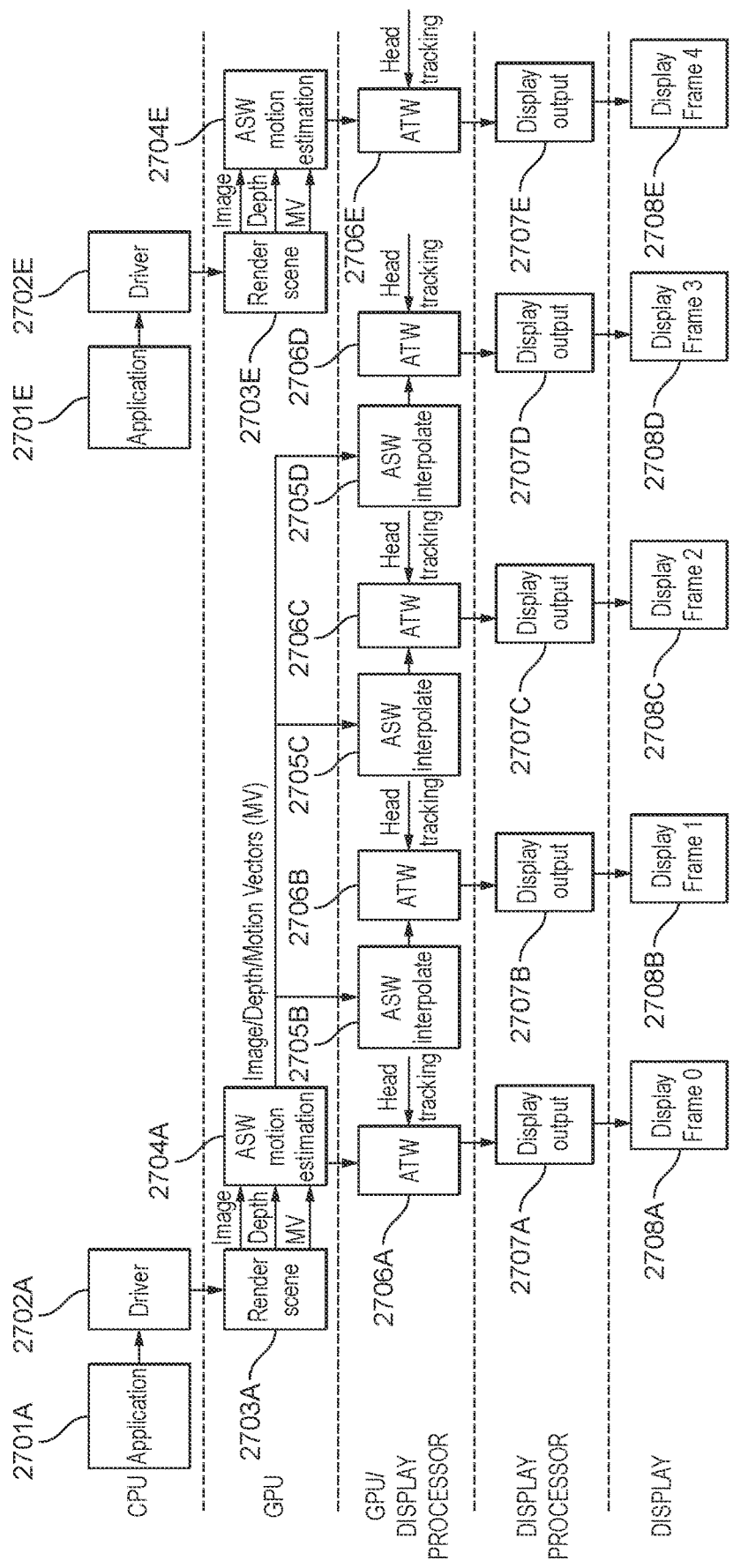
FIG. 27 shows schematically the flow of data in a graphics processing system operating according to the embodiment of FIG. 26.

FIG. 27 illustrates schematically a corresponding flow of data within the graphics processing system, according to an embodiment. Block 2701A of FIG. 27 represents an application that is executing on the CPU 2 which requires graphics processing from the GPU 4, in the form of a frame to be displayed. The application sends appropriate commands and data to a driver for the GPU 4 that is running on the host processor 2 (block 2702A).

The driver then sends appropriate commands and data to the GPU 4 to cause the GPU 4 to generate the render output required by the application (block 2703A). In the present embodiment, the commands sent to the GPU 4 cause the GPU 4 to render the scene to generate an application frame, and to output image data, depth data and per-pixel motion vectors for the application frame to main memory 12.

The image data, depth data and per-pixel motion vectors for the rendered application frame are then subjected to motion estimation (block 2704A) to determine the motion of any objects shown in the rendered application frame. This may also involve processing image data and/or depth data and/or motion vectors for the previously rendered application frame. Block 2704A may also include temporal enhancement.

In the embodiment shown in FIG. 27, four output versions of the application frame are then displayed on the display, before the GPU 4 has finished rendering the next application frame.

Thus, at block 2706A, the rendered (temporally enhanced) application frame image data is subjected to a first "timewarp" (ATVV) process based on head tracking information at a first point in time to generate a first output "timewarped" frame. The display processor 5 then provides the first "timewarped" frame to the display 13 for display (block 2707A), and the image is displayed on the display 13 (block 2708A).

Then, at block 2705B, an extrapolated ("spacewarped") version of the application frame representing a view of the scene at a second, later point in time, is generated based on the motion determined at block 2704A. Then, at block 2706B, the extrapolated ("spacewarped") frame is subjected to a second "timewarp" (ATVV) process based on head tracking information to generate a second output "timewarped" and "spacewarped" frame. The display processor 5 then provides the second "timewarped" and "spacewarped" frame to the display 13 for display (block 2707B), and the image is displayed on the display 13 (block 2708B).

In this embodiment, these steps are repeated to generate and display third and fourth "timewarped" and "spacewarped" frames based on the current application frame (at blocks 2705C-2708C, and 2705D-2708D), before the entire process is repeated based on the next application frame rendered by the GPU 4 (at blocks 2701E-2708E).

In this way, a sequence of output "timewarped" and/or "spacewarped" frames is displayed on the display 13. The process, in this embodiment, is performed for each eye such that a sequence of frames representing the scene as seen from the left eye is generated, and a sequence of frames representing the scene as seen from the right eye is generated. The frames are then displayed to each eye appropriately using the head mounted display 13 so as to provide a three-dimensional effect when the images are viewed.

Although the above embodiments have been described with particular reference to a head mounted display system in which a user's head orientation (pose) is tracked, it will be appreciated that the technology described herein can equally be (and in an embodiment is) applied in the context of a display system that is not head mounted, such as a hand held display system, e.g. a mobile phone or tablet. In such embodiments, the system may operate, for example, to track the movement (orientation) of the display (e.g. of the mobile phone or tablet) itself, and the display orientation data may then be used to determine how images should actually be displayed to the user on the display.

It can be seen from the above, the technology described herein, in embodiments at least, provides an improved graphics processing system that provides "spacewarped" images for display, e.g. for virtual reality (VR) and/or augmented reality (AR) and/or mixed reality (MR) display systems. This is achieved, in embodiments of the technology described herein at least, by using primitive and/or pixel motion vectors to determine the motion of objects appearing in rendered ("application") frames, and using the so-determined motion to generate extrapolated ("spacewarped") versions of the rendered ("application") frames.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system that generates rendered frames, and generates extrapolated frames by extrapolating motion from rendered frames, the method comprising:
   generating, by a rendering circuit, a rendered frame; wherein generating the rendered frame comprises:
   rendering an initial rendered frame; and
   generating the rendered frame by temporally enhancing the initial rendered frame using a set of one or more motion vectors, wherein each motion vector in the set of one or more motion vectors is a vector that represents motion associated with one or more image elements of a rendered frame; and
   generating, by an extrapolated frame generating circuit, an extrapolated version of the rendered frame; wherein generating the extrapolated version of the rendered frame comprises:
   determining motion of one or more image elements of the rendered frame using the same set of one or more motion vectors that was used to temporally enhance the initial rendered frame to generate the rendered frame; and
   generating the extrapolated version of the rendered frame by extrapolating, from the rendered frame, the motion of the one or more image elements determined using the same set of one or more motion vectors that was used to temporally enhance the initial rendered frame to generate the rendered frame.

2. The method of claim 1, wherein temporally enhancing the initial rendered frame comprises:
   combining data for the initial rendered frame with data for one or more previously rendered frames using the set of one or more motion vectors; and
   wherein generating the extrapolated version of the rendered frame comprises:
   determining motion of one or more image elements of the rendered frame using the same set of one or more motion vectors that was used to combine data for the initial rendered frame with data for one or more previously rendered frames; and
   generating the extrapolated version of the rendered frame by extrapolating, from the rendered frame, the motion of the one or more image elements determined using the same set of one or more motion vectors that was used to combine data for the initial rendered frame with data for one or more previously rendered frames.

3. The method of claim 2, wherein the data for the one or more previously rendered frames comprises data accumulated for the one or more previously rendered frames.

4. The method of claim 1, wherein temporally enhancing the initial rendered frame comprises:
   using the set of one or more motion vectors to perform one or more of: (i) Temporal Anti-Aliasing (TAA); (ii) Ray Tracing Denoising; (iii) Machine Learning Super Sampling (MLSS); and (iv) Machine Learning Anti-Aliasing (MLAA).

5. The method of claim 1, wherein generating the rendered frame comprises generating depth data for the rendered frame; and
   wherein generating the extrapolated version of the rendered frame comprises extrapolating motion and visibility from the rendered frame using the depth data and the set of one or more motion vectors.

6. The method of claim 1, further comprising transforming the extrapolated version of the rendered frame based on received view orientation data to generate a transformed and extrapolated version of the rendered frame for display.

7. The method of claim 1, wherein generating the extrapolated version of the rendered frame comprises generating the extrapolated version of the rendered frame using a neural network.

8. A graphics processing system configured to generate rendered frames, and to generate extrapolated frames by extrapolating motion from rendered frames, the graphics processing system comprising:
   a rendering circuit configured to generate a rendered frame by:
   rendering an initial rendered frame; and
   generating the rendered frame by temporally enhancing the initial rendered frame using a set of one or more motion vectors, wherein each motion vector in the set of one or more motion vectors is a vector that represents motion associated with one or more image elements of a rendered frame; and
   an extrapolated frame generating circuit configured to generate an extrapolated version of a rendered frame generated by the rendering circuit by:
   determining motion of one or more image elements of the rendered frame using a same set of one or more motion vectors that was used by the rendering circuit to temporally enhance the initial rendered frame to generate the rendered frame; and
   generating the extrapolated version of the rendered frame by extrapolating, from the rendered frame, the motion of the one or more image elements determined using the same set of one or more motion vectors that was used by the rendering circuit to temporally enhance the initial rendered frame to generate the rendered frame.

9. The system of claim 8, wherein the rendering circuit is configured to temporally enhance an initial rendered frame by:
   combining data for the initial rendered frame with data for one or more previously rendered frames using the set of one or more motion vectors; and
   the extrapolated frame generating circuit is configured to generate an extrapolated version of the rendered frame by:
   determining motion of one or more image elements of the rendered frame using the same set of one or more motion vectors that was used to combine data for the initial rendered frame with data for one or more previously rendered frames; and generating the extrapolated version of the rendered frame by extrapolating, from the rendered frame, the motion of the one or more image elements determined using the same set of one or more motion vectors that was used to combine data for the initial rendered frame with data for one or more previously rendered frames.

10. The system of claim 9, comprising an accumulation buffer, wherein the data for the one or more previously rendered frames comprises data accumulated in the accumulation buffer for the one or more previously rendered frames.

11. The system of claim 8, wherein the rendering circuit is configured to temporally enhance an initial rendered frame by:
using the set of one or more motion vectors to perform one or more of: (i) Temporal Anti-Aliasing (TAA); (ii) Ray Tracing Denoising; (iii) Machine Learning Super Sampling (MLSS); and (iv) Machine Learning Anti-Aliasing (MLAA).

12. The system of claim 8, wherein the rendering circuit is configured to generate depth data for a rendered frame; and
wherein the extrapolated frame generating circuit is configured generate the extrapolated version of the rendered frame by extrapolating motion and visibility from the rendered frame using depth data generated by the rendering circuit and using the set of one or more motion vectors.

13. The system of claim 8, further comprising a transforming circuit configured to transform an extrapolated version of a rendered frame generated by the extrapolated frame generating circuit based on received view orientation data to generate a transformed and extrapolated version of the rendered frame for display.

14. The system of any one of claim 8, wherein the extrapolated frame generating circuit comprises a neural network circuit configured to generate the extrapolated version of the rendered frame using a neural network.

15. A non-transitory computer readable storage medium storing software code which when executing on a processor performs a method of operating a graphics processing system that generates rendered frames, and generates extrapolated frames by extrapolating motion from rendered frames, the method comprising:
generating, by a rendering circuit, a rendered frame; wherein generating the rendered frame comprises:
rendering an initial rendered frame; and
generating the rendered frame by temporally enhancing the initial rendered frame using a set of one or more motion vectors, wherein each motion vector in the set of one or more motion vectors is a vector that represents motion associated with one or more image elements of a rendered frame; and
generating, by an extrapolated frame generating circuit, an extrapolated version of the rendered frame; wherein generating the extrapolated version of the rendered frame comprises:
determining motion of one or more image elements of the rendered frame using the same set of one or more motion vectors that was used to temporally enhance the initial rendered frame to generate the rendered frame; and
generating the extrapolated version of the rendered frame by extrapolating, from the rendered frame, the motion of the one or more image elements determined using the same set of one or more motion vectors that was used when to temporally enhance the initial rendered frame to generate the rendered frame.

* * * * *